(12) United States Patent
Hornbeck

(10) Patent No.: US 11,010,191 B1
(45) Date of Patent: May 18, 2021

(54) PLATFORM-INDEPENDENT INTERFACE FOR GENERATING VIRTUALIZED MULTI-SERVICE HARDWARE SYSTEMS AND INFRASTRUCTURE

(71) Applicant: Ryan L. Hornbeck, Burbank, CA (US)

(72) Inventor: Ryan L. Hornbeck, Burbank, CA (US)

( * ) Notice: Subject to any disclaimer, the term of this patent is extended or adjusted under 35 U.S.C. 154(b) by 0 days.

(21) Appl. No.: 17/080,246

(22) Filed: Oct. 26, 2020

Related U.S. Application Data

(60) Provisional application No. 63/047,532, filed on Jul. 2, 2020, provisional application No. 63/085,047, filed on Sep. 29, 2020.

(51) Int. Cl.
*G06F 9/455* (2018.01)
*H04L 29/08* (2006.01)

(52) U.S. Cl.
CPC ...... *G06F 9/45558* (2013.01); *H04L 67/1002* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2010/0042449 A1 | 2/2010 | Thomas | |
| 2019/0173840 A1 | 6/2019 | Desai et al. | |
| 2020/0012480 A1* | 1/2020 | Rizo | H04L 67/34 |
| 2020/0133737 A1 | 4/2020 | Gunaratne et al. | |

OTHER PUBLICATIONS

Kinoshita et al.,"Cloud Service Based on OSS," Technology Innovation for Accelerating Digital Transformation, p. 78-82 (Year: 2017).*
Office Action dated Jan. 1, 2021 for U.S. Appl. No. 17/080,331, filed Oct. 26, 2020.

* cited by examiner

*Primary Examiner* — Lewis A Bullock, Jr.
*Assistant Examiner* — Melissa A Headly
(74) *Attorney, Agent, or Firm* — Sheppard, Mullin, Richter & Hampton LLP

(57) ABSTRACT

Systems and methods for implementing a platform-independent interface for generating virtualized multi-service hardware systems are provided. For example, the system may generate "Infrastructure as Code" (IaC) and/or "Infrastructure as a Service" (IaaS) using various services and tools (e.g., provided by third parties) and programmatic calls to those services and tools. The system may also generate "Functions as a Service" (FaaS) to provide systems and services that are available perpetually. The system may automatically isolate and resolve bugs or other computational issues without the need for human intervention.

17 Claims, 28 Drawing Sheets

| Identifier | Category | Sub-category | Parameters | API Call Syntax |
|---|---|---|---|---|
| 100 | platform_nameinfra | apply | | platform_nameinfra apply [options] [dir-or-plan] |
| 101 | platform_nameinfra | console | | platform_nameinfra console [options] [dir] |
| 102 | platform_nameinfra | destroy | | platform_nameinfra destroy [options] [dir] |
| 104 | platform_nameinfra | fmt | | platform_nameinfra fmt [options] [DIR] |
| 105 | platform_nameinfra | force-unlock | | platform_nameinfra force-unlock LOCK_ID [DIR] |
| 106 | platform_nameinfra | get | | platform_nameinfra get [options] [dir] |
| 107 | platform_nameinfra | graph | | platform_nameinfra graph [options] [DIR] |
| 108 | platform_nameinfra | import | | platform_nameinfra import [options] ADDRESS ID |
| 109 | platform_nameinfra | init | | platform_nameinfra init [options] [DIR] |
| 110 | platform_nameinfra | login | | platform_nameinfra login [hostname] |
| 111 | platform_nameinfra | logout | | platform_nameinfra logout [hostname] |
| 112 | platform_nameinfra | output | | platform_nameinfra output [options] [NAME] |
| 113 | platform_nameinfra | plan | | platform_nameinfraplan |
| 114 | platform_nameinfra | providers | | platform_nameinfraproviders |
| 116 | platform_nameinfra | refresh | | platform_nameinfra refresh [options] [dir] |
| 117 | platform_nameinfra | show | | platform_nameinfra show [options] [path] |
| 118 | platform_nameinfra | state | | platform_nameinfra state <subcommand> [options] [args] |
| 119 | platform_nameinfra | taint | | platform_nameinfrataint |
| 120 | platform_nameinfra | validate | | platform_nameinfravalidate |
| 121 | platform_nameinfra | untaint | | platform_nameinfrauntaint |
| 122 | platform_nameinfra | workspace | | platform_nameinfra |

FIG. 7A

| Identifier | Category | Sub-category | Parameters | API Call Syntax |
| --- | --- | --- | --- | --- |
| 201 | platform_nameimage | build | | platform_nameimagebuild |
| 202 | platform_nameimage | console | | platform_nameimageconsole |
| 203 | platform_nameimage | fix | | platform_nameimagefix |
| 204 | platform_nameimage | inspect | | platform_nameimageinspect |
| 205 | platform_nameimage | validate | | platform_nameimagevalidate |

FIG. 7B

| Identifier | Category | Sub-category | Parameters | API Call Syntax |
|---|---|---|---|---|
| 301 | *platform_namecore* | build | | *platform_namebuild* |
| 302 | *platform_namecore* | console | | *platform_nameconsole* |
| 303 | *platform_namecore* | fix | | *platform_namefix* |
| 304 | *platform_namecore* | inspect | | *platform_nameinspect* |
| 305 | *platform_namecore* | validate | | *platform_namevalidate* |
| 306 | *platform_namecore* | audit | | *platform_nameaudit* |
| 307 | *platform_namecore* | report | | *platform_namereport* |
| 308 | *platform_namecore* | cost | | *platform_namecost* |
| 309 | *platform_namecore* | score | | *platform_namescore* |
| 310 | *platform_namecore* | plan | | *platform_name plan* |

FIG. 7C

| ID | Category | Sub-cat | API Call Syntax |
|---|---|---|---|
| 401 | platform_name git config | config | platform_namegit config --global user.name "Your Name" |
| 402 | platform_name git config | config | platform_namegit config --global user.email "you@example.com" |
| 403 | platform_name git config | config | platform_namegit config --global color.ui auto |
| 404 | platform_name git init | init | platform_namegit init [project name] |
| 405 | platform_name git clone | clone | platform_namegit clone [project url] |
| 406 | platform_name git status | status | platform_namegit status |
| 407 | platform_name git add | add | platform_namegit add [file] |
| 408 | platform_name git diff | diff | platform_namegit diff [file] |
| 409 | platform_name git diff | diff | platform_namegit diff --staged [file] |
| 410 | platform_name git checkout | checkout | platform_namegit checkout -- [file] |
| 411 | platform_name git reset | reset | platform_namegit reset [file] |
| 412 | platform_name git commit | commit | platform_namegit commit |
| 413 | platform_name git branch | branch | platform_namegit branch [-a] |
| 414 | platform_name git branch | branch | platform_namegit branch [branch_name] |
| 415 | platform_name git checkout | checkout | platform_namegit checkout [-b][branch_name] |
| 416 | platform_name git merge | merge | platform_namegit merge [from name] |
| 417 | platform_name git branch | branch | platform_namegit branch -d [name] |
| 418 | platform_name git rm | rm | platform_namegit rm [file] |
| 419 | platform_name git stash | stash | platform_namegit stash |
| 420 | platform_name git stash pop | stash pop | platform_namegit stash pop |
| 421 | platform_name git stash drop | stash drop | platform_namegit stash drop |
| 422 | platform_name git log | log | platform_namegit log [-n count] |
| 423 | platform_name git log | log | platform_namegit log --oneline --graph --decorate |
| 424 | platform_name git log ref.. | log | platform_namegit log ref.. |
| 425 | platform_name git log ..ref | log | platform_namegit log ..ref |
| 426 | platform_name git reflog | reflog | platform_namegit reflog |
| 427 | platform_name git tag | tag | platform_namegit tag |
| 428 | platform_name git tag | tag | platform_namegit tag [name] [commit sha] |
| 429 | platform_name git tag -a | tag | platform_namegit tag -a [name] [commit sha] |
| 430 | platform_name git tag -d | tag | platform_namegit tag -d [name] |
| 431 | platform_name git reset | reset | platform_namegit reset [--hard] [target reference] |
| 432 | platform_name git revert | revert | platform_namegit revert [commit sha] |
| 433 | platform_name git fetch | fetch | platform_namegit fetch [remote] |
| 434 | platform_name git fetch | fetch | platform_namegit fetch --prune [remote] |
| 435 | platform_name git pull | pull | platform_namegit pull [remote] |
| 436 | platform_name git push | push | platform_namegit push [--tags] [remote] |
| 437 | platform_name git push | push | platform_namegit push -u [remote] [branch] |
| 438 | platform_name git cat .gitignore | cat | platform_namegit cat .gitignore |

FIG. 7D

PLATFORM-INDEPENDENT INTERFACE FOR GENERATING VIRTUALIZED MULTI-SERVICE HARDWARE SYSTEMS AND INFRASTRUCTURE

CROSS REFERENCE TO RELATED APPLICATIONS

This application is a non-provisional patent application of U.S. Patent Application No. 63/047,532 filed Jul. 2, 2020 and U.S. Patent Application No. 63/085,047 filed Sep. 29, 2020. This application is co-pending with U.S. patent application Ser. No. 17/080,289 entitled "REPEATABLE SECURITY HARDENING FOR VIRTUALIZED HARDWARE AND INFRASTRUCTURE" and U.S. patent application Ser. No. 17/080,331 entitled "UNIFIED API PLATFORM", each filed concurrently herewith. Each of these applications are incorporated for reference in their entirety for all purposes.

TECHNICAL FIELD

The disclosed technology relates generally to a software platform that allows a user to launch remote, virtualized hardware. More particularly, various embodiments relate to systems and methods for designing and implementing virtualized hardware that can run services or websites that are customized to the clients' specific infrastructure and software needs in a DevOps model, or the set of practices that combines software development (Dev) and IT operations (Ops).

BACKGROUND

In computing, the term "availability" is used to describe the period of time when a service is available, as well as the time required by a system to respond to a request made by a user. High availability is a quality of a system or component that assures a high level of operational performance for a given period of time. However, high availability is difficult to obtain in an ever changing technological world.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 7A illustrates a data store with a plurality of platform commands to display infrastructure as code across a plurality of infrastructure as a service (IaaS) platforms, in accordance with embodiments disclosed herein.

FIG. 7B illustrates a data store with a plurality of platform commands to display infrastructure as code across a plurality of infrastructure as a service (IaaS) platforms, in accordance with embodiments disclosed herein.

FIG. 7C illustrates a data store with a plurality of platform commands to display infrastructure as code across a plurality of infrastructure as a service (IaaS) platforms, in accordance with embodiments disclosed herein.

FIG. 7D illustrates a data store with a plurality of platform commands to display infrastructure as code across a plurality of infrastructure as a service (IaaS) platforms, in accordance with embodiments disclosed herein.

Figure 1:
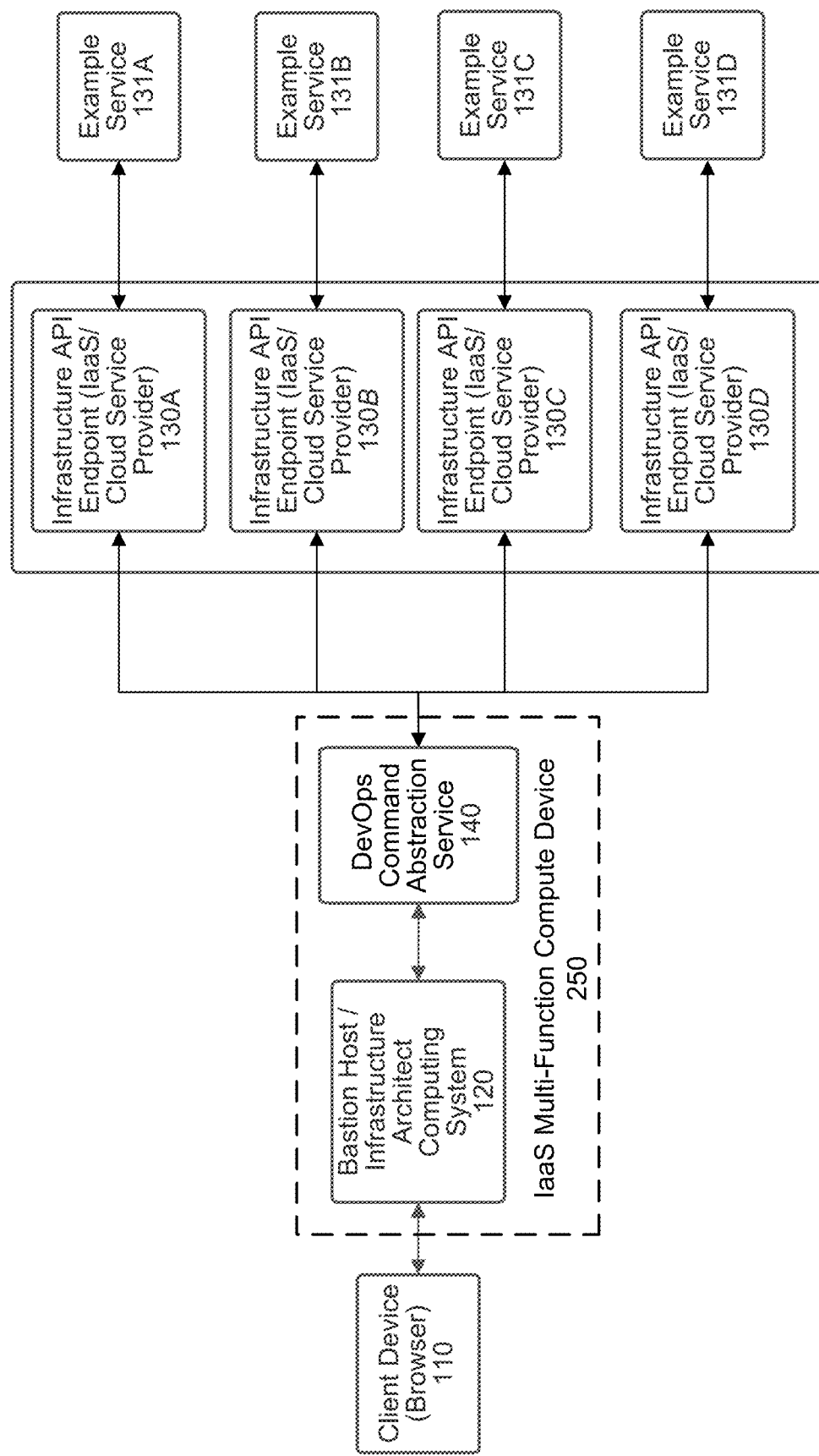
FIG. 1 is a multi-device computing environment for generating virtualized multi-service hardware systems, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Operational, production-class systems are built upon the premise of "high availability" or the conceit that services and systems have been designed to fail from one geographic region, datacenter, or availability zone to another in the event of operational issues affecting availability.

Some embodiments of the application are directed to providing a platform-independent interface for generating virtualized multi-service hardware systems. For example, the platform-independent interface may be generated by a IaaS multi-function compute device. The IaaS multi-function compute device can generate "Infrastructure as Code" (IaC) and/or "Infrastructure as a Service" (IaaS) using various services and tools (e.g., provided by third parties), using programmatic calls to those services and tools. The IaaS multi-function compute device may also generate "Functions as a Service" (FaaS) to provide systems and services that are available perpetually. The IaaS multi-function compute device may automatically isolate and resolve bugs or other computational issues without the need for human intervention.

The IaaS multi-function compute device may help generate virtualized multi-service hardware systems that correspond with physical data centers in multiple locations. For example, when a first data center fails from one geographic region, a second data center or availability zone may initiate another instance of the virtualized system that failed in the first data center. This second location may provide a same infrastructure so that the user perspective is unchanged. This may provide "high availability" system access by relying on more than one data center to run the virtualized hardware.

In some examples, the IaaS multi-function compute device may identify binary states of a given service as either "healthy" or "any other state." The state can trigger actions (e.g., via FaaS) and identify data points that define the state of a given service. For example, the states may include a regional state, datacenter state, service state, system state, function state, and the like. Additional detail is provided throughout the application.

In some examples, the IaaS multi-function compute device may identify binary states of all services and equipment provided by an IaaS. For example, the state may be either "healthy" or "any other state." Due to an assumption that reserve capacity is available in all IaaS providers, some architectures may be developed without requiring "troubleshooting" individual services and equipment. Commodity compute may be returned to the available compute pool and hardware replacement may be performed by the IaaS provider directly.

In some examples, direct secure shell (SSH) or remote desktop protocol (RDP) access to production compute nodes may be discouraged and actively denied, in exchange for service account and application programming interface (API) programmatic accesses. Architects design infrastructure and service deployments to deliver self-healing capabilities. For example, the self-healing capabilities may utilize Continuous Integration/Continuous Delivery (known as "CI/CD") tools such as Git® and Jenkins®, which can reduce security vulnerabilities. Additional detail is provided throughout the application.

In some examples, an infrastructure system architect may identify the states of a specific health metric. As an example, an architect may define the binary state of the virtual machine (VM) API response for a service as "healthy" when the VM responds as "200 OK" from a request by the service API. The infrastructure system architect may place all responses other than "200 OK" in an "any other state" grouping. Using these groupings, an action may be determined to return the service or system to health.

In a regional state, an IaaS service can report the state for regional availability of a given platform or service, including tool, application, and service status of a given region. The state may be presented temporally and/or as discreet events. These metrics may include non-regional states and service availability affecting the IaaS platform, in toto.

In a datacenter state, an IaaS service can report the state for datacenter availability of a given platform or service, including geographically constrained services sensitive to latency or proximal services due to the ability interact with the service. These services may include both block and object storage, backup and image services, API availability, network availability, as well as general site services such as HVAC and facility power.

In a service state, an IaaS service can report the state for components that comprise a given service. These services may include API endpoint availability, individual tools and services, as well as features associated with services.

In a system state, an IaaS service can report the state of a given virtual machine, bare metal server, or discreet units of compute as reported by various operating systems. These data points may include (but not limited to) CPU, motherboard, disk, RAM and power metrics.

In a function state, an IaaS service can report the state of the FaaS capability. This service can be separated from other services. This may be reliant on the availability of FaaS to determine whether event triggering can occur. In some examples, the FaaS capability may be identified as a critical service of autonomic applications.

Once the one or more states are identified, the IaaS multi-function compute device may implement a self-healing process. This process may have the ability to self-monitor, ability to self-diagnose, ability to adapt the components of the system, and the ability to self-test.

Self-monitoring the health of a component or service can identify an "any other state." This may include an anomalous event or any other event than "healthy."

When the state is "any other state," a self-diagnosis process may be triggered. The input of the self-diagnosis process may include the state and other relevant information, if needed. The self-diagnosis process may follow rules and other operational logic defined for the system (e.g., by the system architect).

The output from the self-diagnosis may include fault specifics.

The output from the self-diagnosis and/or fault specifics may correspond with one or more actions that can alter the state of the system. These actions can be defined as one or more operations in a set of stored rules (e.g., code commits) performed on the application repository.

In some examples, when an action is performed on this application repository, a number of rules may be triggered to execute on the system as well. For example, a candidate fix build may be executed on the application itself. In another example, a properly built CI/CD pipeline may perform a developer-defined unit test and/or self-test on the state of the system. In some examples, these additional tests may trigger a deployment of the newly repaired application.

The IaaS multi-function compute device may implement a load balancer. For example, the load balancer may map IaaS service to various requirements and capabilities. In some examples, the load balancer may distribute network traffic across multiple servers. This may ensure that no single server bears too much demand, including processing tasks associated with the network traffic over a threshold value. By spreading the work evenly, load balancing can improve application responsiveness and may also increase the availability of applications and websites for users.

In some examples, the IaaS multi-function compute device may provide a repository of a user's choice, providing Git-compliant functionality for managing, version-controlling and developing software, tailored to support IaC and IaaS. The IaaS multi-function compute device may provide an artifact repository meeting the requirements of the tenant, including API-abstracted storage of containers, operating system images, software binaries, and operating systems packages. The IaaS multi-function compute device may provide functions as a service (FaaS). This may help create state metrics monitoring and event triggering. The IaaS multi-function compute device may provide the ability to self-terminate and relaunch compute based on monitoring events and system health checks. These functions may trigger relaunch of compute on healthy servers under any condition other than "200 OK". The IaaS multi-function compute device may provide the ability to define complex infrastructures that are auditable and governed by industry standards prior to launch and/or implementation. The IaaS multi-function compute device may provide "NoOps" methods for building "headless" operating systems. The "NoOps" methods may increase a security posture of a given platform, due to removal of any direct administrator access to production systems.

The IaaS multi-function compute device may implement testing, including platform infrastructure as code continuous integration testing. This may help generate audit scores for Static Application Security Testing (SAST), Dynamic Application Security Testing (DAST) and/or Interactive Application Security Testing (IAST). This capability may help define the U.S. Government's desire to define and implement "Continuous Authorization to Operate ("C-ATO")" functionality for DevOps and DevSecOps baselines.

The IaaS multi-function compute device may provide a baseline of pre-hardened Operating Systems, including all Windows-, Linux- and UNIX-based complying to all major standards, including the Center for Internet Standards' CIS Standard and the Defense Information Systems Agency's (DISA's) STIG Standards for system hardening. This capability may facilitate compute launch in a hardened state, eliminating the requirement for users (e.g., Security Engineering, etc.) to manually harden systems post-launch.

The IaaS multi-function compute device may provide embedded monitoring. This may help ensure compute and operating systems are launched pre-integrated with central monitoring. Some of these processes may include, for example, indexing of machine data and malware information, so that various formats of data can be indexed from virtually any source, format, or location.

The IaaS multi-function compute device may provide autoscaling capabilities. The autoscaling may support both containerized (e.g., microservices) deployment methods, and/or webserver or database deployments. In some examples, a smaller autoscaling capability may enable the IaaS multi-function compute device to use free-tier compute provided by IaaS hosts. This may help support seamless deliveries of thousands of multi-regional, multi-availability-zones ("multi-AZs") web services by leveraging, for example, a single, multi-tenant, high-availability database.

The IaaS multi-function compute device may provide Commercial Data Network ("CDN") abstraction for static data and content. This implementation may reduce security in a high magnitude due to redirection of user queries to cached CDN content, vice querying the database directly. This method may have the additional benefit of greatly reducing cost for front-end, web-facing server resources, on an order of $\frac{1}{10}^{th}$ to $\frac{1}{200}^{th}$ the hardware requirements of traditional LAMP-based web service deployments (e.g., "LAMP" may refer to the original four open-source components: the Linux operating system, the Apache HTTP Server, the MySQL relational database management system, and the PHP programming language).

Technical improvements are realized throughout the application. Computer systems that utilize event data to act can eschew the common hallmarks of operational support, such as manual troubleshooting of systems to isolate and repair problems. The task of software installation may become a developer activity, moving the action into the artifact creation stage or "build stage" of the CI/CD pipeline. Security remediation may happen before the system is launched, removing the stage where operating systems and services are deployed, even briefly, in an insecure state. Successful autonomic deployments can assume spare resources are available and ready to join services immediately based on triggered events, and built rapidly leveraging pre-built operating systems artifacts. Troubled hardware can be discarded and replaced automatically.

Additionally, technical improvements are realized by shifting security of autonomic systems shifts from the legacy "blacklist" approach to a "whitelist" method. This results in systems that are assumed hardened at runtime, as opposed to after operating systems are installed and thus deploying ubiquitously vulnerable systems where security is remediated and certified well after deployment.

Processes become repeatable since healing actions are scripted. This process removes the need for any method at the production tier for SSH, MSTSC/RDP, or GUI access to the servers themselves, thereby removing an entire attack vector potential. Automated builds of self-healing systems receive a massive reduction in human errors due to the autonomic methods leverages for repairs at the CI/CD tier. The IaaS multi-function compute device may provide the services and methodologies to implement DevOps, DevSecOps, and Continuous Integration/Continuous Delivery ("CICD"), resulting in hardened compute at runtime.

Additionally, the IaaS multi-function compute device may reduce the need for manual intervention. For example, building autonomic systems and services may reduce the need for many-to-one ratios of engineers to systems. Successful systems can see an improvement of two DevOps developers per 50 to 200 systems, which may invert a ratio of developers to systems in traditional environments.

These and other technical improvements are realized throughout the disclosure. The IaaS multi-function compute device can provide deployment and operational support for virtualized multi-service hardware systems for all types of compute services. The downtime of the virtualized system is decreased and user interaction with the system is drastically reduced. The IaaS multi-function compute device is able to self-heal. Additionally, the IaaS multi-function compute device can independently produce real-time analytic data that is analyzed and used to trigger actions. These actions are then utilized to return a given state of a service or application to operations.

FIG. 1 is a multi-device computing environment for generating virtualized multi-service hardware systems, in accordance with the embodiments disclosed herein. The environment comprises the client device 110, bastion host 120, DevOps command abstraction service 140, IaaS provider of a given cloud vendor 130 (illustrated as IaaS provider 130A, IaaS provider 130B, IaaS provider 130C, IaaS provider 130D), and example services 131 (illustrated as example service 131A, example service 131B, example service 131C, example service 131D). In some examples, example services 131 may be deployed using the IaaS multi-function compute device and methods discussed herein.

The multi-device computing environment may communicate via an electronic communication network (not shown). The network may be local area network (LAN), a wide area network (WAN) or Internet, a mobile data network, or any combination of connections and protocols that support communications between the devices. The network may include wired, wireless, or fiber optic connections.

Client device 110 may correspond with a computing device (e.g., any compute) that can run HTML-standardized, modern Internet browsers. Client device 110 may be a compute device (e.g., tablet, cell, virtual machine, server, computer, or any system running a traditional Desktop). Client device 110 may comprise modern functionality and network connectivity capabilities. In some examples, authentication to both the IaaS multi-function compute device and APIs may be handled upstream, either at bastion host 120 or via API authentication. An illustrative client device 110 is provided with FIG. 2 as client device 200, as discussed herein.

IaaS Multi-Function Compute Device 250 may comprise functions and services described with respect to both bastion host 120 and/or infrastructure architect computing system 120, as well as DevOps command abstraction service 140.

Bastion host 120 and/or infrastructure architect computing system 120. Bastion host 120 may correspond with a dedicated server. This may include, for example, a virtual machine or bare metal server, running either on-premises or on an IaaS or virtual private cloud (VPC). Bastion host 120 may provide a gateway to accessing the IaaS multi-function compute device and associated services. Bastion host 120 may provide a dashboard for the IaaS multi-function compute device for DevOps engineers, baseline managers, developers, and general users to access services enabled by the IaaS multi-function compute device. Bastion host 120 may also include runtimes and components used to both build and automate IaaS services, such as Functions as a Service (or "FaaS") Services, Infrastructure as Code ("IaC") Services, and Operating System Build runtimes. An illustrative bastion host 120 is provided with FIG. 5 as bastion host 400, as discussed herein.

In some examples, IaaS Multi-Function Compute Device 250 provides a user interface ("UI") for management of users, groups, software repositories, CICD build services, artifact management, software testing and monitoring/audit functionality for all launched operating systems, infrastructure, and services.

DevOps Command Abstraction Service 140 may provide an API and command line interface unification service. This may include binding all electronic communication calls to IaaS/cloud providers and vendors behind a single, homogenous set of defined commands. DevOps Command Abstraction Service 140 may help DevOps developers and software developers build infrastructure, operating systems, and software independent of IaaS/Cloud-specific API and CLI call discrepancies. In some examples, DevOps Command Abstraction Service 140 creates a true "Hybrid Cloud" interface, abstraction intentional IaaS/Cloud Vendor "lock-in" attempts by homogenizing service calls behind a single interface. An illustrative DevOps Command Abstraction Service 140 is provided with FIG. 3 as DevOps Command Abstraction Service 300, as discussed herein.

Infrastructure API Endpoint 130 may correspond with various endpoints. For example, Infrastructure API Endpoint 130 may correspond with an Azure® DevOps CLI service endpoint and/or API service endpoint provided by a given by a IaaS, Cloud, and/or Vendor on Premises (VOP) or "on-prem" vendor. Each of these endpoints can vary greatly in command syntax. This may be in comparison with traditional systems, where a DevOps Developer would create a new translation for each service endpoint. This may correspond with "Vendor Locked-In" solutions that could deny the ability to shift services and workloads between the various IaaS or cloud vendors efficiently.

Example service 131 may correspond with IaaS or cloud vendors that provide the ability to deploy services such as Apache Hadoop (e.g., a software library that may help enable "Big Data" analytics and framework), containerized orchestration and clustered, autoscaling tools and services. IaaS Multi-Function Compute Device 250 may establish a unified framework (e.g., Kubernetes®, etc.) running within each IaaS or cloud vendor. The framework may not be limited to the type of framework selected to support deployed enterprise tools and services (e.g., traditional git that provides a distributed version-control system for tracking changes in source code during software development, GitLab®, Microsoft® GitHub, Atlassian Bitbucket, etc.).

Figure 2:
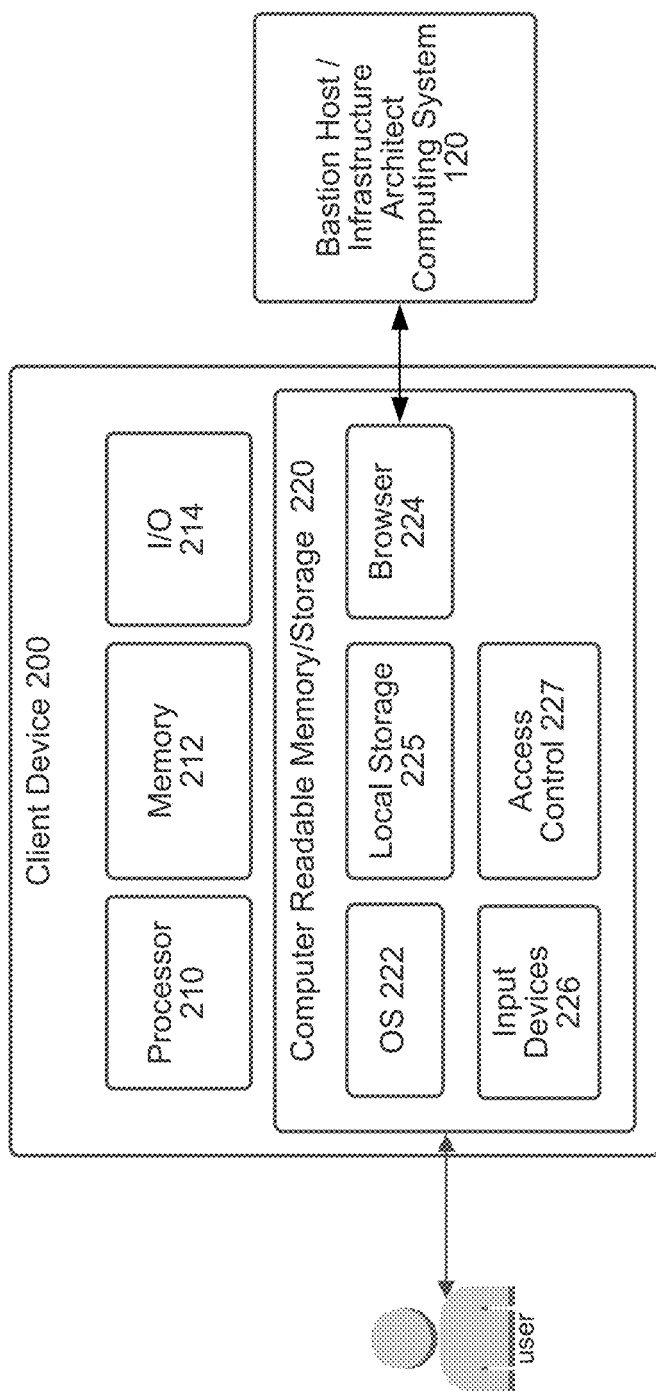
FIG. 2 illustrates a client device, in accordance with embodiments disclosed herein.

FIG. 2 illustrates a client device, in accordance with embodiments disclosed herein. Client device 200 may interface with IaaS Multi-Function Compute Device 250 and associated tools and services for managing and viewing the platform. Client device 200 may comprise a computer processing unit ("CPU") 210, memory 212 (e.g., random access memory (RAM)), an operating system 222, local storage 225, input devices 226 (e.g., mouse, keyboard, etc.), a network browser and display 224, and access control 227 (e.g., to ensure authorized users can access client device 200).

Client device 200 may correspond with computer hardware or software that accesses a service made available by a server as part of the client-server model of computer networks. The server may be on another computer system, in which case the client accesses the service by way of an electronic communication network.

In some examples, a user may operate client device 200 using various methods. For example, the user logs into client device 200 via access control 227. Once authenticated, the user accesses IaaS Multi-Function Compute Device 250 via either shared credentials used to access operating system 222 or via server-side credentials stored on bastion host 120.

Once authenticated, the user may access all services, tools, and functionality provided by the platform.

Figure 3:
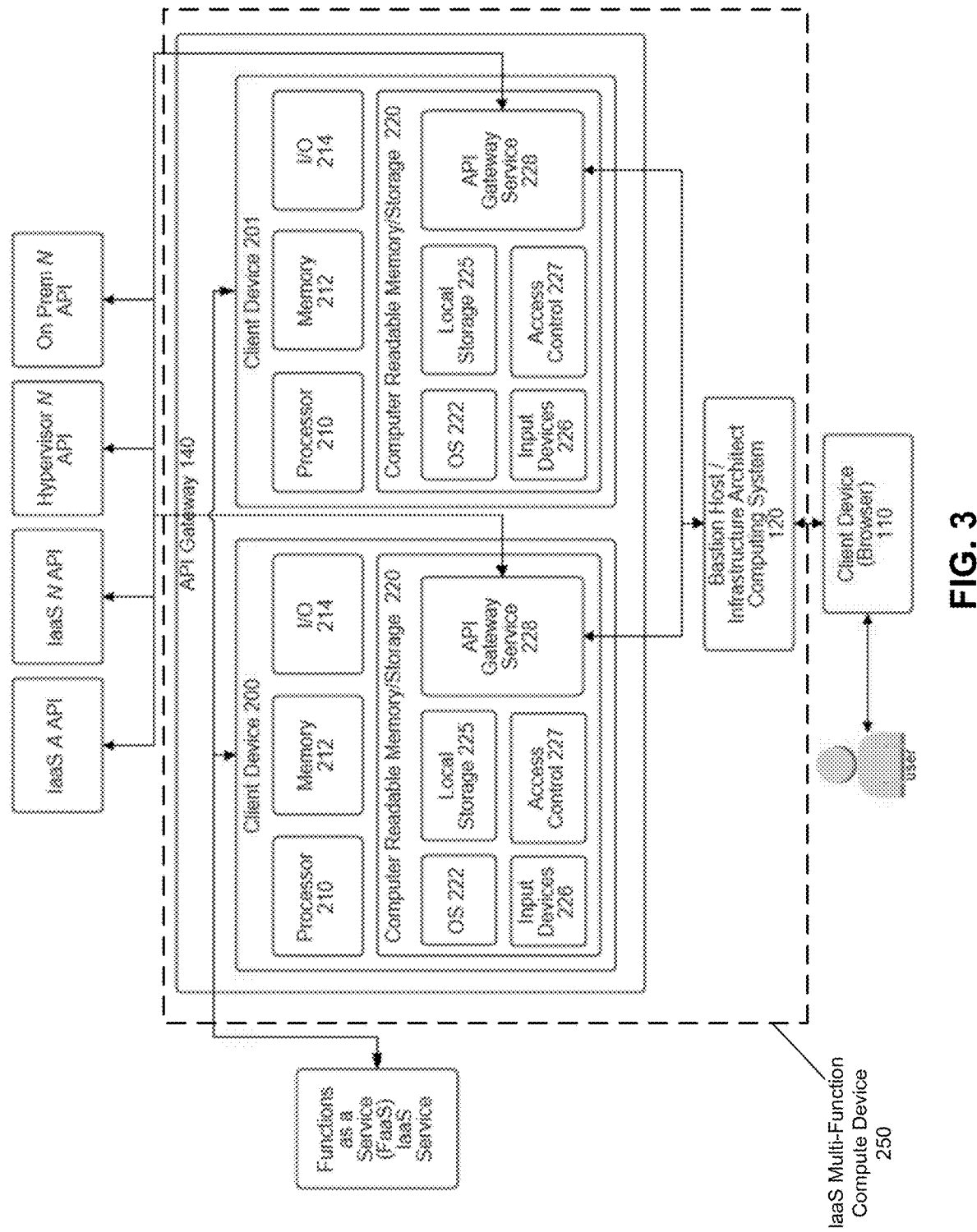
FIG. 3 illustrates an infrastructure as a service (IaaS) and DevOps command abstraction service computing device, in accordance with embodiments disclosed herein.

FIG. 3 illustrates an infrastructure as a service (IaaS) and DevOps command abstraction service computing device, in accordance with embodiments disclosed herein. The IaaS and DevOps Command Abstraction Service 140 may correspond with a highly available, self-healing, autoscaling cluster of servers designed to abstract the disparate nature of IaaS/Cloud API and CLI commands provided by various entities and/or vendors. IaaS and DevOps Command Abstraction Service 140 may provide a single point of abstraction, allowing users (e.g., DevOps developers, software developers, managers, security engineers, auditors, C-Suite leadership, etc.) the ability to view, control, alter, and expand services and tools deployed by the platform. The GUI provided to users may allow for visual definition of infrastructure and CICD pipeline control and definition.

IaaS and DevOps Command Abstraction Service 140 may be accessed using client device 110. For example, the user may operate client device 110 to initiate an authentication process (e.g., via an Internet Browser). Once authenticated, client device 110 may access IaaS Multi-Function Compute Device 250 Graphical User Interface (GUI). IaaS Multi-Function Compute Device 250 GUI may comprise a multi-page interface to perform work functions based on work duties.

Figure 3A:
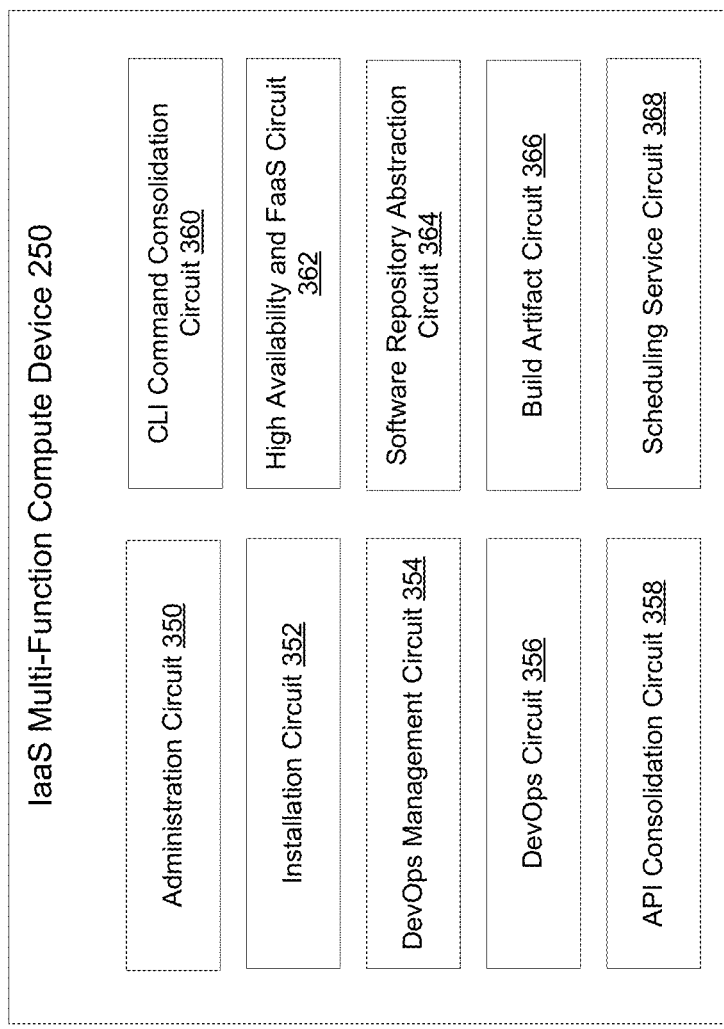
FIG. 3A illustrates an infrastructure as a service (IaaS) multi-function compute device, in accordance with embodiments disclosed herein.

As further illustrated in FIG. 3A, IaaS Multi-Function Compute Device 250 may perform various specialized functions described herein. These functions may include administration of the platform by administration circuit 350, installation of the platform by installation circuit 352, DevOps management by DevOps management circuit 354, DevOps by DevOps circuit 356, API consolidation by API consolidation circuit 358, CLI command consolidation by CLI command consolidation circuit 360, high availability and FaaS by high availability and FaaS circuit 362, software repository abstraction by software repository abstraction circuit 364, build artifact service by build artifact circuit 366, scheduling service by scheduling service circuit 368, and the like. Specifics of these functions executed by IaaS Multi-Function Compute Device 250 are described throughout the disclosure.

Figure 3B:
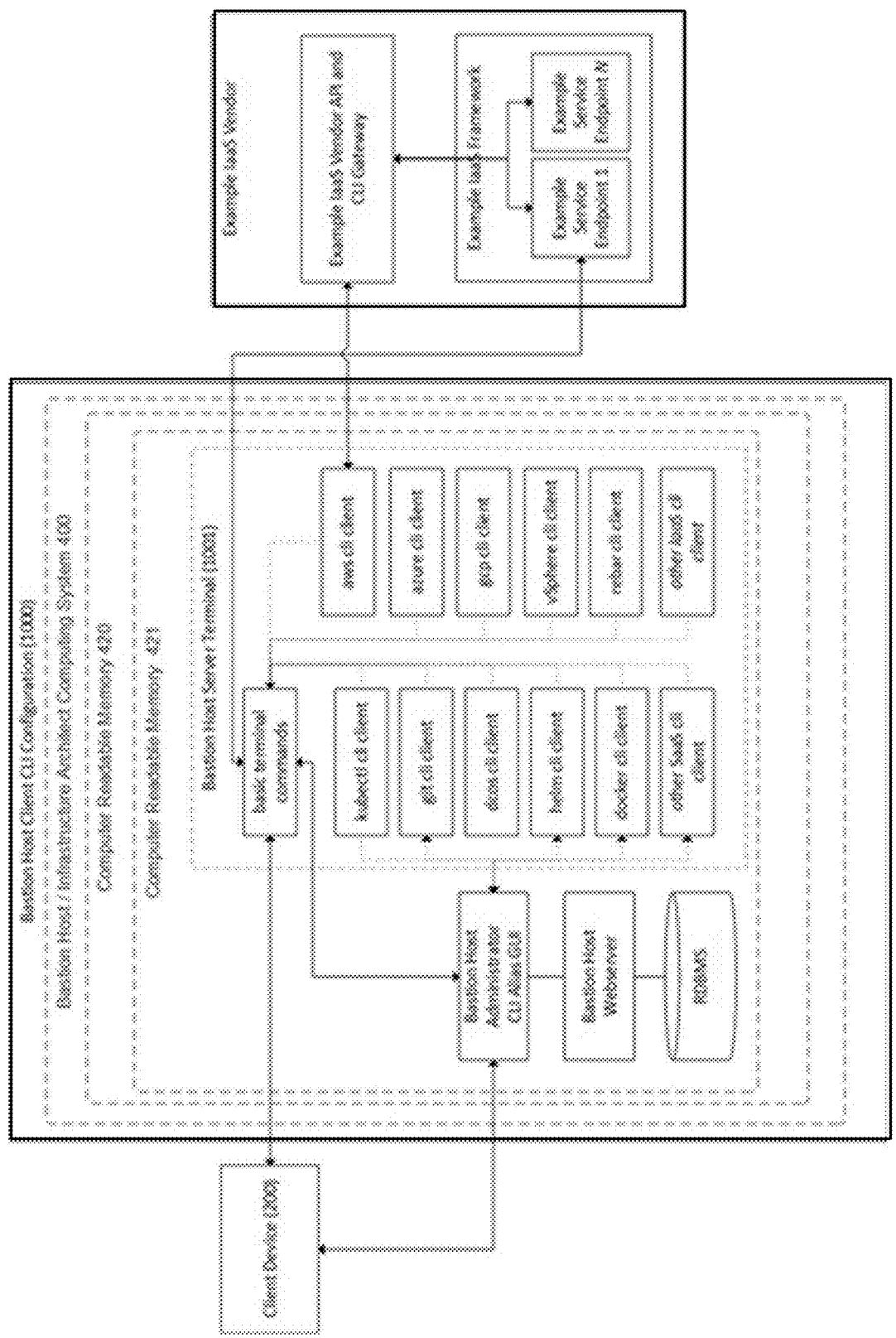
FIG. 3B illustrates an infrastructure as a service (IaaS) multi-function compute device, in accordance with embodiments disclosed herein.

As further illustrated in FIG. 3B, IaaS Multi-Function Compute Device 250 may also provide a unified CLI platform for all IaaS and SaaS CLI clients. The configurations of the CLIs available to the user are configured and stored by the Bastion Host CLI Alias GUI. By configuring and managing service and IaaS credentials, the user (e.g., DevOps and software developers, etc.) can use either the Bastion Host embedded CLI or the GUI (e.g., either associated with IaaS Multi-Function Compute Device 250) for controlling all provisioned services and IaaS Platforms from a "single-pane-of-glass".

When implementing the Bastion Host Server Terminal Service CLI Configuration, the user may access the Bastion Host Administrator CLI Aliases GUI. The user may configure credentials and parameters for each SaaS Service configured and provided by either the IaaS Multi-Function Compute Device or Services External to the IaaS Multi-Function Compute Device itself.

In some examples, the user defines the SaaS URL endpoint, testing connectivity, and saving the endpoint. The user then configures core service CLI commands such as Git, Build, Test, and Storage SaaS Services. Once saved, the configuration for the user may be forwarded via updating the Linux Server/etc/profile file, and configuring all aliases and environment variables for the terminal client of the bastion host. The resulting state may correspond with a single bastion terminal client containing the ability to interface with all SaaS Services without manually configuring individual clients.

When implementing the Bastion Host Server Terminal IaaS CLI Configuration, the user may access the Bastion Host Administrator IaaS Configuration GUI. The user may configure credentials and parameters for each IaaS Service configured and provided by either the IaaS Multi-Function Compute Device or Services external to the IaaS Multi-Function Compute Device 250 itself.

In some examples, the user defines the IaaS URL endpoint, testing connectivity, and saving the endpoint. The user then configures core service CLI commands such as AWS®, GCP®, Azure®, VMWare®, Oracle®, or other IaaS endpoints. Once saved, the configurations for the user may be forwarded via updating the Linux Server/etc/profile file, and configuring all aliases and environment variables for the terminal client of the bastion host. The resulting state may correspond with a single bastion terminal client containing the ability to interface with all IaaS Services without manually configuring individual clients.

The DevOps command abstraction service provides IaaS Multi-Function Compute Device 250 a consolidated list of commands, implemented with the express intention of creating a common set of CLI Service Calls to Services running on a given IaaS/Cloud Vendor. This capability allows the user (e.g., DevOps and software developers, etc.) the ability to learn and leverage a single collection of common commands to build and manage infrastructure and operating systems running on the IaaS/Cloud Vendor, without consideration of specific complexities of a given API or CLI implementation.

In some examples, IaaS/Cloud Vendors may intentionally implement APIs and CLI command in a non-standard method. This may attempt to implement a "vendor lock-in" of traditional services and attempt to prevent enterprise developers from shifting or migrating compute workloads and services between IaaS/Cloud Vendors (e.g., based on criteria such as price/cost, geographic constraints or capacity, service availability of a given vendor, etc.).

IaaS Multi-Function Compute Device 250 may access the DevOps command abstraction service. For example, the platform GUI provides a multi-page GUI to perform work functions (e.g., based on work duties, etc.). Relative to the DevOps command abstraction service, bastion host 120 may provide GUI access to all CLI commands via a browser-based HTML Command Line Interface (CLI). Authenticated users (e.g., DevOps and software developers, etc.) may transmit commands to from the client device 110 to Bastion Host 120 to the services within the framework. The services on the right side of Bastion Host 120 go to the IaaS/Cloud APIs 130. Responses may be received from IaaS/Cloud APIs via the browser. These API and CLI commands may be standardized behind platform-specific syntax, allowing for users to learn a single command structure. Additional detail is provided with FIGS. 7A, 7B, 7C, 7D for illustrative command structures of electronic calls to IaaS/Cloud Vendor APIs and CLIs.

The DevOps command abstraction service may be designed for highly available, self-healing, autoscaling service availability. These features may help ensure that no reasonable outage will occur to the service itself.

Leveraging Functions as a Service (or "FaaS"), individual servicers comprising the clustered Service may terminate and relaunch based on events monitored by the FaaS Service provided by the IaaS/Cloud Vendor. Rule-sets may be created ensuring any health response from a server deployed as part of the DevOps Command Abstraction Service "other than 200 OK" (a server status response code for a given IaaS/Cloud Vendor ensuring a server is in a "healthy" status) may be terminated.

A new server may then be provisioned and imaged. When imaging, the system may receive a purpose-built operating system stored in an artifact repository accessible by the DevOps Command Abstraction Service and hosted within a given IaaS/Cloud VPC. The system may also receive any system- or service-specific scripts required to accredit the new server. The new server may be confirmed by automated testing. Once available by confirmation of automated testing of the new server, the autoscaling group may add the server into production service. This may return the DevOps Command Abstraction Service to a healthy, properly auto-scaled state (e.g., "healthy" or similar binary state).

If system load requires additional capacity to expand the cluster server count, FaaS may trigger the expansion of the number of servers comprising the autoscaled Service. FaaS may trigger the provisioning of additional servers based on the response from FaaS interpreting and extrapolating increased workload server and capacity requirements. Load may be a measure of the amount of computational work that a computer system performs, and the load average may represent the average system load over a given period. It conventionally appears in the form of three numbers which represent the system load during the last one-, five-, and fifteen-minute periods. FaaS Services can leverage these values to determine if enough compute is fielded for a given cluster of services (known as a "load balancer", "Kubernetes Pod", or other, similar distributed Service).

Newly provisioned servers may receive the appropriate operating system image and hardening scripts provided by the platform services, and "round robin" add the server into production.

The "round robin" autoscaling method may ensure new servers added to the DevOps Command Abstraction Service cluster may be inserted sequentially across datacenters, regions, or availability zones (e.g., depending on the IaaS/Cloud Vendor's constraints on physical locations, etc.). This may ensure outages affecting a physical location or floors of a specific datacenter do not interrupt platform services or access to the IaaSes/Clouds themselves.

Figure 4:
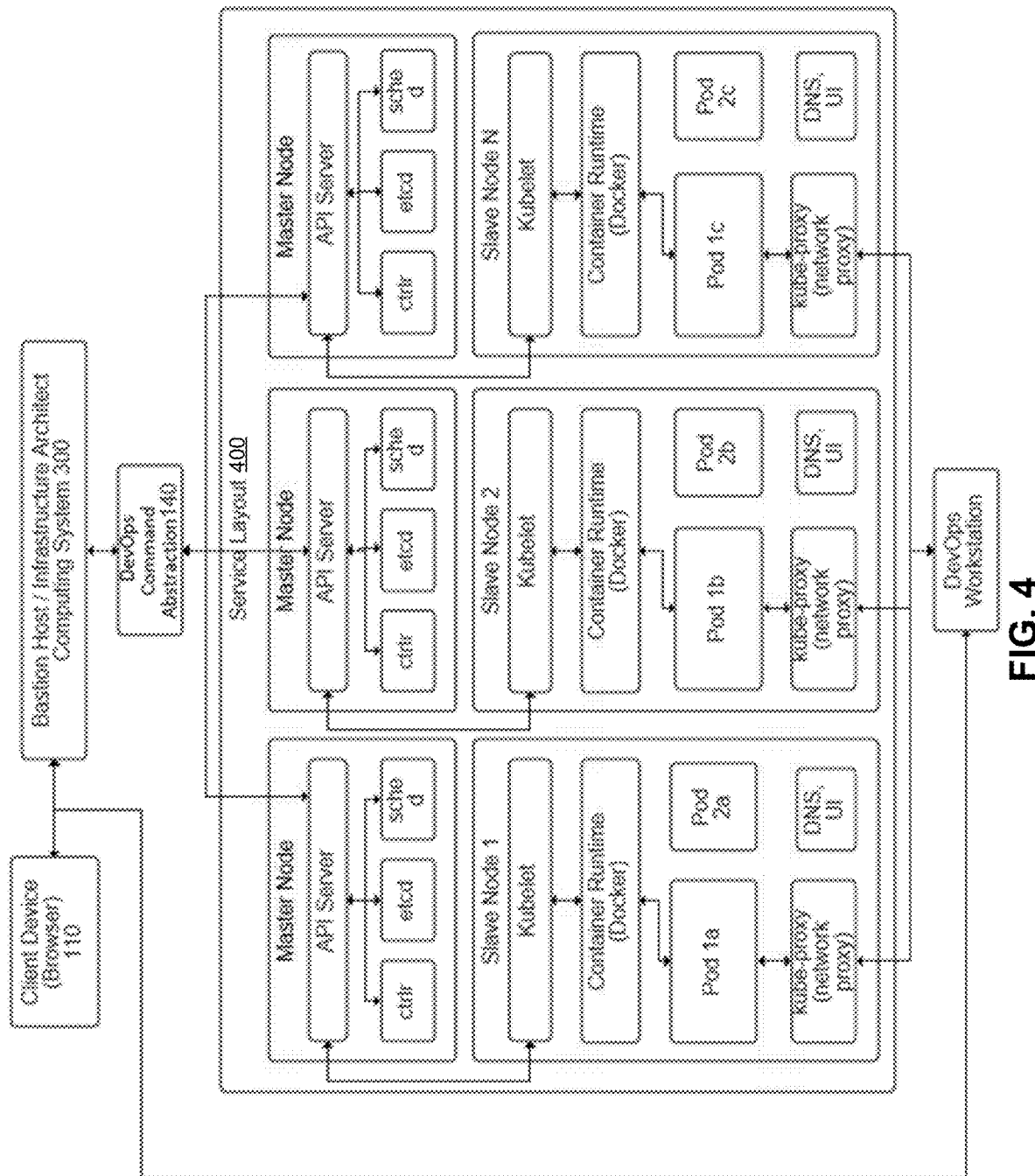
FIG. 4 is an illustrative service architecture, in accordance with embodiments disclosed herein.

FIG. 4 is an illustrative service architecture, in accordance with embodiments disclosed herein. Service layout 400 may consist of N number of client devices 110, Bastion Host 300 provisioned large enough to support the number of users (e.g., developers, etc.) accessing the system. This service layout 400 may correspond with an autoscaling, self-healing DevOps Command Abstraction Service 140 and a clustered service provider. This configuration may support any common API platform supporting containers, virtual machines (VMs) or bare-metal servers abstracted by APIs.

As an illustrative example, the containerized version of the system can run in front of various platforms provided by vendors, including Kubernetes®, Mesosphere® DCOS, or Docker Swarm. The IaaS/cloud vendor service can include all existing cloud providers. The IaaS service may be enabled by a highly-defined API abstracting compute provided by it. The system may also support on-premises, bare-metal service providers (e.g., such as Rebar, etc.).

IaaS Multi-Function Compute Device 250 may provide access to users. For example, users may access IaaS Multi-Function Compute Device 250 for installation and administration of the platform. This access may provide users with tools to buildout infrastructure, operating systems, committing and writing code via git, and manipulation and creation of build artifacts (e.g., images, software binaries, disk images, etc.) via bastion host 300. Bastion host 300 may, in turn, process the commands from the user to generate and submit form-driven, WYSIWYG (e.g., "what you see is what you get") commands, and CLI commands to the IaaS vendor APIs, platform framework APIs, and tools and service APIs.

Using this method for abstracting IaaS APIs and Compute APIs and CLI commands allows for a single plane of control, leveraging a homogenous control set. This homogeneity allows users (e.g., software developers and DevOps developers, etc.) the ability to shift workloads to different IaaS providers (e.g., based on cost, availability, or other factors).

By leveraging the abstraction inherent to Infrastructure as Code, the DevOps Developer user can utilize the system to build agnostic solutions, focusing on the logic of the infrastructure instead of splitting work between assuring API calls and CLI commands are accurate in complex deployment pipelines.

Furthermore, this method allows for expertise to be built by users against a single API and CLI command set, as opposed to learning IaaS/Cloud-specific APIs and the nuances intentionally created between them.

In some examples, the GUI may be written in a particular software language (e.g., GoLang®, etc.) and utilize a particular database (e.g., PostgreSQL® Database, etc.). The backend services supporting the GUI may be provided as a containerized pod, including a group of containers that are deployed together on the same host to form a service. In some examples, the backend services may be deployed to a production environment using any webserver (e.g., a webserver supporting GoLang®, backed by any Nix® derivative Relational Database Management System (RDBMS), etc.).

IaaS Multi-Function Compute Device 250 may support DevOps, including a set of practices that combines software development (Dev) and IT operations (Ops). This may shorten the systems development life cycle and provide continuous delivery with high software quality. DevOps may be complementary with Agile Software Development (e.g., set of methods and practices where solutions evolve through collaboration between self-organizing, cross-functional teams) and/or DevOps may share Agile methodology.

DevOps Operations may leverage tools that may be shared with software developers to manage, create, and terminate compute and infrastructure. The DevOps Operations may utilize software repository services and APIs based on the git protocol. In some examples, the repurposed repository tools include GitLab®, Microsoft® GitHub®, Atlassian® Bitbucket®, and JFrog® Artifactory®. Software Repository APIs may be used for DevOps Operations.

In some examples, platform-specific software repositories for DevOps may contain Infrastructure as Code ("IaC") such as Hashicorp® Terraform®, AWS® CloudFormation®, or Bash® Scripts®. These may be tools that help define infrastructure aspects as well as Virtual Private Cloud ("VPC") configurations, Network configurations, Identity and Access Management ("IAM"), and/or CIDR block definitions. These tools may also define IP schemas and parameters governing the infrastructure and user access to provisioned compute and resources such as storage and IaaS/Cloud Software as a Service ("SaaS") capabilities.

IaaS Multi-Function Compute Device 250 may provide continuous integration ("CI") and/or extreme programming ("XP"). These integration processes may help merge developers' working copies to a shared baseline several times in a development period (e.g., a day, more than once per day, etc.). DevOps leverages CI Tools to, for example, build code and web assets, while reusing dependency cache, run an automated test suites, and deploy block updates the production code that runs in the cloud. The continuous integration tools may comprise, for example, Atlassian® Bamboo®, GitLab®, Microsoft® GitHub®, and Jenkins®.

IaaS Multi-Function Compute Device 250 may provide continuous deployment and/or delivery ("CD"). Continuous delivery (CD) is a software engineering approach in which teams produce software in short cycles, ensuring that the software can be reliably released at any time and, when releasing the software, doing so manually. It aims at building, testing, and releasing software with greater speed and frequency. The approach may help reduce the cost, time, and risk of delivering changes by allowing for more incremental updates to applications in production. Continuous delivery may correspond with a repeatable deployment process. The CD tools may comprise, for example, Buddy®, JBoss®, Tomcat®, HUDSON®, Ant®, Rake®, Maven®, Crucible®, Fisheye®, Jenkins®, Puppet®, Chef®, Sonatype® Nexus®, JIRA®, Eucalyptus® and git/svn ("Subversion" Version Control Software)/Perforce®.

IaaS Multi-Function Compute Device 250 may provide a secret manager. The secret manager may correspond with a secure and convenient storage system for API keys, passwords, certificates, and other sensitive data. The secret manager provides a central place and single source of truth to manage, access, and audit secrets across IaaS/Cloud Services and provisioned compute. The secret manager may leverage, for example, Hashicorp® Vault®, AWS® Secrets Manager®, Keywhiz®, Confidant®, Strongbox®, Azure® Key Vault®, Knox®, as well as embedded secret management capabilities inherent to Kubernetes®, Docker®, and Mesosphere® DCOS®.

With these and other processing capabilities, alone or in the aggregate, the functionality of IaaS Multi-Function Compute Device 250 may provide a complete ecosystem of tools. The accessible user GUI of IaaS Multi-Function Compute Device 250 may provide an abstraction of the tools themselves, providing a "single-pane-of-glass" for each tool's capabilities. In some examples, a browser-based CLI may be embedded into the GUI itself to allow for users (e.g., DevOps Developers and Software Developers) the ability to send service-native commands to the IaaS/Vendor API and tool APIs, in the event that the user might need a feature not currently abstracted by the GUI itself.

Various user views may be provided into IaaS Multi-Function Compute Device 250 itself. For example, the user GUI may provide a DevOps View, an HTML abstraction of all underlying APIs, and/or a GUI abstraction of individual GUIs provided with each tool or service. The DevOps View may provide management and monitoring GUIs. The DevOps View may enable monitoring compute and service availability, service statuses, auditing capabilities, and report generation functionality.

For example, the administrator management GUI may provide an HTML representation of all configured APIs per user. These APIs can create self-documenting API reference lists for each Abstracted API. Each API will have an appended endpoint obfuscating the original API URL endpoint, allowing for renaming of endpoints on a consolidated URL. An example would be remapping the AWS® DynamoDB® API endpoint (https://dynamodb.us-west-2.amazonaws.com) to a corporate URL (https://dynamodb.us-west-2-aws.yourcompany.com).

IaaS Multi-Function Compute Device 250 may also provide a general user or manager view. This view may provide a GUI experience focused on administration activities. This may be helpful because system administrators for the platform are typically DevOps Developers. As such, they are tasked with 1) deploying the platform itself via installation methods, 2) initial configuration of the platform, following the Administrator's instruction manuals, 3) maintain the system during Operations, 4) Configuring DevOps pipelines and customizations to the platform itself, as well as Service deployments and pipelines building hardened Operating Systems, and 5) decommissioning of the platform, tenant spaces, IaaS deployments and migration of associated data between services.

While services provisioned by IaaS Multi-Function Compute Device 250 are also accessible via the services themselves directly, users and administrators may leverage the GUI of IaaS Multi-Function Compute Device 250 to perform various tasks. These tasks may include creating new repositories for software and IaC code, review and manage software baseline testing, "software linting" (e.g., a "linter" is a static code analysis tool used to flag programming errors, bugs, stylistic errors, and suspicious constructs), security auditing, and/or other platform management processes.

Figure 5:
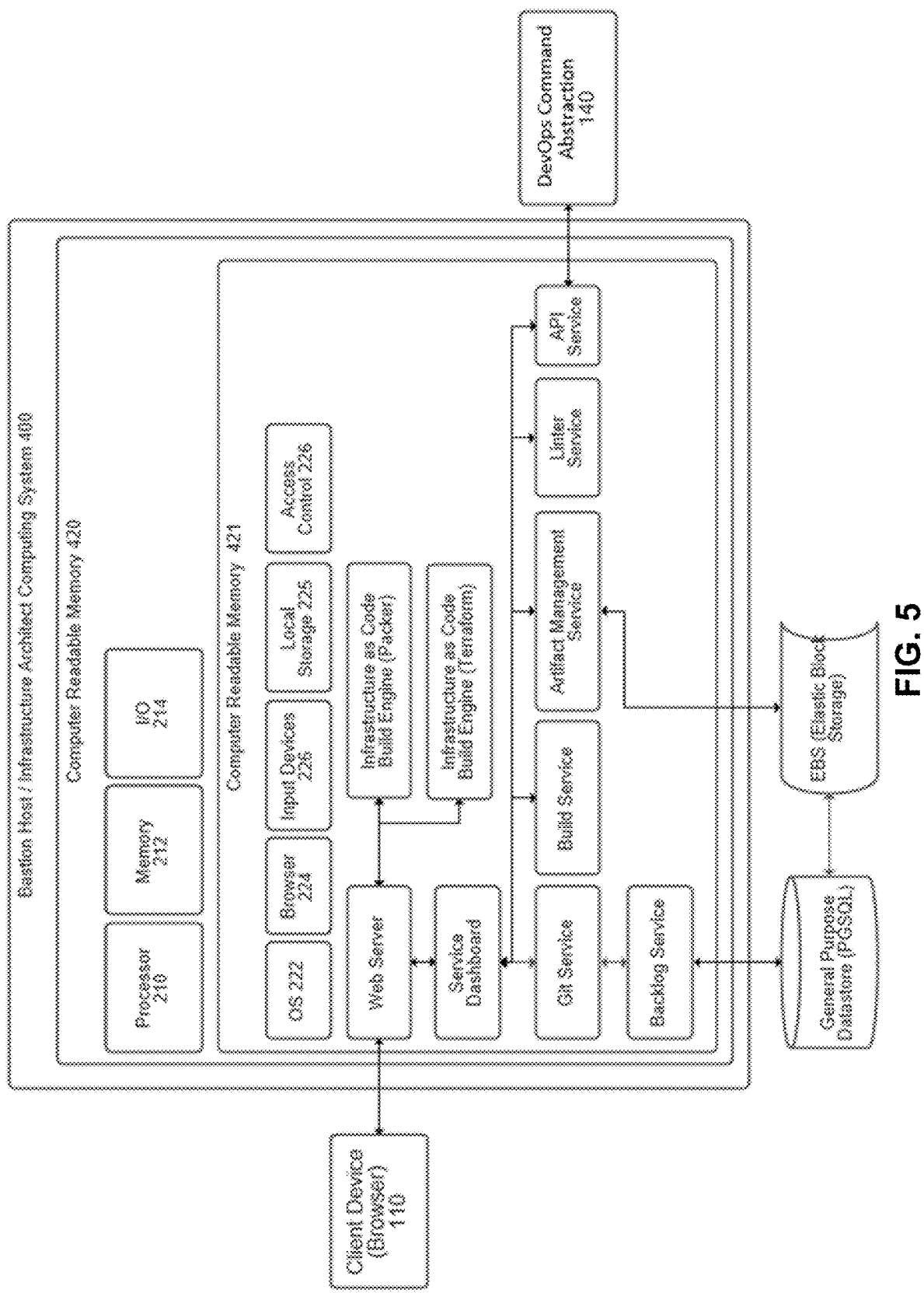
FIG. 5 illustrates an infrastructure architect computing system, in accordance with embodiments disclosed herein.

FIG. 5 illustrates an infrastructure architect computing system, in accordance with embodiments disclosed herein. Bastion Host 400 may provide a user with an interface to access IaaS Multi-Function Compute Device 250. This may include a figurative "single-pane-of-glass" that presents all SaaS, IaaS, and Services as a single, unified "ecosystem" of DevOps and developer tools. The user may authenticate to Bastion Host 400. Upon authentication, Bastion Host 400 may provide both a GUI to manage and administrate IaaS Multi-Function Compute Device 250, as well as unified access to API and CLI commands presented by the SaaS, IaaS, and Services created and deployed DevOps and developer tools and services.

Bastion Host 400, as illustrated, may be a Nix-based (e.g., Linux, version varies by customer) server running within an IaaS VPC. Other implementations are available without diverting from the essence of the disclosure. Bastion Host 400 may provide access via GUI to the various CICD Tools and Services contained within IaaS Multi-Function Compute Device 250. Bastion Host 400 may provide a unified CLI and API access to Tools and Services, both within IaaS Multi-Function Compute Device 250, as well as integrated external SaaS Tools and Services. This can complete the tool ecosystem. Bastion Host 400 may provide the ability to create DevOps CICD "pipelines" for generating operating system "nightly build" artifacts and highly-secured, automated infrastructure using a repeatable, hardened, and automated methodology, as described herein. Bastion Host 400 may be accessible by either a modern Internet browser and/or CLI tools such as Mac® Terminal and Windows® PuTTY.

Bastion Host 400 may be accessible via a GUI. Bastion Host 400 may run a containerized web server (e.g., Apache® HTTP Webserver) backed by a relational database management system (RDBMS) (e.g., containerized General-Purpose PostgreSQL® RDBMS, etc.). The GUI may be presented as a Kubernetes® Pod®. A user (e.g., System DevOps Administrator, etc.) can select any container framework currently employed within an environment (e.g., Amazon virtual private cloud (VPC), etc.). In some examples, the container framework may include GoLang®, Go Language, Kubernetes, and the like.

Bastion Host 400 may define operating system CICD pipelines. These pipelines may be able to create operating systems images. In some examples, the pipelines may be operating system agnostic so that the methodology can be applied to any NIX-based or Windows-based operating system. In some examples, the images can be built for any IaaS, Virtual (on-prem or Cloud-based) hypervisor, and bare-metal compute targets. The resulting images delivered from pipelines can be created for IMG, VMDK (VMWare), AMI (AWS Image), Azure Image, Google Image, ISO, QCOW, QCOW or any image file type required by the receiving computer. These pipeline nightly-build images can be used for containerized workloads.

Figure 5A:
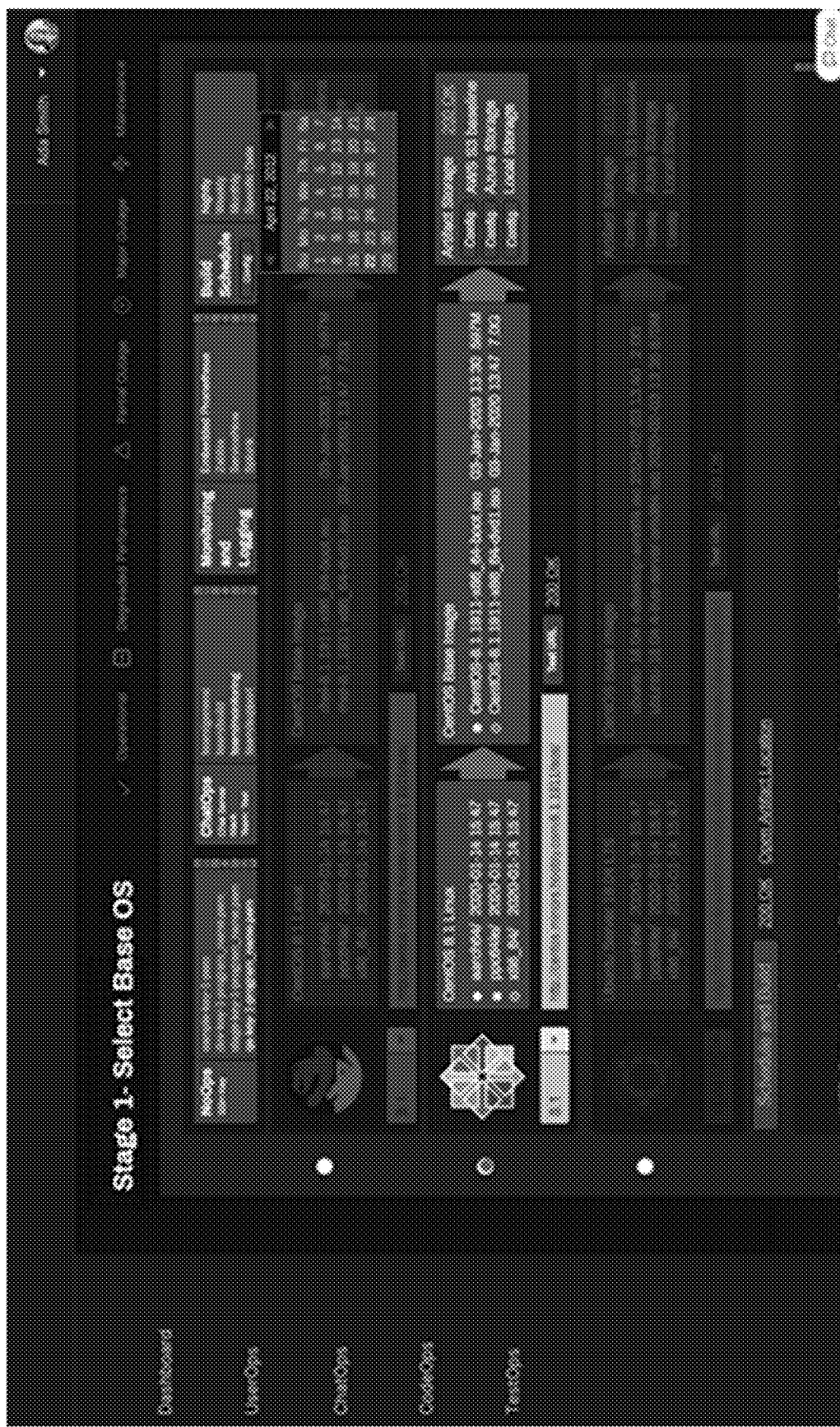
FIG. 5A is an illustrative interface for building a hardened operating system, in accordance with embodiments disclosed herein.
Figure 5B:
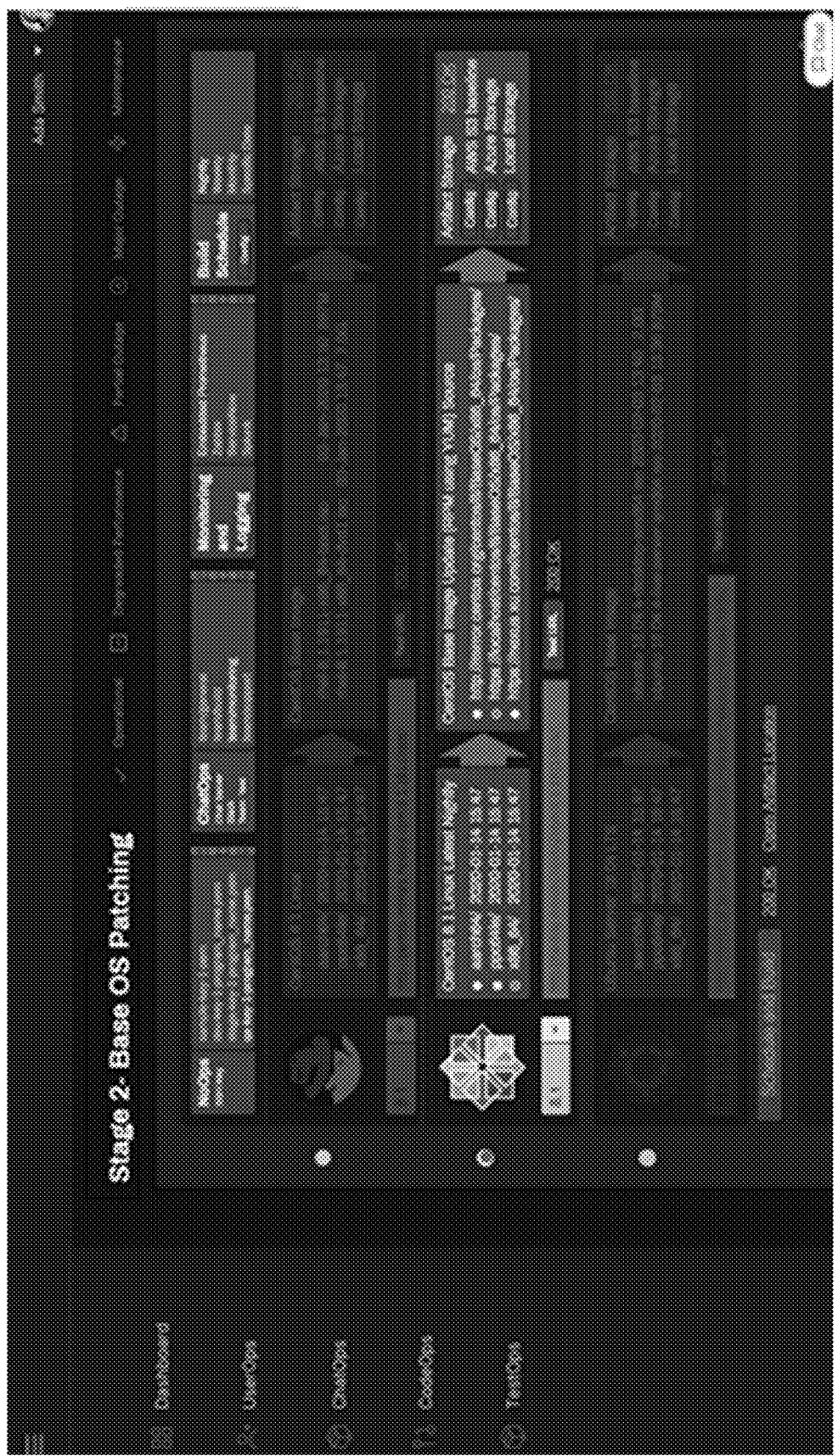
FIG. 5B is an illustrative interface for patching and building an operating system, in accordance with embodiments disclosed herein.
Figure 5C:
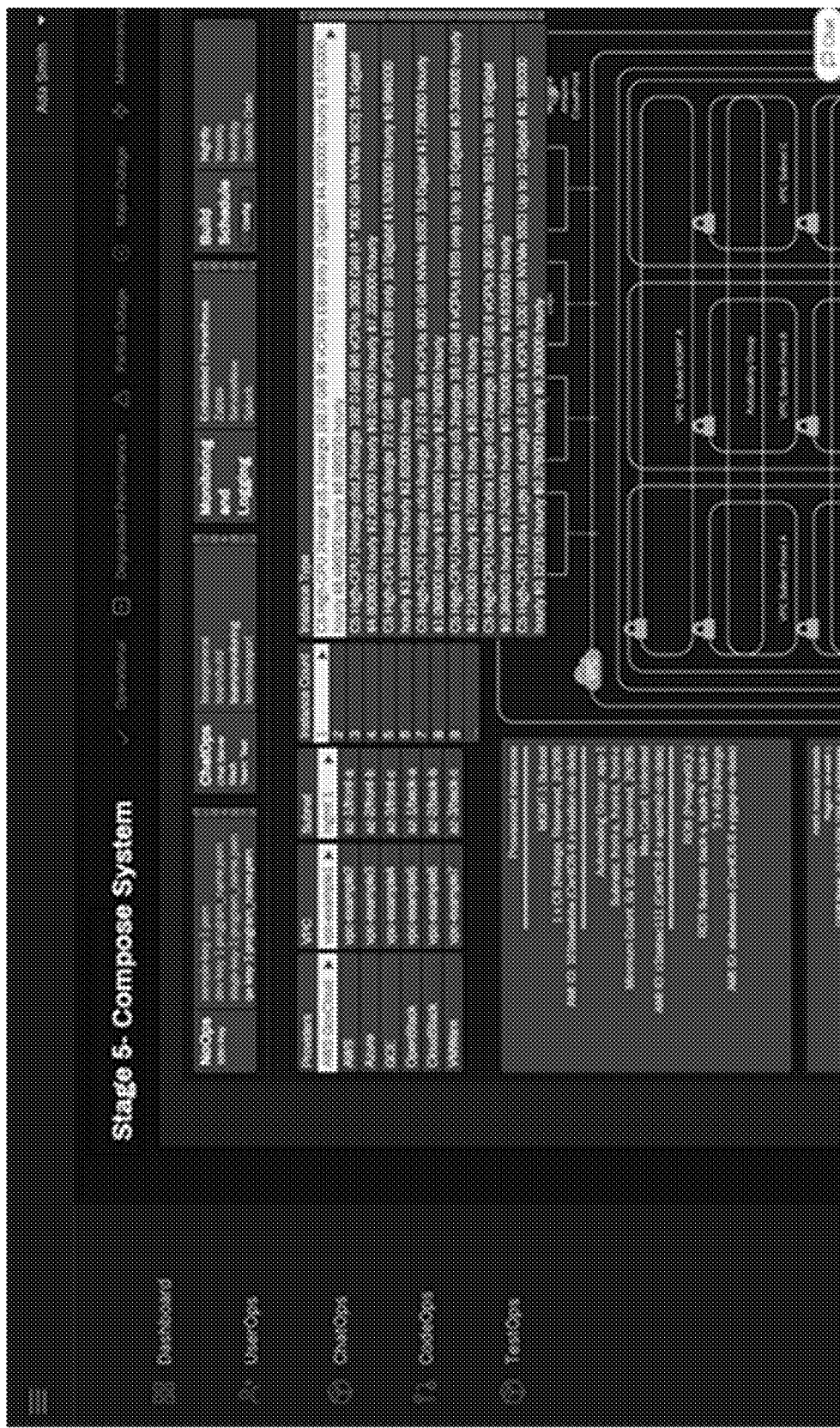
FIG. 5C is an illustrative interface for creating the hardened infrastructure using WYSIWYG and IaC, in accordance with embodiments disclosed herein.

Illustrative interfaces for generating the pipeline and image is provided with FIGS. 5A-5C. These interfaces may be provided as a GUI of IaaS Multi-Function Compute Device 250 accessible by client device 110. For example, in FIG. 5A, an illustrative interface for building a hardened operating system is provided and in FIG. 5B, an illustrative interface for patching and building an operating system is provided.

In some examples, IaaS Multi-Function Compute Device 250 implements an operating system CICD pipeline. The pipeline may receive a base image for a given operating system (e.g., directly from the OS Vendor or repository, etc.) and launch a temporary, ephemeral server either locally or on the IaaS/Cloud target service. The ephemeral server then installs the base OS image to the system. Once completed, the server then reaches into a particular software repository of choice (e.g., git-based, etc.), copies hardening scripts and scripts used to install software and components, executes the scripts, saves the server as a "reference image" to the Platform or IaaS/Cloud artifact repository. For containers, the image is saved to the Platform CICD Service. In some examples, e.g., for more traditional OS images, the artifact is either saved to IaaS Multi-Function Compute Device 250 artifact repository or an image repository service provided by the IaaS/Cloud vendor selected by DevOps Developers.

IaaS Multi-Function Compute Device 250 may also provide an Infrastructure Pipeline. This pipeline may comprise functionality that leverages infrastructure as code libraries and/or a visual WYSIWYG GUI of the proposed infrastructure. In FIG. 5C, an illustrative interface for creating the hardened infrastructure using WYSIWYG and IaC is provided, in accordance with embodiments disclosed herein.

IaaS Multi-Function Compute Device 250 may also provide CLI commands and a DevOps abstraction server. For example, the platform may utilize a pre-integrated browser based CLI. This service may provide pre-integrated, pre-configured functionality for interfacing with CLI capabilities and services for the CICD tools and services provided by the platform itself. These services include a client for managing a portion of the system (e.g., Kubectl®, a client for managing Kubernetes), a package manager (e.g., Helm®, a package manager for Kubernetes), a client for managing various web services (e.g., aws_cli®, a client for managing AWS via CLI), and any other IaaS/Cloud service provider for users.

IaaS Multi-Function Compute Device 250 may also provide an integrated view of all DevOps CICD Tools and Services. The integrated view may unify all service-provided GUIs (e.g., from various sources) into a single GUI. The GUI may provide, for example, a software repository, software testing, user authentication and management, CLI access to APIs and unified CLI commands via the DevOps Command Abstraction Service 140, as well as direct access into software and artifact repositories.

The GUI of IaaS Multi-Function Compute Device 250 may enable user groups and permissions to be defined in a single location. This may allow for granular access to specific tools and services. In some examples, this allows for "multi-tenant" access to the platform, including allowing for disparate groups (e.g., external developer teams, internal development teams, etc.) to work side-by-side.

Leveraging predefined "what you see is what you get" (WYSIWYG) methodologies, a user (e.g., DevOps developer) can create and save repeatable infrastructures and/or "nightly build" infrastructures. These pipelines may allow for the creation of one or more operating systems built and sent into production systems with the latest patches for both the operating systems and applications embedded into the OS itself.

Figure 6A:
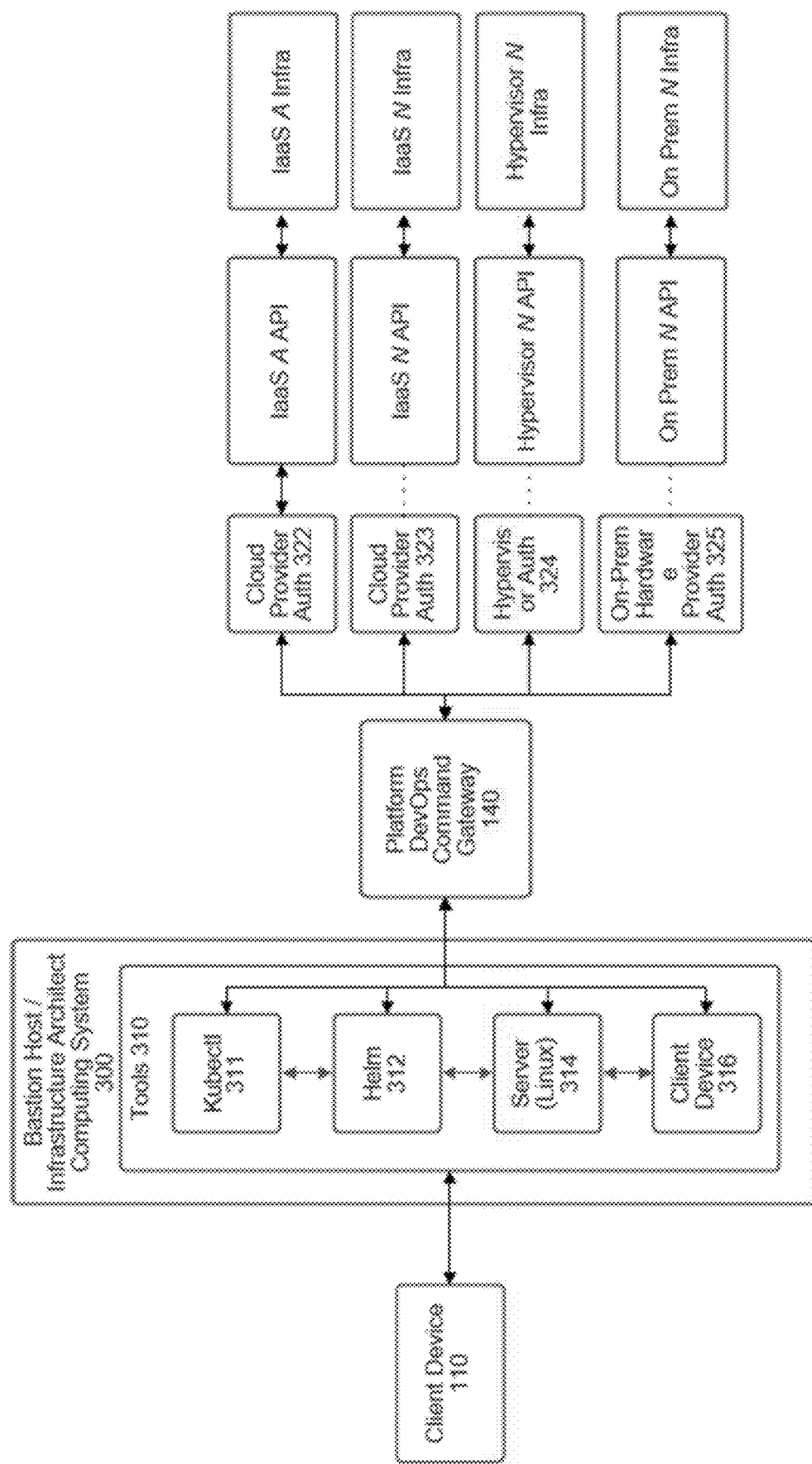
FIG. 6A illustrates an infrastructure as a service (IaaS) and DevOps command abstraction system, in accordance with embodiments disclosed herein.

FIG. 6A illustrates an infrastructure as a service (IaaS) and DevOps command abstraction system, in accordance with embodiments disclosed herein. Bastion Host 300 may comprise a bastion host command abstraction function 310. The platform bastion host command abstraction function 310 may provide a unified interface to communicate and build infrastructure on IaaS/Cloud Vendor platforms. The abstraction may allow for a single-pane-of-glass CLI and API interface to tools and services deployed within the selected framework. Prior examples of this functionality included Kubernetes, but any API may be able to be deployed with this system (e.g., Mesosphere® DC/Os®, Docker® Swarm, etc.).

In some examples, the abstraction can be extended into different, API-driven services. This may include the Hadoop® Ecosystem® (e.g., Big Data) including HDFS®, Zookeeper®, Spark®, Oozie®, Hue®, Apache® Flume®, Kafka® Services, and geospatial platforms. The system may be able to abstract any service or toolset providing an API (e.g., by providing a translation between the GUI and service, as illustrated herein).

Bastion Host 300 may comprise three primary ingress points to IaaS Multi-Function Compute Device 250, including the user's client device native terminal, the GUI embedded HTML Terminal as a function of the platform itself, or via the WYSIWYG GUI for respective tools and services. Additionally, IaaS Multi-Function Compute Device 250 may allow direct access to IaaS/Cloud Vendor APIs and CLI commands. The direct access may ensure that there is no vendor lock-in by IaaS Multi-Function Compute Device 250. The direct access may support the migration of data, components, services, and tools away from IaaS Multi-Function Compute Device 250.

The operating system installed within the server may embed several core client libraries. The embedding of libraries may facilitate a single-pane-of-glass to command and control the platform's framework directly. If users utilize direct-access methods to communicate the platform's framework, changes to the framework may be reflected within the infrastructure GUI immediately and accurately because the IaaS and Services are polled by the GUI of IaaS Multi-Function Compute Device 250 to see what the state of a given infrastructure deployment or service is. The change would be stored on the service. If a service changes (e.g., by a command of the user), when they return to the GUI, the GUI of IaaS Multi-Function Compute Device 250 will be refreshed to see the reflected change.

Bastion Host 300 may comprise one or more software packages as well, including kubectl 311 and helm 312. Helm 312 may provide management functions for Kubernetes applications. For example, Helm 312 may include charts that help define, install, and upgrade even the most complex Kubernetes application. kubectl 311 may comprise a command line interface for running commands against Kubernetes cluster.

Bastion Host 300 may also comprise one or more agents or communication connections running inside the host, including server (e.g., Linux) 314 and client device 316. For example, Bastion Host 300 may provide access to Linux instances running inside a cloud network (e.g., like an OpenStack® Neutron tenant network or an AWS® VPC).

Other software packages are available as well. For example, hdfs_client may include a client in Hadoop®. This may include an interface used to communicate with the Hadoop® Filesystem. There are different type of clients available with Hadoop® to perform different tasks. The basic filesystem client hdfs dfs command (e.g., hdfs dfs [COMMAND [COMMAND_OPTIONS]]) may be used to connect to a Hadoop® Filesystem and perform basic file related tasks. In another example, a DC/OS Enterprise Command Line Interface (CLI) may be implemented. The DC/OS CLI may include a cross-platform command line utility that a user-friendly way to manage Mesosphere® DC/OS clusters. The inclusion of these clients ensures positive control and access to the Platform frameworks, in the event that the Platform GUI is unavailable.

In some examples, communication between any one of tools 310, including kubectl 311, helm 312, server 314, or client device 316, may be transmitted to DevOps command abstraction service 140. DevOps command abstraction service 140 may translate the communication and transmit it to an authenticator, including cloud provider authenticator 322, cloud provider authenticator 323, hypervisor 324, or on-premises hardware provider authenticator 325.

As additional frameworks are identified for inclusion into IaaS Multi-Function Compute Device 250, a user may define and extend the base command structure to include new target frameworks. For example, a user may access Bastion Host 300 via CLI, first by authenticating against the Platform Authentication method. The user is then provided full, direct access to all Platform framework services via CLI.

In some examples, the Platform Ontology-Based API Framework ("POBA") function and method provide an API and CLI abstraction layer to the API, allowing for ontologically enhancing and unifying disparate IaaS, SaaS and PaaS API and CLI commands. Due to the fragmented, non-standards compliant nature of IaaS' API and CLI implementations and Service Offerings, as well as Service providing API and CLI access to a provided function or compute offering, the OBA provides a method to define an API ontology (or ontology network) and implement a unified "API of APIs", leveraging OpenAPI Specifications and W3C Standards (OWL, JSON-LD frames and SPARQL). The resulting POBA-defined API generates a "Semantic Web"-enhanced access method for unifying disparate APIs and CLI command sets. This method of abstraction simplifies the complexity of DevOps, Enterprise Automation, FaaS, CI/CD software building, Audit and Security Operations, containerized deployments, and Infrastructure Operations throughout an Enterprise Service Catalog.

In some examples, IaaS Multi-Function Compute Device 250 provides the ontology-based framework within the API Abstraction Service for creating REST APIs for knowledge graphs. The OBA, an Ontology-based API framework that given an ontology (or ontology network) as input, creates a machine readable format (e.g., JSON-based, etc.) REST API server that is consistent with the classes and properties in the ontology; and can be configured to retrieve, edit, add or delete resources from a knowledge graph. The OBA may use a W3C standard for accepting requests and returning results, while using SPARQL and JSON-LD frames to query knowledge graphs and frame data in JSON-LD.

In some examples, IaaS Multi-Function Compute Device 250 provides a method for automatically creating a documented REST OpenAPI specification from comprehensive Web Ontology Language (OWL). For example, the OWL may include a Semantic Web language designed to represent rich and complex knowledge about things, groups of things, and relations between things. OWL ontology may be combined with an interface or other means to customize it as needed (e.g., filtering some of its classes). Using OBA, new changes made to an ontology can be automatically propagated to the corresponding API, making it easier to maintain.

These and other features associated with computational processes of ontology segmentation are provided throughout the disclosure. In some examples, IaaS Multi-Function Compute Device 250 creates a server implementation based on the API specification to handle requests automatically against a target knowledge graph. The implementation may validate posted resources to the API and deliver the results in a machine readable format (e.g., JSON format, etc.) as defined in the API specification. In some examples, IaaS Multi-Function Compute Device 250 converts converting JSON-LD returned by a SPARQL endpoint into JSON according to the format defined in the API specification. In some examples, IaaS Multi-Function Compute Device 250 provides a mechanism based on named graphs for users to contribute to a knowledge graph through POST requests. In some examples, IaaS Multi-Function Compute Device 250 provides automatic generation of tests for API validation against a knowledge graph.

Figure 6B:
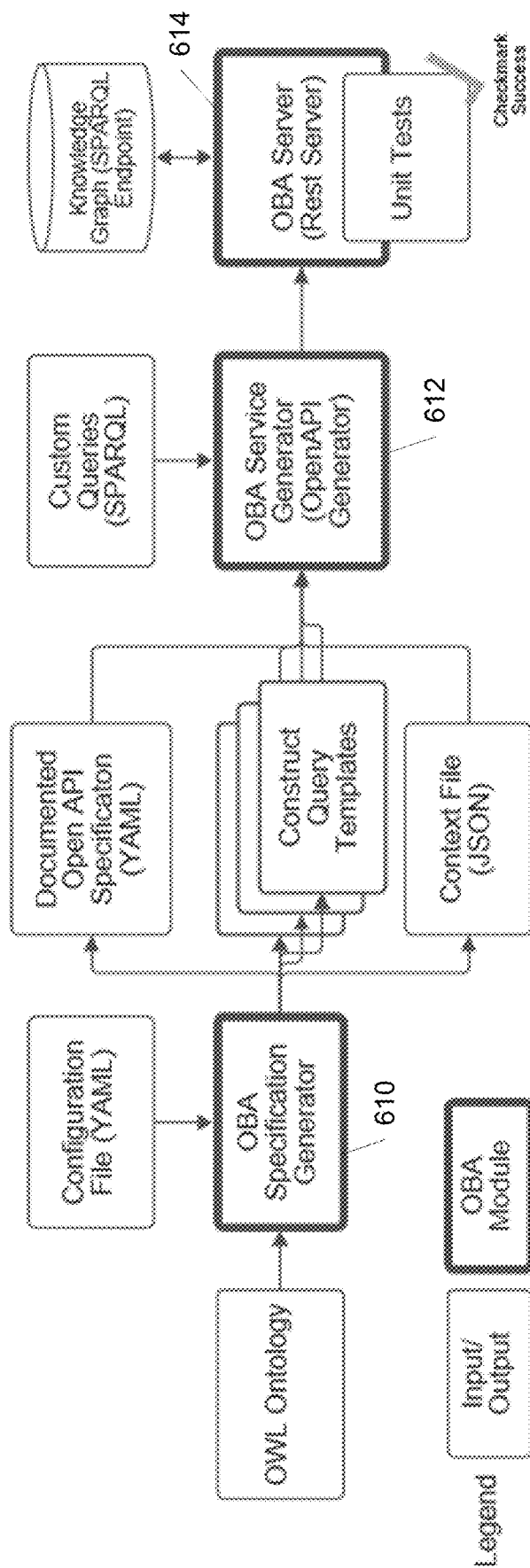
FIG. 6B illustrates an application programming interface (API) service Ontology-based API (OBA) framework, in accordance with embodiments disclosed herein.

FIG. 6B illustrates an application programming interface (API) service Ontology-based API (OBA) framework, in accordance with embodiments disclosed herein. In this illustration, an overview of the workflow following the OBA framework is provided. The process may begin with the target input ontology on the left and the resultant REST API on the right.

The OBA may consist of two main modules, including OBA Specification Generator 610 and OBA Service Generator 612. OBA Specification Generator 610 may create an API specification template from an input ontology. OBA Service Generator 612 may produce a server with a REST API for a target SPARQL endpoint.

The open API specification (OAS) may describe how to define operations (GET, POST, PUT, DELETE) and paths (i.e., the different API calls) to be supported by a REST API. Together with the information about the schemas that define the structure of the objects to be returned by each call, the OAS may also describe how to provide examples, documentation, and customization through parameters for each of the paths declared in an API.

In some examples, the OAS would have two data paths for each GET operation, and one data path for POST, PUT, and DELETE operations. For example, when a REST API is used for registering and returning regions around the world, OAS would have the paths '/regions' (for returning all available regions) and '/regions/{id}' (for returning the information about a region in particular) for the GET operation; the '/regions' path for POST;12 and the '/regions/{id}' path for PUT and DELETE operations.

The schema to be followed by an object in an operation may be described through its properties. As an illustrative example, a Region may be defined as a simple object with a label, a type, and a partOfRegion property which indicates that a region is part of another region. The associated schema would look as follows in OAS:
  Region:
    description: A region refers to an extensive, continuous part of a surface or body.
    properties:
      id:
        nullable: false
        type: string
      partOfRegion:
        description: Region where the region is included in.
        items:
          $ref: '#/components/schemas/Region'
        nullable: true
        type: array
      label:
        description: Human readable description of the resource
        items:
          type: string
        nullable: true
        type: array
      type:
        description: type of the resource
        items:
          type: string
        nullable: true
        type: array
      type: object In some examples, the partOfRegion property may return objects that follow the Region schema (as identified by '/#/components/schemas/Region'). The nullable parameter may indicate that the target property is optional.

The main OAS structure may map naturally to the way classes and properties are specified in ontologies and vocabularies. In some examples, the system may map each ontology class to a different path in the API specification. Each object property and data type property may be added in the target ontology to the corresponding schema by looking into its domain and range (e.g., complex class restrictions consisting on multiple unions and intersections are currently not addressed). Documentation for each path and property may be included in the description field of the OAS by retrieving the available ontology definitions (e.g., rdfs:comment annotations on classes and properties). Unions in property domains may be handled by copying the property into the respective class schemas (e.g., if the domain of a property is 'Person or Cat', the property will be added in the Person and Cat schemas). The properties declared in superclasses may be propagated to their child class schemas. Properties with no domain or range are by default excluded from the API, although this behavior can be configured in the application. By default, all properties are nullable (optional).

In some examples, IaaS Multi-Function Compute Device 250 may define two filtering features in OBA when generating the OAS to help interacting with the API. One filtering feature may allow specifying a subset of classes of interest to include in an API, since ontologies may contain more classes than the ones we may be interested in. An additional filtering feature may define a parameter on each GET path to allow retrieving entities of a class based on their label.

As a result of executing OBA specification generator 610, an OAS may be created in a computer-readable format (e.g., "YAML" or "YAML Ain't Markup Language" that is a human friendly data serialization standard for all programming languages). The computer-readable format may be inspected by ontology engineers manually or using an online editor. This specification can be implemented with OBA server 614 or by alternative means (e.g., by implementing the API by hand).

OBA Specification Generator 610 may also create a series of templates with the queries to be supported by each API path. These queries will be used by OBA server 614 for automatically handling the API calls. For example, the following query is used to return all the information of a resource by its id:
  CONSTRUCT {
    ?_resource_iri ?predicate ?prop.
    ?prop a ?type.
    ?prop rdfs:label ?label
  }
  WHERE {
    ?_resource_iri ?predicate ?prop
    OPTIONAL {
      ?prop a ?type
      OPTIONAL {
        ?prop rdfs:label ?label
      }
    }
  }

The "?_resource_iri" portion may act as a placeholder which is replaced with the uniform resource identifier (URI) associated with the target path. Returned objects may have one level of depth within the graph (e.g., all the outgoing properties of a resource) to avoid returning very complex objects. This may useful in large knowledge graphs (e.g., DBpedia, etc.) where returning all the sub-resources included within an instance may be too resource intensive or costly. However, this default behavior can be customized by editing the proposed resource templates or by adding a custom query. Together with the query templates, OBA may generate a computer-readable file (e.g., JSON-LD context file) from the ontology, which can be used by the server to translate the obtained results back to a second computer-readable format (e.g., JSON).

Once the OAS has been generated, OBA may create a script to set up a functional server with the API as a Docker image. OBA may also include a mechanism for enabling pagination, which can allow limiting the number of resources returned by the server.

Figure 6C:
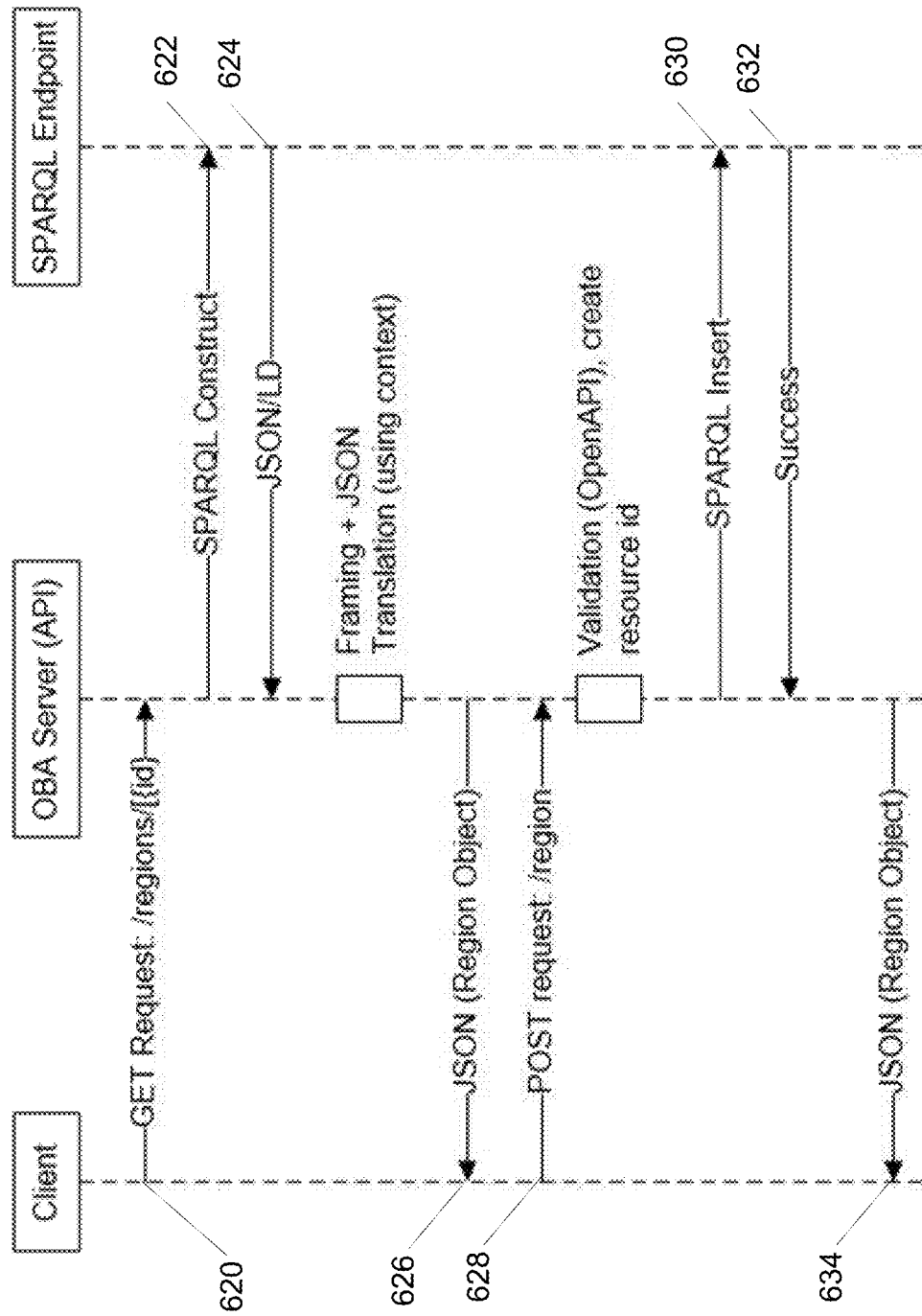
FIG. 6C is sample GET and POST request through the API abstraction service and OBA framework, in accordance with embodiments disclosed herein.

FIG. 6C is sample GET and POST request through the API abstraction service and OBA framework, in accordance with embodiments disclosed herein. A sequence diagram is illustrated with the steps to produce results from the OBA (e.g., in a target JSON) in GET and POST requests.

At block 620, a client device may submit a GET request to the OBA server. The GET request may comprise a "/regions/id" and the id can replace "?_resource_iri" in the template query.

At block 622, a SPARQL CONSTRUCT query may be created and transmitted to retrieve the result from a target knowledge graph. The query may be created automatically using the templates generated by OBA, parametrizing them with information about the requested path.

At block 624, the construct query returns a JSON-LD file from the SPARQL endpoint. The results may be framed to make sure they follow the structure defined by the API.

At block 626, the resultant JSON-LD may be transformed to JSON. In order to transform JSON-LD to JSON and viceversa, a mapping file may be kept with the API path to ontology class URI correspondence, which may be automatically generated from the ontology. The URI structure followed by the instances may be stored in a separate configuration file.

The OBA may use the specification generated from an input ontology to create a server with the target API. By default, the server is prepared to handle GET, POST, PUT and DELETE requests, which are addressed with CONSTRUCT, INSERT, UPDATE and DELETE SPARQL queries respectively. However, POST, PUT and DELETE requests need to be managed carefully, as they modify the contents of the target knowledge graph.

At block 628, a POST or PUT command may be issued from the client device. For POST and PUT, one of the main issues to address is handling complex objects, i.e., objects that contain one or multiple references to other objects that do not exist in the knowledge graph yet.

At block 630, the OBA may receive a POST request with a new region where partOfRegion points to other regions that do not exist yet in our knowledge graph through a recursive operation. If a resource does not have an id, OBA tries to insert all the resources it points to, validates the resource against the corresponding schema, and inserts it in the knowledge graph. If a resource already has an id, then it will not be registered as a new resource. When a new resource is created (block 632), the server assigns its id with a uuid, and returns it as part of the JSON result to return to the client device (block 634).

In the instance where block 630 includes a DELETE request rather than a POST or PUT request, the OBA may not use a recursive operation, as the system could potentially remove a resource referenced by other resources in the knowledge graph. The OBA may delete only the resource identified by its id in the request.

In some examples, the OBA defines a mechanism for different users to contribute and retrieve information from a knowledge graph. By default, users are assigned a named graph in the target knowledge graph. Each named graph allows users submitting contributions and updates independently of each other (or collaboratively, if they share their credentials).

Each user may be authenticated (e.g., through Firebase®, using an industry authentication standard and rule set, etc.). The authentication may be extensible to other authentication methods, if desired, such that users can retrieve all information from all available graphs or just their own graph.

OBA may define common template paths from an input ontology and more complex queries may be exposed for some users (e.g., web developers). For example, some users (e.g., knowledge engineers) may want to expose advanced filtering (e.g., return regions that start with "Eu"), have input parameters or complex path patterns (e.g., return only regions that are part of another region). These paths are impossible to predict in advance, as they depend on heterogeneous use cases and requirements. The OBA may support the functionality by supporting custom queries that expands or customizes any of the queries OBA supports by default.

Users may add a custom query for filtering or other functionalities. To add a custom query, users my first create a CONSTRUCT query in a file with the target query and second, edit the OAS with the path where the query needs to be supported. The OBA may use a query module (e.g., GRLC®) to accept the query (e.g., SPARQL), transmit it to the ontology, and create one or more APIs.

In some examples, the OBA may automatically generate unit tests for all the paths specified in the generated OAS (e.g., using Flask-Testing®, a unit test toolkit for Flask® servers24 in Python). Units tests may be configured to check if the data in a knowledge graph is consistent with the classes and properties used in the ontology, and to identify unused classes. The OBA may support unit tests for GET requests only, since POST, PUT and DELETE resources may need additional insight of the contents stored in the target knowledge graph. Unit tests may be generated as part of the server and may be invoked before starting up the API for user consumption.

Various tools may be provided to client devices to support an OAS in different languages. In some examples, the OpenAPI generator in OBA to create software packages for clients (e.g., to ease API management calls for developers). For example, in the code snippet below, the OBA retrieves the information of a region (with id 'Texas') and returns the result as a JSON object in a Python® dictionary without the need of issuing GET requests or writing SPARQL:

import modelcatalog
    # modelcatalog is the python package with our API
    api_instance=modelcatalog.ModelApi( )
    region_id="Texas"
    try:
    # Get a Region by its id
    region=api_instance.regions_id_get(region_id)
    print(region)
    # Result is a JSON object with the region properties in a dictionary except ApiException as e:
    print("Exception when calling ModelApi->regions_id_get: %s\n" % e)

Figure 6D:
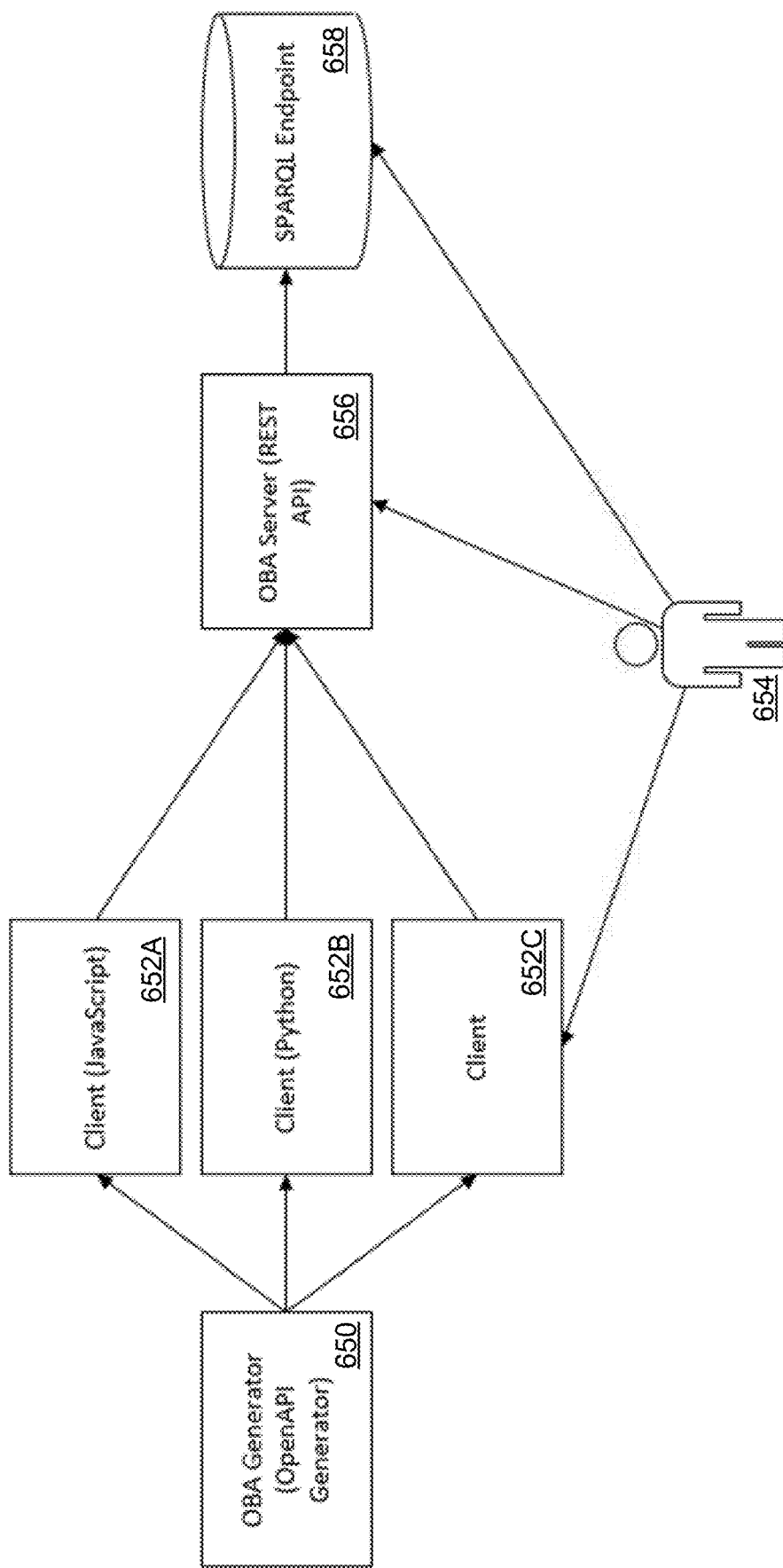
FIG. 6D illustrates client-side architecture for API abstraction service and OBA framework, in accordance with embodiments disclosed herein.

FIG. 6D illustrates client-side architecture for API abstraction service and OBA framework, in accordance with embodiments disclosed herein.

At block 650, the OBA generator (e.g., OpenAPI Generator) may be implemented with the system. The OBA generator may correspond with a tool designed to create API client libraries, server stubs, configurations, and documentation from OpenAPI 2.0 and 3.x documents. OBA generator may focus on ease of use. For example, the OBA generator may position itself as being a tool for reducing the burden on new development and technologies through the integration and leveraging of OpenAPI documents.

The OBA generator may provide code using various clients. For example, the clients may include a JavaScript client, Python client, or other client applications.

At block 652 (illustrated as blocks 652A, 652B, 652C), the client applications may generate and transmit a GET/POST request to the OBA server. The request may be received by the OBA server (e.g., at REST API).

In some examples, these communications may correspond with a draft OAS from a given ontology (without generating a server) by the OBA. Drafting the API allows knowledge engineers to discuss potential errors for misinterpretation, as well as easily detect errors on domains and ranges of properties.

At block 654, the user may transmit code to one or more clients (e.g., JavaScript client, Python client, or other client applications). The transmission may send the code in the target programming language to the client application.

At block 656, the user may generate and transmit a GET/POST request to the OBA server (e.g., via REST API).

At block 658, the user may generate and transmit a SPARQL query to the SPARQL endpoint.

The example client model describes demonstrating the different features of OBA for different ontologies: the ability to draft API specifications, the capabilities of the tool to be used for large ontologies and to filter classes when required; and the support for GET, POST, PUT and DELETE operations while following the best practices for RESTful design.

The resulting functionality provides a GUI-driven abstraction method for complex, disparate, ontologically-abstracted API calls, such as the API and CLI deltas between major IaaS Vendors and SaaS Services, facilitating a single, unified point of control for IaaS, SaaS, PaaS and Virtualized compute platforms.

FIG. 7A illustrates a data store with a plurality of platform commands to display infrastructure as code across a plurality of infrastructure as a service (IaaS) platforms, in accordance with embodiments disclosed herein. In some examples, the data store may comprise various gateway-infrastructure command references as illustrated herein.

The IaC platform may comprise various commands to operate functionality provided by the platform. These commands, for example, may be leveraged to display, create, and destroy infrastructure across any IaaS (e.g., cloud) platform. The commands may be run in collaboration with Packer® custom scripts for hardening state management of launched infrastructure and/or hardware policies.

Various categories of API calls may be implemented. For example, the API calls may include apply, console, destroy, fmt, force-unlock, get, graph, import, init, login, logout, output, plan, providers, refresh, show, state, taint, validate, untaint, and workspace. Other API calls may be implemented without diverting from the essence of the disclosure.

As an illustrative example, a first API call corresponding with Identifier 100 may comprise an "apply" command. This command may be used to apply the changes required to reach the desired state of the configuration, or the predetermined set of actions generated by a plan execution plan. If no explicit plan file is given on the command line, the system may create a new plan automatically and prompt for approval to apply it. If the created plan does not include any changes to resources or to root module output values, then the call may exit immediately without prompting.

When submitting the API call to IaaS Multi-Function Compute Device 250 via the interface, the user may construct the API call, as illustrated in FIG. 7A. For example, the "platform_name" may be replaced with the programmatic name of the platform utilized by the user, followed by "infra apply" and any options, directory, or plan (e.g., [options][dir-or-plan]). Other API call examples are illustrated without diverting from the scope of the disclosure.

FIG. 7B illustrates a data store with a plurality of platform commands to display infrastructure as code across a plurality of infrastructure as a service (IaaS) platforms, in accordance with embodiments disclosed herein. In some examples, the data store may comprise various platform DevOps command gateway commands for an operating system (OS) build as illustrated herein. These commands, for example, may be leveraged to display, create, and destroy operating system images across IaaS or cloud platforms.

Various categories of API calls may be implemented. For example, the API calls may include build, console, fix, inspect, and validate. Other API calls may be implemented without diverting from the essence of the disclosure.

As an illustrative example, a first API call corresponding with Identifier 201 may comprise an "build" command. This command may be used to build an operating system. When submitting the API call to IaaS Multi-Function Compute Device 250 via the interface, the user may construct the API call, as illustrated in FIG. 7B. For example, the "platform_name" may be replaced with the programmatic name of the platform utilized by the user, followed by "image build." Other API call examples are illustrated without diverting from the scope of the disclosure.

FIG. 7C illustrates a data store with a plurality of platform commands to display infrastructure as code across a plurality of IaaS platforms, in accordance with embodiments disclosed herein. In some examples, the data store may comprise various platform DevOps command gateway commands for platform core build as illustrated herein. These commands, for example, may be leveraged to run orchestrated, multi-tool infrastructure and OS build pipelines.

Various categories of API calls may be implemented. For example, the API calls may include build, console, fix, inspect, validate, audit, report, cost, score, and plan. Other API calls may be implemented without diverting from the essence of the disclosure.

As an illustrative example, a first API call corresponding with Identifier 302 may comprise an "console" command. This command may be used to initiate a console application associated with the platform core. When submitting the API call to IaaS Multi-Function Compute Device 250 via the interface, the user may construct the API call, as illustrated in FIG. 7C. For example, the "platform_name" may be replaced with the programmatic name of the platform utilized by the user, followed by "console." Other API call examples are illustrated without diverting from the scope of the disclosure.

FIG. 7D illustrates a data store with a plurality of platform commands to display infrastructure as code across a plurality of infrastructure as a service (IaaS) platforms, in accordance with embodiments disclosed herein. In some examples, the data store may comprise various platform DevOps command gateway commands for Git command references as illustrated herein.

Various categories of API calls may be implemented. For example, the API calls may include config, init, clone, status, add, diff, checkout, reset, commit, branch, checkout, merge, rm, stash, log, reflog, tag, reset, revert, fetch, pull, push, and cat. Other API calls may be implemented without diverting from the essence of the disclosure.

As an illustrative example, a first API call corresponding with Identifier 401 may comprise an "config" command. This command may be used to configure a global variable associated with the Git repository. When submitting the API call to IaaS Multi-Function Compute Device 250 via the interface, the user may construct the API call, as illustrated in FIG. 7D. For example, the "platform_name" may be replaced with the programmatic name of the platform utilized by the user, followed by "git config" and any options (e.g., [-global user.name "Your Name"]). Other API call examples are illustrated without diverting from the scope of the disclosure.

Figure 8:
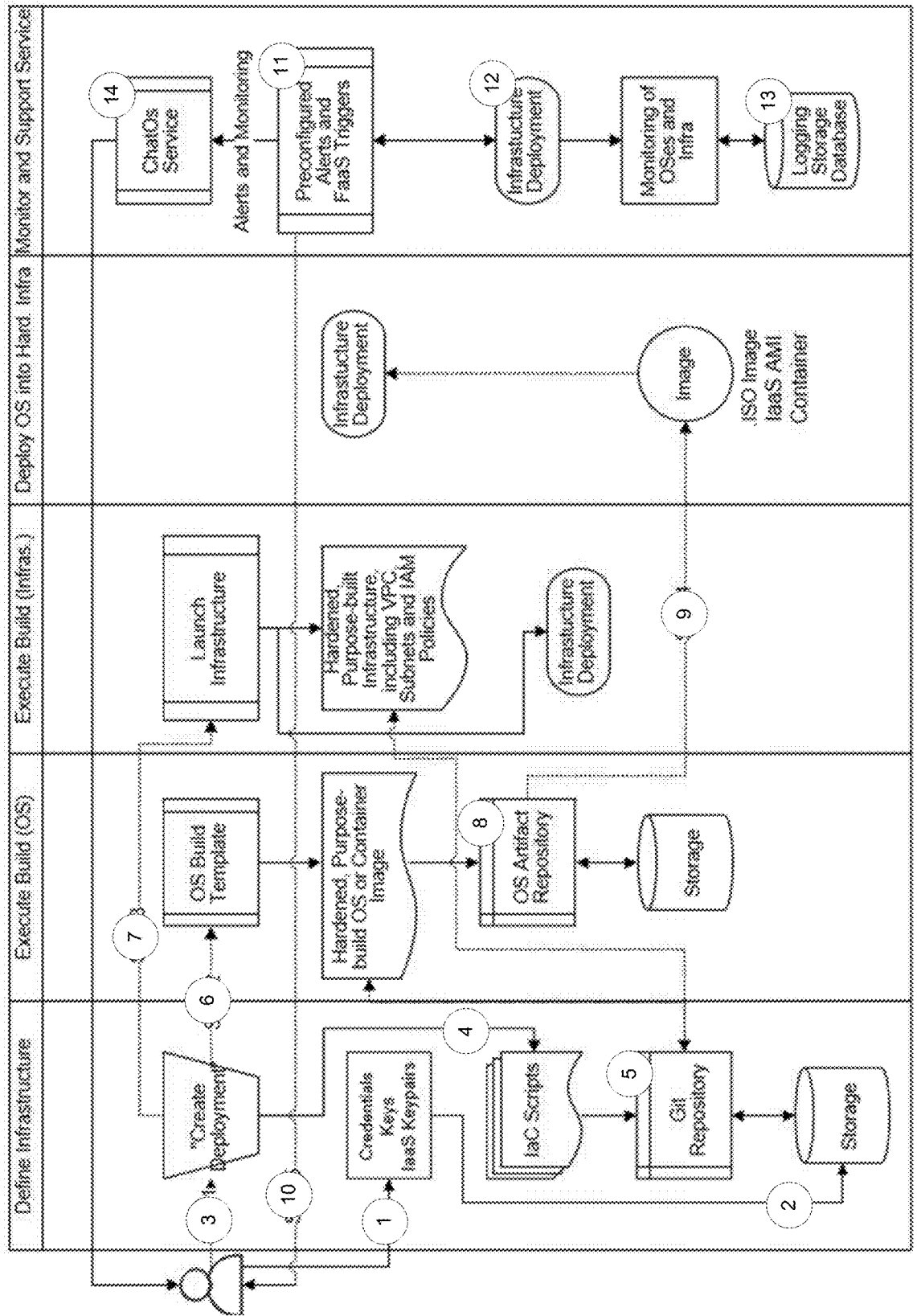
FIG. 8 illustrates a method for using a platform to define, launch, and manage net-new infrastructure, in accordance with embodiments disclosed herein.

FIG. 8 illustrates a method for using a platform to define, launch, and manage net-new infrastructure, in accordance with embodiments disclosed herein. This illustration may include a DevOps process for defining, building, deploying, monitoring, and supporting the deployment of net-new Infrastructure using the Platform, DevOps, ChatOps, and CICD Tools and Services provided by IaaS Multi-Function Compute Device 250. This process may be executed and repeated for building any type of infrastructure using IaaS Multi-Function Compute Device 250 and may serve as a DevOps pattern for development.

At block 1, the method may select the IaaS/Cloud Provider. For example, the user may possess administrator rights to a Tenant Space provisioned in a particular IaaS/Cloud Provider. With administrator rights, the IaaS/Cloud Provider credentials may be configured using an administrator panel of the GUI of IaaS Multi-Function Compute Device 250. The method may create and publish a Service SSH public key and private keypair. A keypair may be applied to the GUI within a user profile GUI, as well as the particular Git Repository Software.

At block 2, the method may identify and define the infrastructure. For example, using the GUI of IaaS Multi-Function Compute Device 250, the user (e.g., DevOps Developer) may generate IaC using the creator GUI of IaaS Multi-Function Compute Device 250. As discussed herein, examples of the IaC may include Hashicorp® Terraform AWS® CloudFormation or other state-defining Infrastructure as Code. Examples of the creator GUI may include various WYSIWYG ("What You See Is What You Get") graphical user interfaces.

The method may commit the underlying IaC code to the platform software repository. In some examples, each IaC Build may require a dedicated platform software repository. In some examples, using a client device, Infrastructure as Code scripts may be created. The scripts may be uploaded to the appropriate platform software repository.

The method may identify an industry standard for hardening. This may correspond with a standard identified by an internal corporate governance organization of the tenant's choice. Some examples of standards may include Center for Internet Security (CIS), DISA ("Defense Information Systems Agency") STIG ("Security Technical Implementation Guide"), International Organization for Standardization (ISO), SysAdmin, Audit, Network, and Security (SANS) Institute, or National Institute of Standards and Technology (NIST).

At block 3, the infrastructure logical architecture may be defined. For example, the virtual private network(s) and subnetting logical architecture may be defined. When defining the subnetting logical architecture, this may include defining the regions and availability zones for the subnetting schema to traverse. This may be critical for ensuring workloads span physical datacenters to create a "highly available" architecture that can suffer outages across regions, availability zones, and physical datacenters and locations.

In some examples, Classless Inter-Domain Routing (CIDR) blocks may be defined. The CIDR blocks may be implemented to allocate internet protocol (IP) addresses and for IP routing. The subnetting schemas may also be defined for divvying up CIDR IP blocks. In some examples, the CIDR subnetting allocation ensures enough IPs are available to handle autoscaling events of the services deployed within a given VPC. The subnetting allocation may be compared with a threshold value to determine whether there are enough IPs available.

In some examples, defining the infrastructure logical architecture may include defining Identity and Access Management (IAM) Policies affecting VPCs and/or defining CDN connectivity from the SaaS Service to the VPC or subnet.

At block 4, the IaC scripts may be created. For example, the IaC scripts may manage and provision computer data centers through machine-readable definition files, rather than physical hardware configuration or interactive configuration tools.[1] The IT infrastructure managed by this process comprises both physical equipment, such as bare-metal servers, as well as virtual machines, and associated configuration resources. The definitions may be in a version control system. It can use either scripts or declarative definitions, rather than manual processes, but the term is more often used to promote declarative approaches.

At block 5, the Git Repository for IaC Scripts may be created. For example, using IaaS Multi-Function Compute Device 250 software repository service, a new IaC repository may be defined. The creation process may also include assigning access rights. In some examples, ChatOps integrations may be created for alerting, including Chat Channels to receive events and support troubleshooting activities.

At block 6, an Infrastructure as Code "template" may be created. The IaC template may contain the details for the infrastructure parameters to be implemented on the IaaS/Cloud Provider equipment and services.

Example parameters may include build variables. These build variables may include (but are not limited to) Target IaaS/Cloud Vendor, User/Automation Access Keys and Secrets, regions within the IaaS/Cloud vendor service selected, target VPC for the IaaS/Cloud vendor service selected, target Availability Zone ("AZ") for the IaaS/Cloud vendor service selected, select the IaaS/Cloud Virtual Private Cloud ("VPC") to be utilized, server Hardware Types (sometimes referred to as "Flavors") to be utilized by the launched application as autoscaling services, define local system credentials (if required), execution parameters for the launching of any hardening scripts at runtime, define the IaaS/Cloud Region to receive the build, define the IaaS/Cloud availability zones (or "AZs") to receive the build, define the Identity and Access Management (or "IAM") policies to be applied to the deployed Infrastructure, and define the provisioning of IaaS/Cloud Services required. These services may include relational databases, FaaS, storage, software and container repositories, container frameworks, and ancillary services.

At block 7, the hardened, purpose-built infrastructure may be built. For example, using the GUI of IaaS Multi-Function Compute Device 250 for creating hardened infrastructure, the process may execute the build and observe the industry standard scores provided by the automated deployment. In the event a score is lower than expected (e.g., 75% passing score for the built OS, vice ~90%), the method may remediate the hardening script and rerun the build.

At block 8, the hardened, purpose-built IaC may be stored to a Git service repository. In some examples, the method may identify and define the software repository to be utilized once a successful infrastructure build is complete. These solutions can include multiple locations, such as platform-provided Sonatype® Nexus Repository® or any git-based repository service or toolset.

At block 9, the hardened, purpose-built infrastructure may be launched. For example, the method may execute the build of the infrastructure via the GUI of IaaS Multi-Function Compute Device 250 and observe the results of both automated testing and the build execution itself.

The IaaS multi-function compute device may implement a load balancer. For example, the load balancer may map IaaS service to various requirements and capabilities. In some examples, the load balancer may distribute network traffic across multiple servers. This may ensure that no single server bears too much demand, including processing tasks associated with the network traffic over a threshold value. By spreading the work evenly, load balancing can improve application responsiveness and may also increase the availability of applications and websites for users.

In some examples, the load balancer may manage the flow of information between the server and an endpoint device (e.g., PC, laptop, tablet, smartphone, etc.). The server could be on-premises, in a data center, or the public cloud, including instances where the server is physical or virtualized.

The load balancer may help servers move data efficiently, optimize the use of application delivery resources, and prevent server overloads. Load balancers may conduct continuous health checks on servers to ensure they can handle requests. If necessary, the load balancer may remove unhealthy servers from the pool until they are restored. The load balancers may trigger the creation of new virtualized application servers to cope with increased demand.

There is a variety of load balancing methods, which use different algorithms best suited for a particular situation. For example, a least connection method may direct traffic to the server with the fewest active connections. The least connection method may be implemented when there are a large number of persistent connections in the traffic unevenly distributed between the servers. In another example, a least response time method may direct traffic to the server with the fewest active connections and the lowest average response time. In another example, a round robin method may be implemented to rotate servers. The rotation of the servers may direct traffic to the first available server and then move that server to the bottom of the queue. The round robin method may be implemented when servers are of equal specification and there are not many persistent connections. In another example, an IP Hash method may use the IP address of the client to determine which server receives the request.

At block 10, hardened, purpose-built infrastructure and services may be monitored. For example, using the GUI of IaaS Multi-Function Compute Device 250 monitoring page, the method may observe the newly launched infrastructure and services to ensure the deployment functions as designed.

At block 11, any notifications may be provided. This may include alert events based on hardened, purpose-built infrastructure. In some examples, IaaS Multi-Function Compute Device 250 design pattern for launching operating systems, infrastructure and containerized workloads implement the concept of autoscaling, load balancing, and self-healing deployments backed by Functions as a Service (or "FaaS").

For example, an autoscaling ruleset may define three specific, absolute values: A lower bound for the metric value, an upper bound for the metric value, and the amount by which to scale servers, based on the scaling adjustment type. In the event the metric being monitored by the FaaS Service sees the value read from the clustered service "break" the upper or lower bounds of the set metric, a triggering event will occur, either adding or taking away nodes (or servers) from an autoscaling group. The autoscaling group may continue to adjust itself until it reaches either the minimum threshold and node count, or equilibrium (assuming no top limit to node count or IaaS/Cloud compute quota limits the group or tenant themselves.

At block 12, the method may automate hardened, purpose-built operating system "Self-Healing" using FaaS. For example, the method may create parameters for self-healing of the deployed services. The parameters may define conditions for determining that a hardened, deployed infrastructure component is identified as "unhealthy" (e.g., including a server, service, or autoscaling group). The parameters may correspond with an action that the system executes to respond to an unhealthy state. The method may be saved to the GUI of IaaS Multi-Function Compute Device 250, which writes the function to the FaaS Service implemented.

In some examples, the self-healing triggering may be tested and observed for the corresponding action. the action may identify the FaaS automation and ensure the faulty infrastructure is isolated immediately.

At block 13, the infrastructure and service logs may be stored using platform-provided services. For example, using the GUI of IaaS Multi-Function Compute Device 250, the receiving service for Service and Infrastructure Logs may be identified and configured. After launching a hardened server, the logs for the new functionality may be reported. The method may ensure that the logs are reported within a threshold amount of time and/or without a threshold amount of errors (e.g., accurately and timely) in a platform monitoring service.

In some examples, various monitoring services may be available for log monitoring and alerting to be implemented by IaaS Multi-Function Compute Device 250. Some monitoring services may include Zabbix®, Zenoss®, SolarWinds® Security Event Manager, Datadog®, SolarWinds® Papertrail, Loggly®, ManageEngine® EventLog® Analyzer, Sematext® Logs, Paessler® PRTG Network Monitor, Splunk®, Fluentd®, Logstash®, Kibana®, Graylog®, XpoLog®, ManageEngine® Syslog Forwarder, Managelogs®, Graylog®, Graphite® with Grafana®, or other multiple competing applications and platforms.

At block 14, the method may generate reports for infrastructure services, applications, and servers. These reports may be stored in a repository. In some examples, these reports may be used by the reporting GUI of IaaS Multi-Function Compute Device 250 and/or used to generate additional reports for the user.

Figure 9:
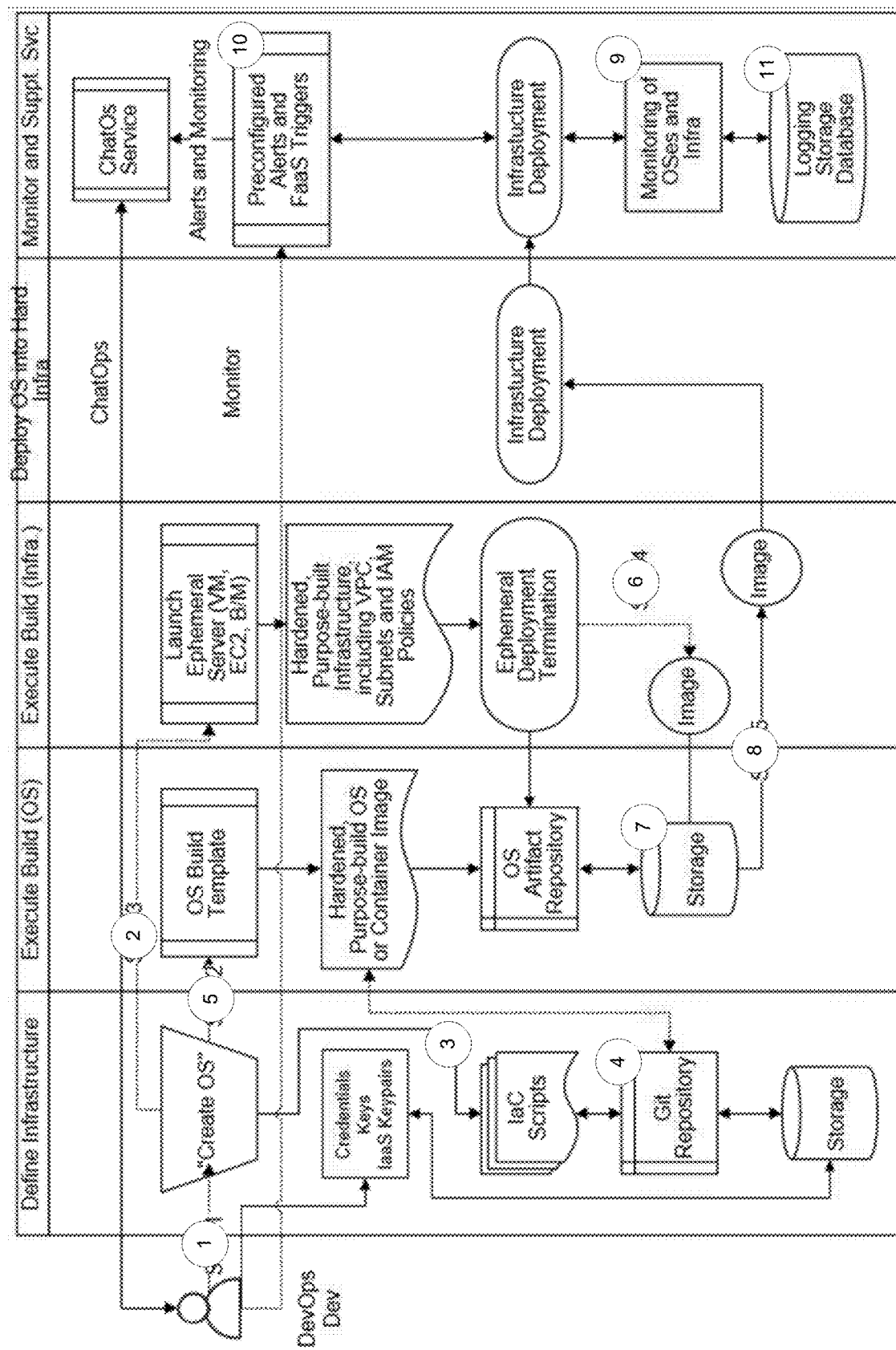
FIG. 9 illustrates a method for using a platform to create pipeline to define new operating system images, including integrating monitoring, publishing, IaaS storage and security hardening, in accordance with embodiments disclosed herein.

FIG. 9 illustrates a method for using a platform to create pipeline to define new operating system images, including integrating monitoring, publishing, IaaS storage and security hardening, in accordance with embodiments disclosed herein. This illustration may include a process for using IaaS Multi-Function Compute Device 250 to create a pipeline for defining a new operating system image, including integrating, monitoring, publishing, IaaS storage, and security handling. The DevOps process may define, build, deploy, monitor, and support the deployment of net-new infrastructure using IaaS Multi-Function Compute Device 250, DevOps, ChatOps and CICD Tools and Services provided by IaaS Multi-Function Compute Device 250 itself. This process may be executed and repeated for building any type of infrastructure using IaaS Multi-Function Compute Device 250 and should serve as a DevOps pattern for development.

At block 1, the method may identify and define infrastructure receiving the automated operating system build. For example, using the GUI of IaaS Multi-Function Compute Device 250, the user may generate IaC. As discussed herein, examples of the IaC may include Hashicorp® Terraform AWS® CloudFormation or other state-defining Infrastructure as Code. Examples of the creator GUI may include various WYSIWYG ("What You See Is What You Get") graphical user interfaces.

In some examples, each IaC Build may require a dedicated platform software repository. In some examples, using a client device, IaC scripts may be created. The scripts may be uploaded to the appropriate platform software repository.

In some examples, the method may identify an industry standard for hardening. This may correspond with a standard identified by an internal corporate governance organization of the tenant's choice. Some examples of standards may include Center for Internet Security (CIS), DISA STIG (Military and Intelligence Communities), International Organization for Standardization (ISO), SysAdmin, Audit, Network, and Security (SANS) Institute, or National Institute of Standards and Technology (NIST).

At block 2, the method may identify a class of ephemeral and local compute that may be used to build the image. An ephemeral build may correspond with a short-lived, temporary, dynamic, or on-demand build of a virtual system or image. In an ephemeral build process, a fresh environment may be created for each build, and then destroyed when the build steps are finished. For example, applications requiring large amounts of RAM, storage, or specific network connectivity may be identified for this process.

In some examples, a RDBMS may be identified that is appropriate for the application. This can include but is not limited to: AWS® relational databases (RDS), Platform® PostgreSQL®, Platform® MySQL® or MariaDB®, Microsoft® SQL Server®, NoSQL (not only SQL) Databases such as Accumulo®, Hadoop®, Hbase®, Cassandra®, Riak®, Redis®, Hypertable®, Accumulo®, Amazon SimpleDB®, CloudData®, HPCC®, Flink®, Neo4J®, or any number of SQL or NoSQL alternatives. This process may also obtain the parameters for connecting to the identified RDBMS, SaaS Service, or NoSQL Service.

At block 3, the method may create IaC scripts. For example, using industry standard scripting languages, the process may define the parameters of the base operating system (OS). This may include selecting a base OS ISO and, using a stand-alone server running the latest OS ISO file, performing a "system scan" of the OS to collect the security score and results. The process may also write a hardening script to be executed during ephemeral build of the OS image (e.g., using a tool such as a Bash Script that hardens a Linux Server security automatically, etc.).

Various tools may be used during this process. For example, using CI tools, the method may establish a post-build software scoring test to automate the nightly-build reporting of scores as the OS images are created and committed to storage and production servers.

In another example, using Bash, the method may write a script installing software required for a purpose-built, highly available server deployment. Common applications implemented into purpose-built images include: Apache® Tomcat® or HTTP Webserver, PostgreSQL® or MySQL/MariaDB, or any other software comprising a custom, internally built software application. In other examples, any client/server-based application can be built using this method, including petabyte scale Big Data (also known as Hadoop®), Spark® (In-RAM Database Clusters), geospatial systems, artificial intelligence and machine learning, as well as general purpose data science platforms such as Enterprise MATLAB® and RStudio Server®.

In another example, using Bash, the method may configure runtime parameters for the OS. This may ensure mountpoints to IaaS/Cloud Storage are applied when the system using the hardened, purpose-built OS is launched.

In another example, the method may create boot scripts required to launch compute. The boot scripts may include IP addresses and hostname standardized naming conventions.

At block 4, a Git repository may be created for IaC scripts. For example, using IaaS Multi-Function Compute Device 250 software repository service, a new IaC repository may be defined. The creation process may also include assigning access rights.

In some examples, ChatOps integrations may be created. The ChatOps may be configured for alerting, including Chat Channels, to receive events and support troubleshooting activities.

At block 5, an operating system "template" may be created. The operating system template may contain the details for the hardware and software parameters to be implemented on the ephemeral server. These build variables may include (but are not limited to) Target IaaS/Cloud Vendor, User/Automation Access Keys and Secrets, regions within the IaaS/Cloud vendor service selected, target VPC for the IaaS/Cloud vendor service selected, target Availability Zone ("AZ") for the IaaS/Cloud vendor service selected, virtualization type to be utilized by the ephemeral system, server Hardware Types (sometimes referred to as "Flavors") to be utilized by the ephemeral system, define local system credentials (if required), execution parameters for the launching of any hardening scripts at runtime, boot parameters, hostname naming convention, storage parameters, network parameters, location of build scripts, hardening scripts, and applications installation scripts as variables to be leveraged during the build, additional parameters for mounting storage at runtime, Internet Control Message Protocol (ICMP) monitoring agent configurations, and logging configurations. The parameters may also include a "homing" of the image to direct each new server to send data to specific endpoints (e.g., leveraged by Enterprise Architecture, Governance, and Security). In some examples, the parameters may also define the backing RDS, RDBMS, or SQL/NoSQL Services for the server to connect to at runtime.

At block 6, the hardened, purpose-built operating system image may be built. For example, using the GUI of IaaS Multi-Function Compute Device 250, the method may execute the build and observe the industry standard scores provided by the automated build. In the event a score is lower than expected (e.g., 75% passing score for the built OS, vice ~90%), the method may remediate the hardening script and rerun the build.

At block 7, the hardened, purpose-built operating system image may be stored. For example, the method may identify and define the storage repository to be utilized once a successful OS build is complete. The repository can include multiple locations, such as a platform-provided Sonatype® Nexus Repository®, platform-provided GitLab® Container Repository, platform-provided Docker® Repository, AWS® EBS®, AWS® Container Registry®, or any similar storage location (e.g., an industry standard, API abstracted Service utilized to store large artifact). In some examples, the storage location may accept files ranging from approximately 50 megabyte containers to multiple gigabyte images.

At block 8, the server using store hardened, purpose-built servers and services may be launched. For example, the method may execute the build of the operating system via the GUI of IaaS Multi-Function Compute Device 250 and observe the results of both automated testing and the build execution itself.

At block 9, a launched hardened, purpose-built servers and services may be monitored. For example, using the GUI of IaaS Multi-Function Compute Device 250 monitoring page, observe the newly launched servers and services to ensure the application functions as designed. While "observing" the metrics and performance of a given service is possible, with the inclusion of automation leveraging FaaS services makes monitoring services redundant, in so far as they are "self-healing." Traditional Monitoring may be used to ensure services stay in a steady, reliable and available "state of health." FaaS may use automation to correct errors in service states. In this example, the DevOps Administrator may never engage with troubleshooting services, only witnessing "events" that trigger "actions."

At block 10, events based on hardened, purpose-built servers and services may be identified in alerts. For example, the Platform design pattern for launching operating systems, infrastructure, and containerized workloads may implement the concept of autoscaling, load balancing, and self-healing deployments backed by FaaS.

In some examples, autoscaling (e.g., automatic scaling, etc.) may be implemented. Autoscaling may correlate the amount of computational resources in a server farm, which may be measured in terms of the number of active servers, to vary automatically based on the load on the server farm. The server health within an autoscaling group can be monitored by both the IaaS Multi-Function Compute Device 250 and a FaaS endpoint for errors and events occurring to specific nodes within the autoscaling group itself. These events can be used to trigger termination and relaunch of nodes within the autoscaling group. This may make direct troubleshooting of the servers themselves an obsolete task.

In some examples, the autoscaling group may be configured to terminate and relaunch any server experiencing any condition besides "200 OK" or otherwise identifying that the system is "healthy." This termination and relaunch of the resources may correct issues affecting a server instantly, with no adverse effect to the service delivered by the autoscaling group.

In some examples, a load balancer may be implemented. Load balancing may refer to efficiently distributing incoming network traffic across a server farm or server pool (e.g., group of backend servers, etc.). As system load increases or decreases, FaaS services can identify the need to scale up or down the number of required servers within the autoscaling group, using various methods described herein. For example, this may ensure that the minimal compute is utilized at all times by the autoscaling service and end users and may reduce cost and processing resources exponentially.

In some examples, a content delivery network (CDN) may be implemented. The CDN may correspond with a geographically distributed group of servers which work together to provide fast delivery of Internet content. The autoscaling group may be abstracted with the CDN. By abstracting the autoscaling group with a CDN, the majority of data and HTTPS requests by end users can be resolved by the CDN itself. This may also reduce cost and additional processing requirements for resources. The use of the CDN may also increase security by reducing the number of calls sent directly to the webserver and RDBMS associated with a service of IaaS Multi-Function Compute Device 250.

In some examples, a self-healing process may be automated using FaaS. For example, the method may create parameters for self-healing of the deployed services. The parameters may include conditions defined for a server, service, or autoscaling group where a hardened, IaaS Multi-Function Compute Device 250-deployed server is considered "unhealthy." The parameters may define the action for the system to terminate and relaunch. The method may be saved to the GUI of IaaS Multi-Function Compute Device 250, which may write the function to the FaaS service implemented.

In some examples, the self-healing process may be tested. The testing may be initiated by triggering the self-healing process, including by terminating one of the servers within the service or autoscaling group. The method may observe the action of the FaaS automation and ensure the faulty server is replaced immediately pursuant to the conditions, rules, or method defined herein.

At block 11, the system logs for services, applications, and servers may be stored using provided services of IaaS Multi-Function Compute Device 250. For example, using the GUI of IaaS Multi-Function Compute Device 250, the receiving Service for Service and Infrastructure Logs may be identified and configured. After launching the infrastructure, the logs for the new functionality may be reported. The method may ensure that the logs are reported within a threshold amount of time and/or without a threshold amount of errors (e.g., accurately and timely) in a monitoring service of IaaS Multi-Function Compute Device 250.

In some examples, various monitoring services may be available for log monitoring and alerting to be implemented by IaaS Multi-Function Compute Device 250. Some monitoring services may include Zabbix®, Zenoss®, SolarWinds® Security Event Manager, Datadog®, SolarWinds® Papertrail, Loggly®, ManageEngine® EventLog® Analyzer, Sematext® Logs, Paessler® PRTG Network Monitor, Splunk®, Fluentd®, Logstash®, Kibana®, Graylog®, XpoLog®, ManageEngine® Syslog Forwarder, Managelogs®, Graylog®, Graphite® with Grafana®, or other multiple competing applications and platforms.

In some examples, the method may generate reports for services, applications, and servers. These reports may be stored in a repository. In some examples, these reports may be used by the Reporting GUI for IaaS Multi-Function Compute Device 250 and/or used to generate additional reports for the user.

Figure 10:
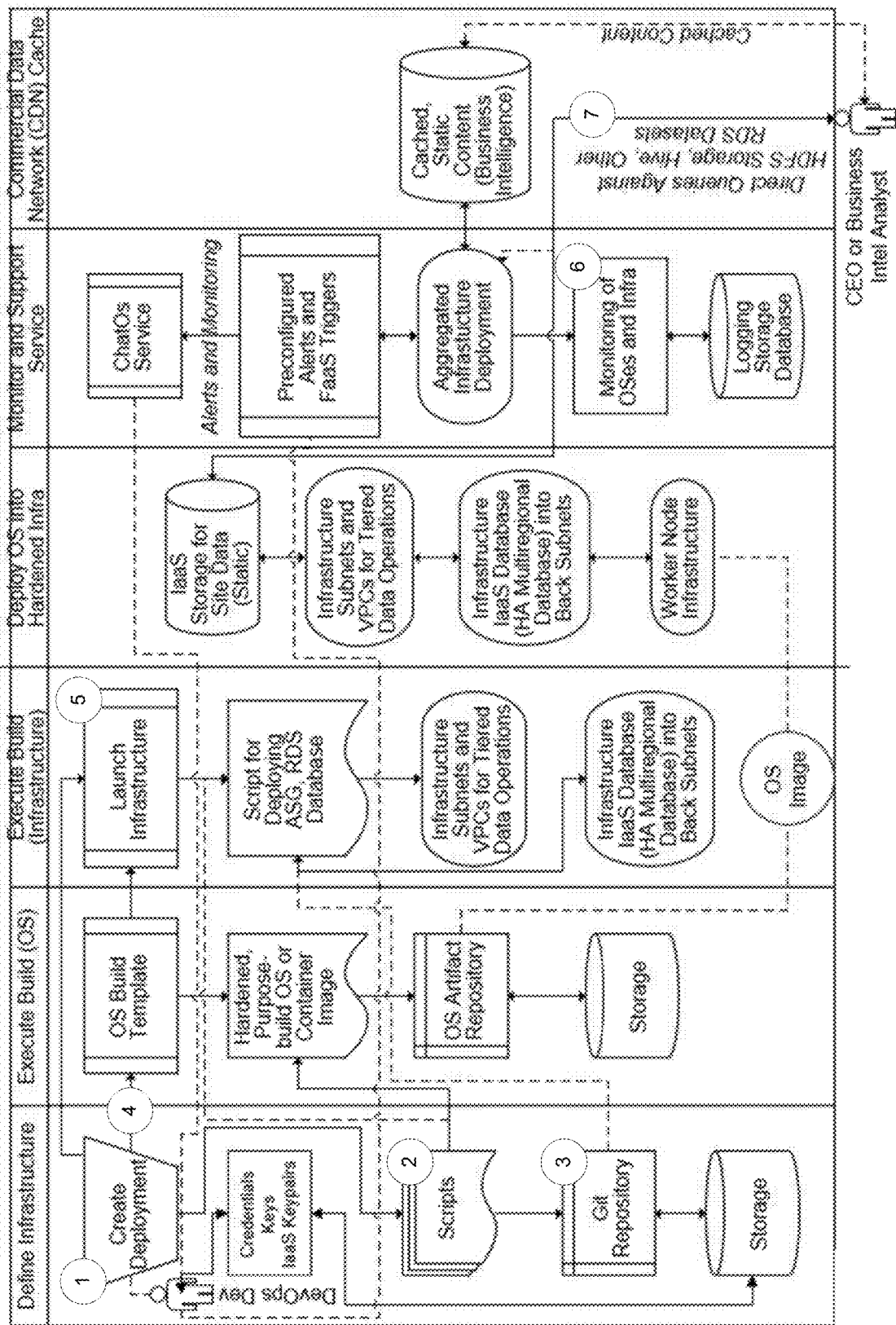
FIG. 10 illustrates a pipeline for defining launching and managing complex infrastructure, in accordance with embodiments disclosed herein.

FIG. 10 illustrates a pipeline for defining launching and managing complex infrastructure, in accordance with embodiments disclosed herein. For example, a method illustrated in FIG. 10 may follow a sequence to define a secure, hardened method for launching complex IaaS Infrastructures using IaaS Multi-Function Compute Device 250, GUI of IaaS Multi-Function Compute Device 250, and Infrastructure as Code.

At block 1, a "deployment" may be created. For example, a new infrastructure build may be initiated and named in the GUI of IaaS Multi-Function Compute Device 250. As part of the deployment, various users can be assigned to the deployment as well, including standard users, groups, and developers from IaaS Multi-Function Compute Device 250 git repository. In some examples, the various users may be assigned from GUI of IaaS Multi-Function Compute Device 250 authentication for service, tool and IaaS/cloud and SaaS services required for the build.

In some examples, a "deployment" is the creation of required user workspaces in order to build an infrastructure deployment. This may include, but not limited to, creating a repository, a build service tenant space, storage, groups, teams, users, access rights, credentials, keys and secrets, and all associated DevOps tools and services configured to support a given deployment. Each deployment may comprise of different sets of these tools. The administrator GUI may assist in defining each "deployment", saving state of the "pipeline" for future work At block 2, one or more scripts may be generated. For example, a user may write the IaaS Infrastructure as Code, operating systems, hardening and application installation scripts. This may include building a local virtual machine and install the baseline operating system. The application may also be installed, where the application is selected locally within the virtual machine. An Industry Standard OS and application test may be run. The image may be remediated manually, the commands may be saved as a single hardening script, and the hardening script may be committed to the Git repository of IaaS Multi-Function Compute Device 250.

In some examples, the results of the test may be remediated to obtain a higher score and capture all negative results. The negative results may correspond with configuration settings that affect the operation of the operating system or the application, which may be captured. The results of the remediation and final test scores may be forwarded to the managing Security Organization for review and approval.

In some examples, the scripts may correspond with Infrastructure as Code to configure various aspects of the system, including RDSes, RDBMSes, Storage, VPCs/networking, ChatOps and CICD Tool integrations, along with network logic at build time.

At block 3, the IaaS Infrastructure as Code, operating systems, hardening and application installation scripts may be committed to the git repository identified during a project planning stage.

At block 4, OS and infrastructure templates may be constructed using the GUI of IaaS Multi-Function Compute Device 250. For example, a new infrastructure "Build Pipeline" may be created within the GUI of IaaS Multi-Function Compute Device 250. This may include associating Infrastructure as Code, operating systems, hardening and application installation scripts with the "Build Pipeline." In another example, a new operating system "Build Pipeline" may be created within the GUI of IaaS Multi-Function Compute Device 250. This may include associating Infrastructure as Code, operating systems, hardening and application installation scripts with the "Build Pipeline."

At block 5, various code may be executed. For example, the hardened operating system "Build Pipeline" may be executed. The execution may include generating the hardened operating system image using the GUI of IaaS Multi-Function Compute Device 250 and storing the hardened operating system image (e.g., using the Platform Artifact Management Service, etc.).

In another example, the Infrastructure as Code "Build Pipeline" may be executed. The execution may include executing Infrastructure as Code scripts, building logical architecture, IAM policies, subnetting, VPCs, VPC peering, CIDR block ranges based on Enterprise CIDR allocations, and IaaS/Cloud Vendor Services required. In some examples, a framework may be launched into the newly created VPC based on new hardened operating system image. This may include various tools, including Kubernetes® worker nodes, Kubernetes® master nodes, and configurations for Kubernetes® and tenant spaces within the framework of IaaS Multi-Function Compute Device 250.

In another example, an application autoscaling instance may be created. The creation may utilize various tools, including for example, kubectl or CLI, depending on selected the framework of IaaS Multi-Function Compute Device 250 for production. The method may also launch application Pods (e.g., for Kubernetes®) using hardened containers comprising the platform application and launch application via ASGs, using hardened operating systems for each platform service.

At block 6, the process may ensure functionality of various services. For example, the process may ensure monitoring works for new platform services using the platform monitoring GUI of IaaS Multi-Function Compute Device 250. In another example, the process may ensure the new application functions of IaaS Multi-Function Compute Device 250 in production. In another example, the process may ensure ChatOps functions for the new application and IaaS/Cloud Infrastructure of IaaS Multi-Function Compute Device 250. These processes may be performed concurrently or sequentially.

At block 7, operations may begin.

Figure 11:
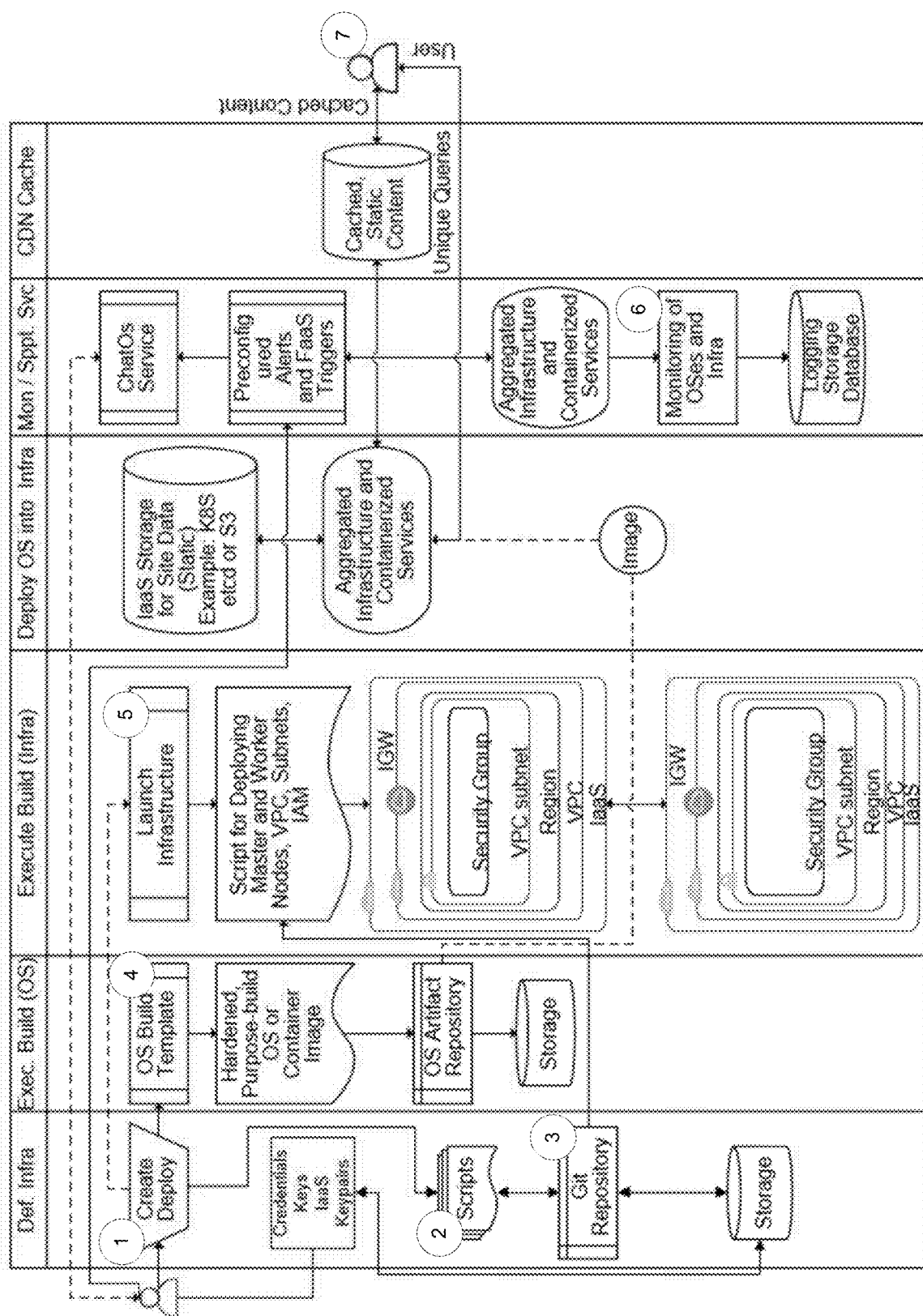
FIG. 11 illustrates a method for deploying highly available, globally distributed services infrastructure, in accordance with embodiments disclosed herein.

FIG. 11 illustrates a method for deploying highly available, globally distributed services infrastructure, in accordance with embodiments disclosed herein. For example, the method may define a secure process for launching complex IaaS infrastructures using the platform, platform GUI, and Infrastructure as Code.

At block 1, a deployment may be created. For example, a new infrastructure build may be initiated and named in the GUI of IaaS Multi-Function Compute Device 250. As part of the deployment, various users can be assigned to the deployment as well, including standard users, groups, and developers from the git repository of IaaS Multi-Function Compute Device 250. In some examples, the various users may be assigned from the authentication for service, tool and IaaS/cloud and SaaS services required for the build of IaaS Multi-Function Compute Device 250.

At block 2, one or more scripts may be generated. For example, a user may write the IaaS Infrastructure as Code, operating systems, hardening and application installation scripts. This may include building a local virtual machine and install the baseline operating system. The application may also be installed, where the application is selected locally within the virtual machine. An Industry Standard OS and application test may be run. The image may be remediated manually, the commands may be saved as a single hardening script, and the hardening script may be committed to the Git repository of IaaS Multi-Function Compute Device 250.

In some examples, the results of the test may be remediated to obtain a higher score and capture all negative results. The negative results may correspond with configuration settings that affect the operation of the operating system or the application, which may be captured. results of the remediation and final test scores may be forwarded to the controlling Enterprise Security Organization for review and approval.

In some examples, the scripts may correspond with Infrastructure as Code to configure various aspects of the system, including RDSes, RDBMSes, Storage, VPCs/networking, ChatOps and CICD Tool integrations, along with network logic at build time.

In some examples, VPCs and VPC Peering may be designed to ensure multi-regional architectures and highly available failover capabilities are leveraged within the Infrastructure as Code pipeline itself. In some examples, CDN abstraction may be designed for service endpoints, forcing HTTP and UDP Traffic to be highly cached. In some examples, the CDN "caching" may occur prior to service operations announcement, which may help the majority of HTTP requests for data to be responded to by the CDN, and not the source RDBMS backing the service. The caching may help keep at least some of the user requests local without transmitting the user requests across internal networks of IaaS Multi-Function Compute Device 250.

At block 3, the IaaS Infrastructure as Code, operating systems, hardening and application installation scripts may be committed to the git repository of IaaS Multi-Function Compute Device 250 identified during project planning stage.

At block 4, OS and infrastructure templates may be constructed using the Platform GUI. For example, a new infrastructure "Build Pipeline" may be created within the GUI of IaaS Multi-Function Compute Device 250. This may include associating Infrastructure as Code, operating systems, hardening and application installation scripts with the "Build Pipeline." In another example, a new operating system "Build Pipeline" may be created within the GUI of IaaS Multi-Function Compute Device 250. This may include associating Infrastructure as Code, operating systems, hardening and application installation scripts with the "Build Pipeline."

At block 5, various scripts or files may be executed. For example, the hardened operating system "Build Pipeline" may be executed. The execution may include generating the hardened operating system image using the GUI of IaaS Multi-Function Compute Device 250 and storing the hardened operating system image (e.g., using the platform artifact management service, etc.).

In another example, the Infrastructure as Code "Build Pipeline" may be executed. The execution may include executing Infrastructure as Code scripts, building logical architecture, IAM policies, subnetting, VPCs, VPC peering, CIDR block ranges based on Enterprise CIDR allocations, and IaaS/Cloud Vendor Services required. In some examples, a framework may be launched into the newly created VPC, based on new hardened operating system image. This may include various tools, including Kubernetes® worker nodes, Kubernetes® master nodes, and configurations for Kubernetes® and tenant spaces within the framework of IaaS Multi-Function Compute Device 250.

In another example, an application autoscaling instance may be created. The creation may utilize various tools, including for example, kubectl or CLI, depending on selected framework for production. The method may also launch application Pods (e.g., for Kubernetes®) using hardened containers comprising the application of IaaS Multi-Function Compute Device 250 and launch application via ASGs, using hardened operating systems for each service of IaaS Multi-Function Compute Device 250.

At block 6, various processes may be ensured to operate properly. For example, the process may ensure monitoring works for new services using the monitoring GUI of IaaS Multi-Function Compute Device 250. In another example, the process may ensure the new application functions of IaaS Multi-Function Compute Device 250 in production. In another example, the process may ensure ChatOps functions for the new application and IaaS/Cloud Infrastructure of IaaS Multi-Function Compute Device 250. In another example, the process may ensure high availability "failover" functionality is working properly by deactivating VPC peering and network connectivity temporarily, observing and documenting failover processes and activities driven by FaaS result in no production outages. These processes may be performed concurrently or sequentially.

At block 7, operations may begin.

Figure 12:
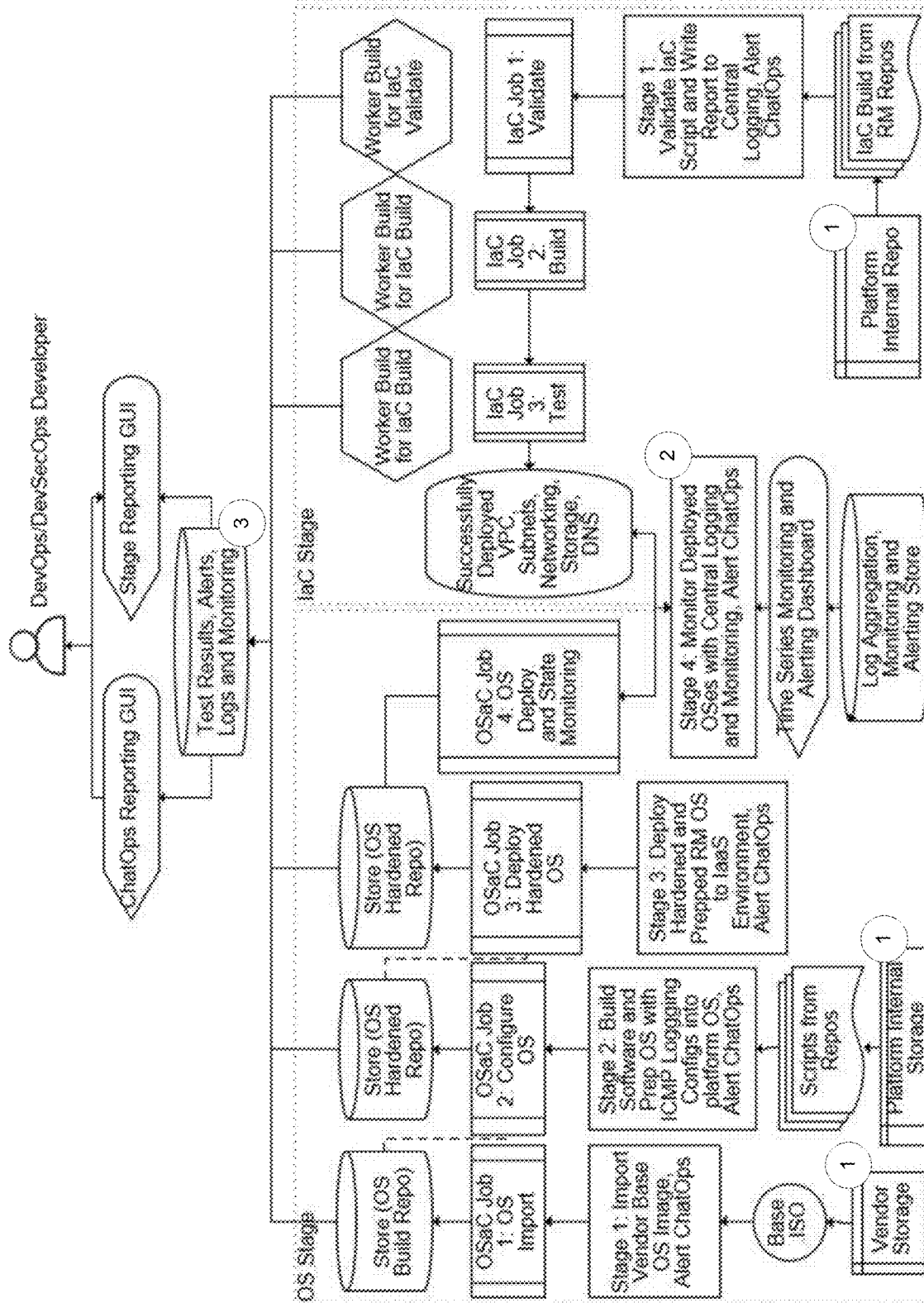
FIG. 12 illustrates a pipeline for deploying infrastructure service tools, in accordance with embodiments disclosed herein.

FIG. 12 illustrates a pipeline for deploying infrastructure service tools, in accordance with embodiments disclosed herein. Illustrations may include a creation of U.S. Government/DISA STIG-hardened infrastructure and operating systems. For example, as each application deployed using this method varies from application to application and service to service. This methodology may be used as a template for the process and should be adjusted accordingly. In some examples, this process may correspond with testing stages for generating hardened operating system artifacts and testing steps for achieving hardened operating systems meeting high degrees of STIG certifications and scoring.

As illustrated, the process may include an operating system (OS) stage and infrastructure as code (IaC) stage. These stages may run sequentially or concurrently to build the infrastructure.

Block 1 is illustrated in a plurality of locations in FIG. 12. These instances may identify instances of importing data, including scripts, OS images (e.g., *.iso, etc.), reporting, logs, and the like. For example, all CICD Tools, Services, Accounts and Credentials Required may be established and/or imported from previous processes to build the aforementioned pipeline(s). For example, the method may establish administrator users and groups for the target IaaS/SaaS/On-Premises compute receiving the build.

In another example, the method may identify CICD tools and service availability. These tools and services may be required to perform DevOps operations and development. Various tools and services are considered. For example, this may include establishing a Software Repository Service (e.g., with git-based API and CLI provided). A build server service and artifact storage may be established for the DevOps pipeline. Software testing and linting functionality may be established with APIs and CLI commands available to the service (e.g., to support automation of the pipeline). A ChatOps Service may be established with an API and CLI command interface, facilitating event and troubleshooting of the DevOps pipeline, as well as real-time troubleshooting of production applications, services, and infrastructure. In some examples, the DevOps team may be established consisting of OS, IaaS, Bash, and Service experts. This may include establishing access to a Bastion Host possessing network to DevOps tools and services. In some examples, access may be established to various CLI libraries and clients such as client devices for Hadoop®, Kubernetes®, AWS® CLI, Azure® CLI, Google® CLI, DCOS®, Docker® libraries and clients, or other CLI-based clients to interface with tools and services. Automation service SSH keys may be established for distribution to development, staging, and/or production environments. In some examples, the method may obtain CIDR block from Corporate IP Governance (e.g., 10.0.0.1/16 corporate block of IPs, etc.). In some examples, regional access may be obtained for the build pipeline, ensuring the IaaS/Cloud Administrators can build within expected geographic regions available to the IaaS and each Region has production services (e.g., ensure "us-west-1" region and "us-east-2" region of AWS both have EC2®, EBS®, or Fargate® services available in each region).

In another example, the method may identify and define infrastructure for receiving the automated operating system build. For example, using the GUI of IaaS Multi-Function Compute Device 250, a user (e.g., DevOps Developers) may generate Infrastructure as Code using the creator GUI of IaaS Multi-Function Compute Device 250. As discussed herein, examples of the Infrastructure as Code may include Hashicorp® Terraform AWS® CloudFormation or other state-defining Infrastructure as Code. Examples of the creator GUI may include various WYSIWYG ("What You See Is What You Get") graphical user interfaces.

In another example, the method may commit the underlying IaC code to the software repository of IaaS Multi-Function Compute Device 250. In some examples, each Infrastructure IaC Build may require a dedicated platform software repository. In some examples, using a client device, Infrastructure as Code scripts may be created. The scripts may be uploaded to the appropriate software repository.

In another example, the method may identify an industry standard for hardening. This may correspond with a standard identified by an internal corporate governance organization of the tenant's choice. Some examples of standards may include DISA ("Defense Information Systems Agency") STIG ("Security Technical Implementation Guide") for the United States Government's Military and Intelligence Community Servers and Services. STIG may correspond with a cybersecurity methodology for standardizing security protocols within networks, servers, computers, and logical designs to enhance overall security.

Various processes may be implemented as well, as fully described in FIGS. 8-11. For example, the method may identify a class of ephemeral and local compute required to build the image. These options may include applications that can process or provide large amounts of RAM, storage, or specific network connectivity. The requirements of the application should be identified, for example, when the ephemeral builds of the automated image creation are executed and provisioned accordingly.

In another example, the RDBMS may be identified for the application. This can include, but is not limited to: AWS® relational databases (RDS), Platform® PostgreSQL®, Platform® MySQL® or MariaDB®, Microsoft® SQL Server®, NoSQL (not only SQL) Databases such as Accumulo®, Hadoop®, Hbase®, Cassandra®, Riak®, Redis®, Hypertable®, Accumulo®, Amazon SimpleDB®, CloudData®, HPCC®, Flink®, Neo4J®, or any number of SQL or NoSQL alternatives. This process may also obtain the parameters for connecting to the identified RDBMS, SaaS Service, or NoSQL Service.

In another example, the method may create Infrastructure as Code scripts. For example, using industry standard scripting languages, the process may define the parameters of the base operating system. This may include selecting a base OS ISO and, using a stand-alone server running the latest OS ISO file, performing a "system scan" of the OS to collect the security score and results. The process may also write a hardening script to be executed during ephemeral build of the OS image (e.g., using a tool such as a Bash Script that hardens a Linux Server security automatically, etc.).

Various tools may be used during this process. For example, using CI tools, the method may establish a post-build software scoring test to automate the nightly-build reporting of scores as the OS images are created and committed to storage and production servers. In another example, using Bash, the method may write a script installing software required for a purpose-built, highly available server deployment. Common applications implemented into purpose-built images include: Apache® Tomcat® or HTTP Webserver, PostgreSQL® or MySQL/MariaDB, or any custom, internally built software application. In another example, using Bash, the method may configure runtime parameters for the OS. This may ensure mountpoints to IaaS/Cloud Storage are applied when the system using the hardened, purpose-built OS is launched. In another example, the method may create boot scripts required to launch compute. The boot scripts may include IP addresses and hostname standardized naming conventions.

A Git repository may be created and/or accessed for IaC scripts. For example, using the software repository service of IaaS Multi-Function Compute Device 250, a new Infrastructure as Code repository may be defined. The creation process may also include assigning access rights. In some examples, ChatOps integrations may be created for alerting, including Chat Channels to receive events and support troubleshooting activities.

The operating system "template" may be created. The operating system template may contain the details for the hardware and software parameters to be implemented on the ephemeral server. These build variables may include (but are not limited to) Target IaaS/Cloud Vendor, User/Automation Access Keys and Secrets, regions within the IaaS/Cloud vendor service selected, target VPC for the IaaS/Cloud vendor service selected, target Availability Zone ("AZ") for the IaaS/Cloud vendor service selected, virtualization type to be utilized by the ephemeral system, server Hardware Types (sometimes referred to as "Flavors") to be utilized by the ephemeral system, define local system credentials (if required), execution parameters for the launching of any hardening scripts at runtime, boot parameters, hostname naming convention, storage parameters, network parameters, location of build scripts, hardening scripts, and applications installation scripts as variables to be leveraged during the build, additional parameters for mounting storage at runtime, ICMP monitoring agent configurations, and logging configurations. The parameters may also include a "homing" of the image to direct each new server to send data to specific endpoints (e.g., leveraged by Enterprise Architecture, Governance, and Security). In some examples, the parameters may also define the backing RDS, RDBMS, or SQL/NoSQL Services for the server to connect to at runtime.

The hardened, purpose-built operating system image may be built. For example, using the GUI of IaaS Multi-Function Compute Device 250 for creating hardened operating systems, the process may execute the build and observe the STIG Test scores provided by the automated build. In the event a score is lower than expected (e.g., 75% passing score for the built OS, vice ~90%), the method may remediate the hardening script and rerun the build.

The hardened, purpose-built operating system image may be stored. For example, the process may identify and define the storage repository to be utilized once a successful OS build is complete. The repository can include multiple locations, such as a platform-provided Sonatype® Nexus Repository®, platform-provided GitLab® Container Repository, platform-provided Docker® Repository, AWS® EBS®, AWS® Container Registry®, or any similar storage location (e.g., an industry standard, API abstracted Service utilized to store large artifact). In some examples, the storage location may accept files ranging from approximately 50 megabyte containers to multiple gigabyte images.

The server may be launched using the stored hardened, purpose-built servers and services. The build of the operating system may be executed via the GUI of IaaS Multi-Function Compute Device 250. The results of both automated testing and the build execution itself may be observed as described herein.

At block 2, the launched hardened, Purpose-Built Servers and Services may be monitored. For example, using the monitoring page GUI of IaaS Multi-Function Compute Device 250, the process may include observing the newly launched servers and services to ensure the application functions as designed.

In some examples, events based on hardened, purpose-built servers and services may be used to generate an alert. For example, the design pattern for launching operating systems, infrastructure, and containerized workloads may implement the concept of autoscaling, load balancing, and self-healing deployments backed by FaaS.

In some examples, autoscaling (e.g., automatic scaling, etc.) may be implemented. Autoscaling may correlate the amount of computational resources in a server farm, which may be measured in terms of the number of active servers, to vary automatically based on the load on the server farm. The server health within an autoscaling group can be monitored by both the IaaS Multi-Function Compute Device 250 and a FaaS endpoint for errors and events occurring to specific nodes within the autoscaling group itself. These events can be used to trigger termination and relaunch of nodes within the autoscaling group. This may make direct troubleshooting of the servers themselves an obsolete task.

In some examples, the autoscaling group may be configured to terminate and relaunch any server experiencing any condition besides "200 OK" or otherwise identifying that the system is "healthy." This termination and relaunch of the resources may correct issues affecting a server instantly, with no adverse effect to the service delivered by the autoscaling group.

In some examples, a load balancer may be implemented. Load balancing may refer to efficiently distributing incoming network traffic across a server farm or server pool (e.g., group of backend servers, etc.). As system load increases or decreases, FaaS services can identify the need to scale up or down the number of required servers within the autoscaling group, using various methods described herein. For example, this may ensure that the minimal compute is utilized at all times by the autoscaling service and end users and may reduce cost and processing resources exponentially.

In some examples, a content delivery network (CDN) may be implemented. The CDN may correspond with a geographically distributed group of servers which work together to provide fast delivery of Internet content. The autoscaling group may be abstracted with the CDN. By abstracting the autoscaling group with a CDN, the majority of data and HTTPS requests by end users can be resolved by the CDN itself. This may also reduce cost and additional processing requirements for resources. The use of the CDN may also increase security by reducing the number of calls sent directly to the webserver and RDBMS associated with a service of IaaS Multi-Function Compute Device 250.

As discussed herein, the hardened, purpose-built operating system "self-healing" may be automated using FaaS. For example, parameters for self-healing of the deployed services may be created. The parameters may include conditions defined for a server, service, or autoscaling group where a hardened, IaaS Multi-Function Compute Device 250-deployed server is considered "unhealthy." The parameters may define the action for the system to terminate and relaunch. The method may be saved to the GUI of IaaS Multi-Function Compute Device 250, which may write the function to the FaaS service implemented.

In some examples, the self-healing process may be tested. The testing may be initiated by triggering the self-healing process, including by terminating one of the servers within the service or autoscaling group. The method may observe the action of the FaaS automation and ensure the faulty server is replaced immediately pursuant to the conditions, rules, or method defined herein.

The system logs for services, applications, and servers may be stored using provided services of IaaS Multi-Function Compute Device 250. For example, using the GUI of IaaS Multi-Function Compute Device 250, the receiving Service for Service and Infrastructure Logs may be identified and configured. After launching the infrastructure, the logs for the new functionality may be reported. The method may ensure that the logs are reported within a threshold amount of time and/or without a threshold amount of errors (e.g., accurately and timely) in a monitoring service of IaaS Multi-Function Compute Device 250.

Various monitoring services may be available for log monitoring and alerting to be implemented by IaaS Multi-Function Compute Device 250. Some monitoring services may include Zabbix®, Zenoss®, SolarWinds® Security Event Manager, Datadog®, SolarWinds® Papertrail, Loggly®, ManageEngine® EventLog® Analyzer, Sematext® Logs, Paessler® PRTG Network Monitor, Splunk®, Fluentd®, Logstash®, Kibana®, Graylog®, XpoLog®, ManageEngine® Syslog Forwarder, Managelogs®, Graylog®, Graphite® with Grafana®, or other multiple competing applications and platforms.

These reports may be generated for services, applications, and servers. For example, client device 110 may access the reporting GUI of IaaS Multi-Function Compute Device 250 to generate the reports.

In some examples, the IaaS/cloud provider may be selected for IaC infrastructure build. For example, the user may ensure that the account is authorized higher access or administrator rights to the Tenant Space provisioned in the IaaS/Cloud Provider of choice. The IaaS/Cloud Provider credentials may be configured within the administrator panel of the GUI of IaaS Multi-Function Compute Device 250. The method may create and publish a Service SSH public key and private keypair. A keypair may be applied to the GUI within a user profile GUI, as well as the particular Git Repository Software.

In some examples, the method may identify and define the infrastructure. For example, using the GUI of IaaS Multi-Function Compute Device 250, the user (e.g., DevOps Developer) may generate IaC using the creator GUI of IaaS Multi-Function Compute Device 250. As discussed herein, examples of the IaC may include Hashicorp® Terraform AWS® CloudFormation or other state-defining Infrastructure as Code. Examples of the creator GUI may include various WYSIWYG ("What You See Is What You Get") graphical user interfaces.

The method may commit the underlying IaC code to the platform software repository. In some examples, each IaC Build may require a dedicated platform software repository. In some examples, using a client device, Infrastructure as Code scripts may be created. The scripts may be uploaded to the appropriate platform software repository.

In some examples, the method may identify an industry standard for hardening. This may correspond with a standard identified by an internal corporate governance organization of the tenant's choice. An example of an industry standard may include DoDAF Architecture Policy for United States Government's Military and Intelligence Community Infrastructure.

In some examples, the infrastructure logical architecture may be defined. For example, the virtual private network(s) and subnetting logical architecture may be defined. When defining the subnetting logical architecture, this may include defining the regions and availability zones for the subnetting schema to traverse. This may be critical for ensuring workloads span physical datacenters to create a "highly available" architecture that can suffer outages across regions, availability zones, and physical datacenters and locations.

In some examples, Classless Inter-Domain Routing (CIDR) blocks may be defined. The CIDR blocks may be implemented to allocate internet protocol (IP) addresses and for IP routing. The subnetting schemas may also be defined for divvying up CIDR IP blocks. In some examples, the CIDR subnetting allocation ensures enough IPs are available to handle autoscaling events of the services deployed within a given VPC. The subnetting allocation may be compared with a threshold value to determine whether there are enough IPs available.

In some examples, defining the infrastructure logical architecture may include defining Identity and Access Management (IAM) Policies affecting VPCs and/or defining CDN connectivity from the SaaS Service to the VPC or subnet.

In some examples, the Git Repository for IaC Scripts may be created. For example, using IaaS Multi-Function Compute Device 250 software repository service, a new IaC repository may be defined. The creation process may also include assigning access rights. In some examples, ChatOps integrations may be created for alerting, including Chat Channels to receive events and support troubleshooting activities.

In some examples, an Infrastructure as Code "template" may be created. The IaC template may contain the details for the infrastructure parameters to be implemented on the IaaS/Cloud Provider equipment and services.

Example parameters may include build variables. These build variables may include (but are not limited to) Target IaaS/Cloud Vendor, User/Automation Access Keys and Secrets, regions within the IaaS/Cloud vendor service selected, target VPC for the IaaS/Cloud vendor service selected, target Availability Zone ("AZ") for the IaaS/Cloud vendor service selected, select the IaaS/Cloud Virtual Private Cloud ("VPC") to be utilized, server Hardware Types (sometimes referred to as "Flavors") to be utilized by the launched application as autoscaling services, define local system credentials (if required), execution parameters for the launching of any hardening scripts at runtime, define the IaaS/Cloud Region to receive the build, define the IaaS/Cloud availability zones (or "AZs") to receive the build, define the Identity and Access Management (or "IAM") policies to be applied to the deployed Infrastructure, and define the provisioning of IaaS/Cloud Services required. These services may include relational databases, FaaS, storage, software and container repositories, container frameworks, and ancillary services.

In some examples, the hardened, purpose-built infrastructure may be built. For example, using the GUI of IaaS Multi-Function Compute Device 250 for creating hardened infrastructure, the process may execute the build and observe the industry standard scores provided by the automated deployment. In the event a score is lower than expected (e.g., 75% passing score for the built OS, vice ~90%), the method may remediate the hardening script and rerun the build.

In some examples, the hardened, purpose-built IaC may be stored to a Git service repository. In some examples, the method may identify and define the software repository to be utilized once a successful infrastructure build is complete. These solutions can include multiple locations, such as platform-provided Sonatype® Nexus Repository® or any git-based repository service or toolset.

In some examples, the hardened, purpose-built infrastructure may be launched. For example, the method may execute the build of the infrastructure via the GUI of IaaS Multi-Function Compute Device 250 and observe the results of both automated testing and the build execution itself.

In some examples, hardened, purpose-built infrastructure and services may be monitored. For example, using the GUI of IaaS Multi-Function Compute Device 250 monitoring page, the method may observe the newly launched infrastructure and services to ensure the deployment functions as designed.

In some examples, any notifications may be provided. This may include alert events based on hardened, purpose-built infrastructure. In some examples, IaaS Multi-Function Compute Device 250 design pattern for launching operating systems, infrastructure and containerized workloads implement the concept of autoscaling, load balancing, and self-healing deployments backed by FaaS.

In some examples, the method may automate hardened, purpose-built operating system "Self-Healing" using FaaS. For example, the method may create parameters for self-healing of the deployed services. The parameters may define conditions for determining that a hardened, deployed infrastructure component is identified as "unhealthy" (e.g., including a server, service, or autoscaling group). The parameters may correspond with an action that the system executes to respond to an unhealthy state. The method may be saved to the GUI of IaaS Multi-Function Compute Device 250, which writes the function to the FaaS Service implemented.

In some examples, the self-healing triggering may be tested and observed for the corresponding action. the action may identify the FaaS automation and ensure the faulty infrastructure is isolated immediately.

At block 3, the infrastructure and service logs may be stored using platform-provided services. For example, using the GUI of IaaS Multi-Function Compute Device 250, the receiving service for Service and Infrastructure Logs may be identified and configured. After launching a hardened server, the logs for the new functionality may be reported. The method may ensure that the logs are reported within a threshold amount of time and/or without a threshold amount of errors (e.g., accurately and timely) in a platform monitoring service.

In some examples, various monitoring services may be available for log monitoring and alerting to be implemented by IaaS Multi-Function Compute Device 250. Some monitoring services may include Zabbix®, Zenoss®, SolarWinds® Security Event Manager, Datadog®, SolarWinds® Papertrail, Loggly®, ManageEngine® EventLog® Analyzer, Sematext® Logs, Paessler® PRTG Network Monitor, Splunk®, Fluentd®, Logstash®, Kibana®, Graylog®, XpoLog®, ManageEngine® Syslog Forwarder, Managelogs®, Graylog®, Graphite® with Grafana®, or other multiple competing applications and platforms.

In some examples, the method may generate reports for infrastructure services, applications, and servers. In some examples, these reports may be used by the reporting GUI of IaaS Multi-Function Compute Device 250 and/or used to generate additional reports for the user.

Figure 13:
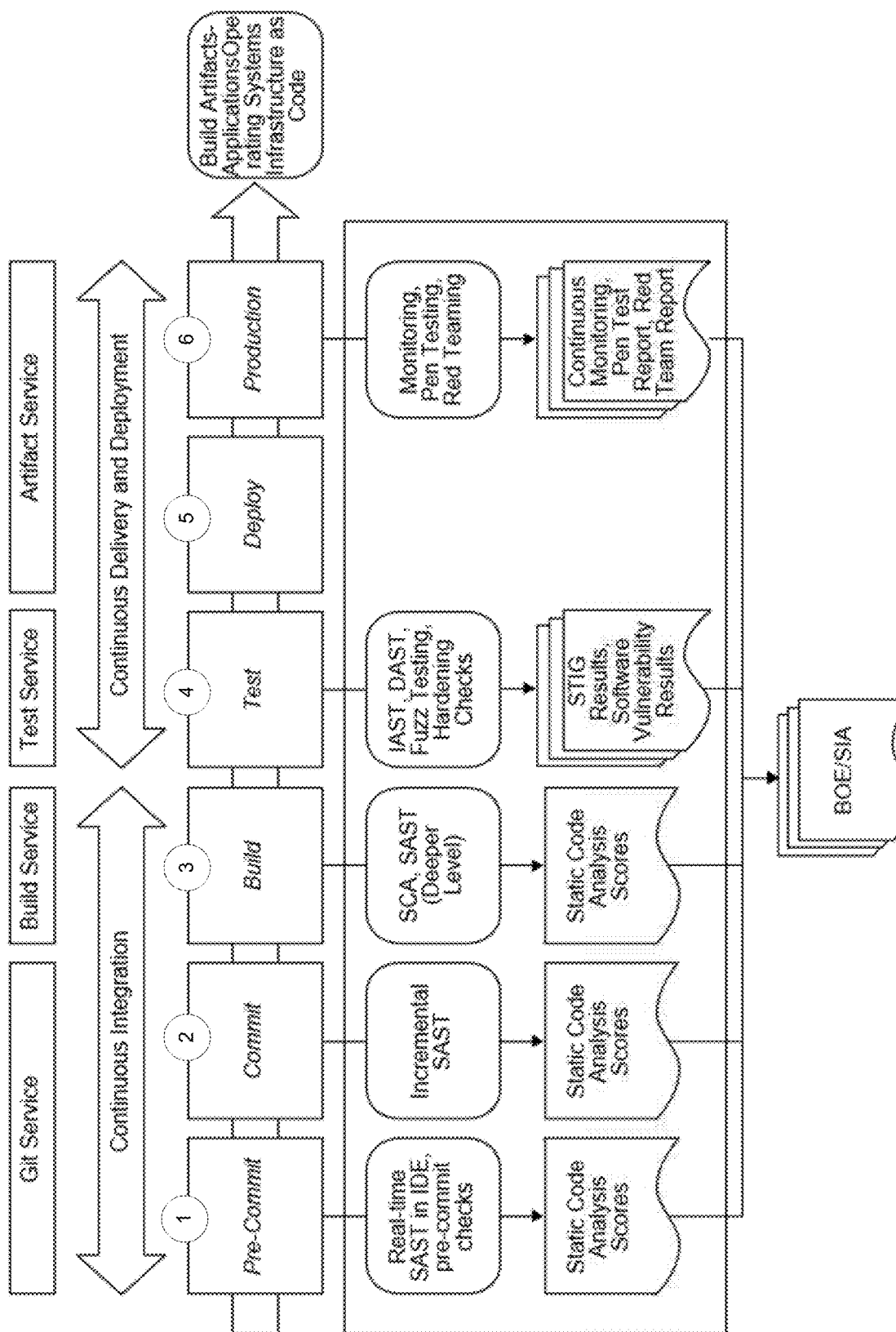
FIG. 13 illustrates a continuous authorization process, in accordance with embodiments disclosed herein.

FIG. 13 illustrates a continuous authorization process, in accordance with embodiments disclosed herein. For example, blocks 1-3 may correspond with continuous integration and blocks 4-6 may correspond with continuous delivery and deployment.

At block 1, a pre-commit process may be implemented. For example, users may access IaaS Multi-Function Compute Device 250 for installation and administration of the platform. The code may correspond with real time Static Application Security Testing (SAST) in integrated development environment (IDE) and pre-commit checks. Log information may be generated or stored in BusinessObjects Enterprise (BOE)/Server Intelligence Agent (SIA).

At block 2, a commit process may be implemented. This may commit (e.g., version control, keep history of changes, etc.) the environments specified by the tools to generate an *.iso, container, or other image file of the operating system, IaC, or service produced or accessed by the platform. The code may correspond with incremental SAST. Log information may be generated or stored in BOE/SIA.

At block 3, a build process may be implemented. This may build a baseline of pre-hardened operating system to facilitate compute launch in a hardened state and eliminate the requirement for users (e.g., Security Engineering, etc.) to manually harden systems post-launch. The code may correspond with SCA and deeper level SAST. Log information may be generated or stored in BOE/SIA.

At block 4, a test process may be implemented. This may initialize continuous delivery and deployment functionality. The testing may include Interactive Application Security Testing (IAST), Dynamic Application Security Testing (DAST), fuzzy testing, and/or hardening checks. STIG results and software vulnerability results may be generated or stored in BOE/SIA.

At block 5, a deploy process may be implemented. This may generate virtualized multi-service hardware systems that correspond with physical data centers in multiple locations, based on the tools in the pre-commit processes, as described throughout the disclosure. The multiple data centers correspond with a same infrastructure so that the user perspective is unchanged to provide a "high availability" system relying on more than one data center to run the virtualized hardware.

At block 6, a production process may be implemented. This may self-monitor the health of a component or service of the system and perform an action to remedy the component or service when the state is any other state other than "healthy" while in production and client-facing. The code may correspond with monitoring, penetration testing, and red teaming (e.g., ethical hacking, etc.). Results from these monitoring functions may be generated or stored in BOE/SIA.

These steps may build artifacts, applications, operations systems, and

Infrastructure as Code.

Figure 14:
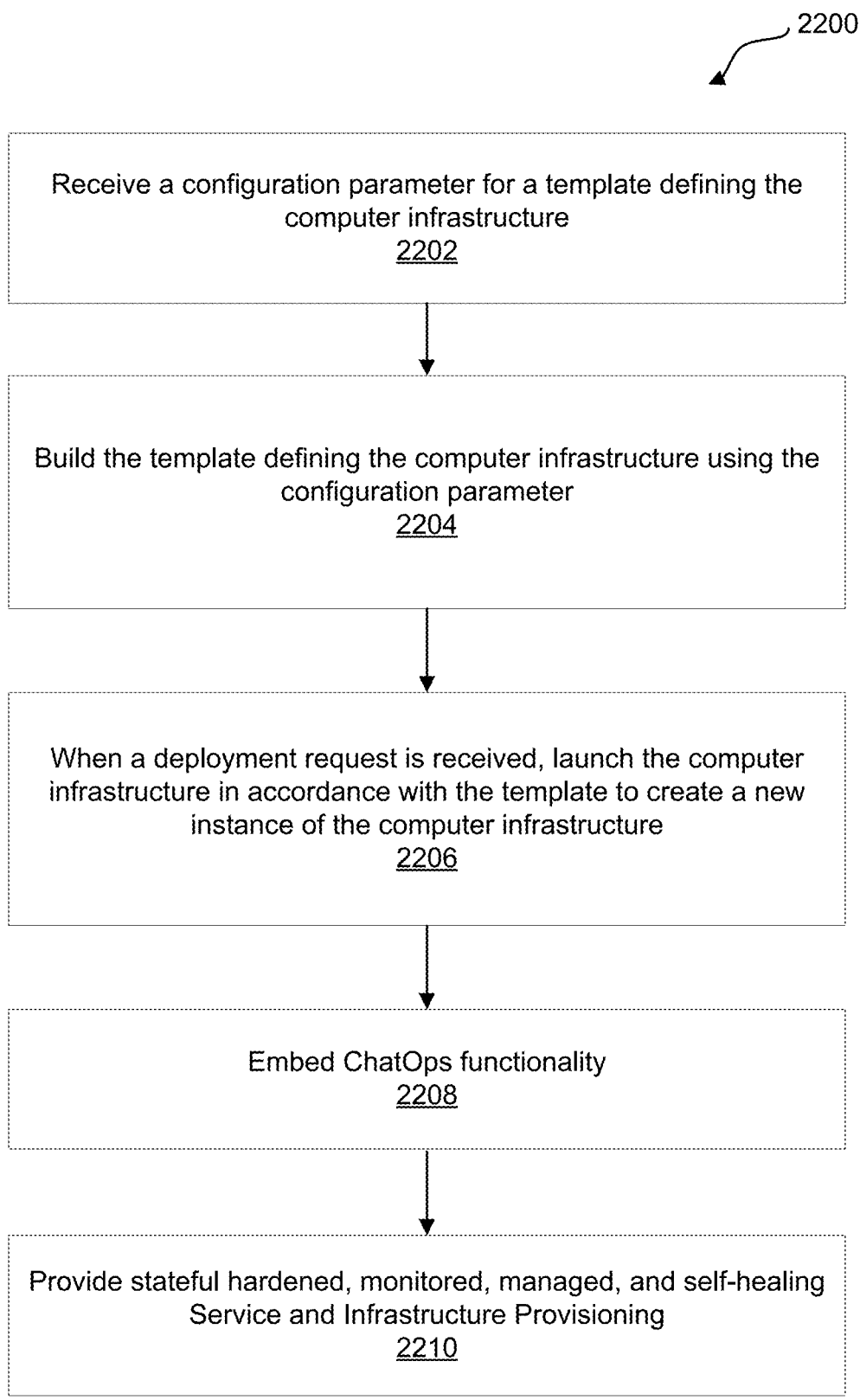
FIG. 14 illustrates a method for implementing an instance of computer infrastructure, in accordance with embodiments disclosed herein.

FIG. 14 illustrates a method for implementing an instance of computer infrastructure, in accordance with embodiments disclosed herein.

At block 2202, the method may receive one or more configuration parameters for a template defining the computer infrastructure. For example, the method may be performed by an IaaS multi-function compute device to receive a configuration parameter for a template defining the computer infrastructure. The template may correspond with infrastructure as code (IaC) implemented on a plurality of infrastructure as a service (IaaS) or cloud provider equipment and services.

In some examples, the configuration parameters may define logical configuration parameters for deployment including regionality availability zones, identity access management, CIDR management, boundary and security configurations including firewalls, internet gateways, virtual private networks, demilitarized zones (DMZs), and other logical constraints of a secured infrastructure deployment.

In some examples, the configuration parameters corresponds with an operating system of a virtualized device included with the computer infrastructure.

In some examples, the configuration parameters corresponds with an infrastructure as a service or cloud provider providing at least a portion of the computer infrastructure.

At block 2204, the method may build the template defining the computer infrastructure using the one or more configuration parameters. For example, the method may be performed by an IaaS multi-function compute device to build the template defining the computer infrastructure using the configuration parameter. The computer infrastructure may include tools, services, and management capabilities, as discussed herein, in accordance with both the template and constrained by governance standards (e.g., STIG, etc.). The template may translate the configuration parameters to a plurality of expected formats of the plurality of IaaS or cloud provider equipment and services.

At block 2206, the method may launch the computer infrastructure when a deployment request is received. Launching the computer infrastructure may be in accordance with the template to create a new instance of the computer infrastructure. For example, the method may be performed by an IaaS multi-function compute device to, when a deployment request is received, launch the computer infrastructure, including tools, services, and management capabilities, in accordance with both the template and constrained by governance standards to create a new instance of the computer infrastructure. The computer infrastructure may rely on the plurality of infrastructure as a service (IaaS) or cloud provider equipment and services to create the new instance of computer infrastructure.

At block 2208, the method may embed ChatOps functionality. For example, the method may be performed by an IaaS multi-function compute device to, embed the ChatOps functionality. The ChatOps functionality may comprise Internet Control Message Protocol (ICMP), Functions as a Service (FaaS), various messaging or alerting (e.g., Chat Operations alerting), logging, and stateful management of compute for continuous monitoring.

At block 2210, the method may provide stateful hardened, monitored, managed, and self-healing Service and Infrastructure Provisioning. The Service and Infrastructure Provisioning may be provided at runtime. For example, the method may be performed by an IaaS multi-function compute device to provide the Service and Infrastructure Provisioning.

Figure 15:
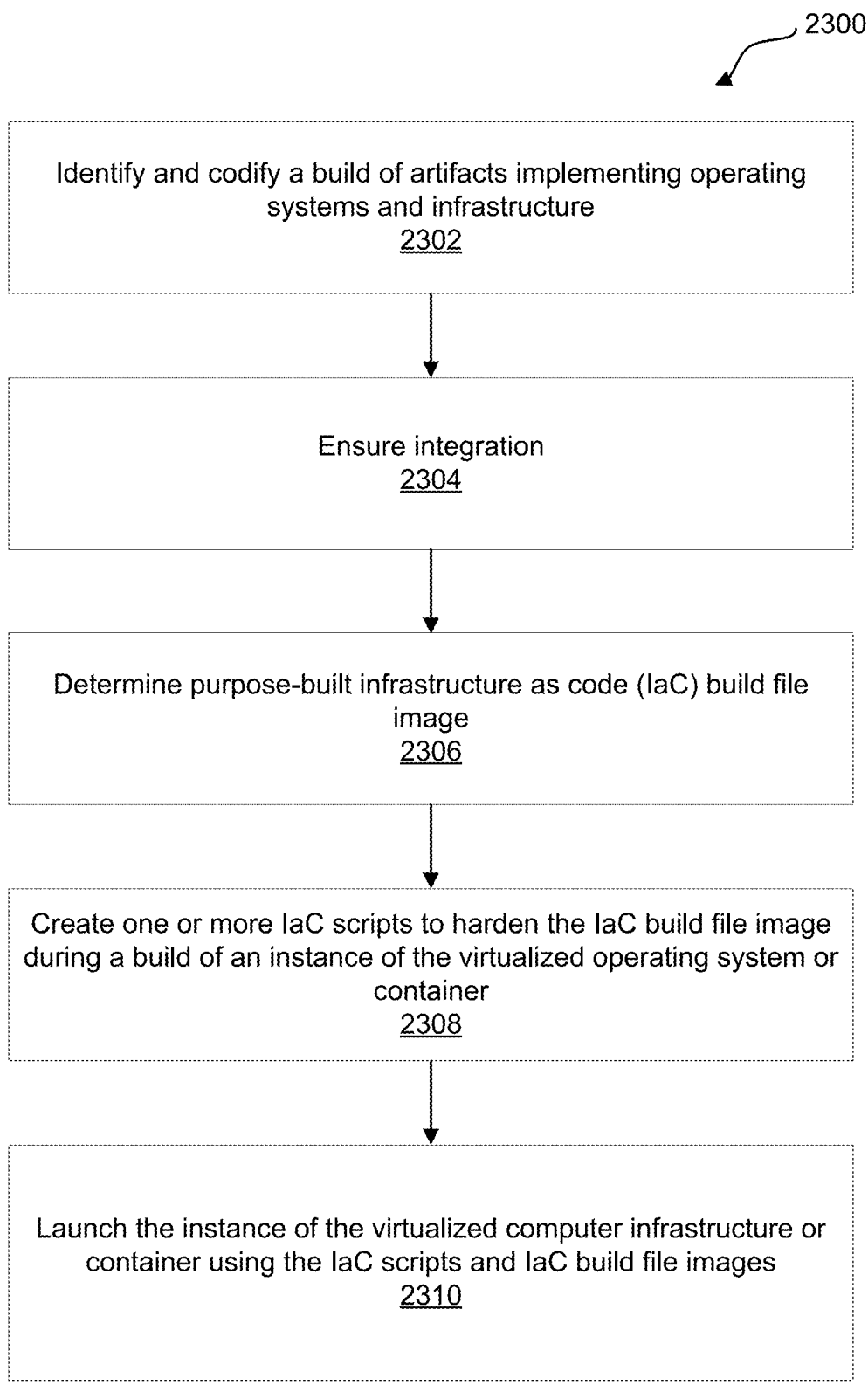
FIG. 15 illustrates a method for implementing a virtualized multi-service hardware systems, in accordance with embodiments disclosed herein.

FIG. 15 method for creating a compute pipeline to define a new computer infrastructure component, in accordance with embodiments disclosed herein.

At block 2302, identify and codify a build of artifacts implementing operating systems and infrastructure. The identifying and codifying may be implemented through scripting, automation, and scheduling. The artifacts may comply to hardened states defined by industry standards and ensure no compute resources are launched in an unsecured state.

At block 2304, the method may ensure integration. The integration may be ensured with enterprise monitoring and operation toolsets, audit capabilities, stateful management and compliance tools and services, and automation toolsets. The integration with enterprise monitoring and operation may enable Continuous Integration and Continuous Delivery (CICD).

At block 2306, determine purpose-built infrastructure as code (IaC) build file image. For example, the method may be performed by an IaaS multi-function compute device to determine the IaC build file image. The IaC build file image may define parameters of a virtualized operating system or container affected by Governance, Standards, and/or Security of a given organization. When launched, the virtualized operating system or container may satisfy an industry security standard.

For example, Governance may correspond with a single organization. The single organization may implement policies or rules that enterprise architecture group defines. The list of rules associated with Governance may help define the hardened state of the virtualized operating system or container.

Standards may also affect the parameters of the virtualized operating system or container. There may be twenty or more Standards, including STIG, CIS, or other Standards discussed throughout the disclosure, and these Standards are not comprehensive or limiting to the disclosure. In some examples, Standards may be generated by a group of organizations (e.g., NIST) that define industry standards (e.g., internet standards). Any of these Standards may help define the hardened state of the virtualized operating system or container. The virtualized operating system or container may be compared with these standards to generate a score. The score may rank the correlation of the virtualized operating system or container to the Standard.

Security may also affect the parameters of the virtualized operating system or container. For example, Security may score a launched infrastructure and remediate the launched infrastructure manually. This may include patching, updating versions of software or hardware, and the like. In some examples, an audit group may scan the virtualized operating system or container after it is launched and give it a score. In some examples, Security may not be necessary when the system adheres to Governance and Standards.

At block 2308, create one or more IaC scripts to harden the IaC build file image during a build of an instance of the virtualized operating system or container defined by the Governance, Standards, and/or Security. For example, the method may be performed by an IaaS multi-function compute device to create the IaC script.

At block 2310, launch the instance of the virtualized operating system or container using the IaC scripts and IaC build file images. This may result resulting in a stateful machine or container instance integrated with monitoring, logging, ChatOps, automation, and governance functions as deemed required by the Governance and/or security. For example, the method may be performed by an IaaS multi-function compute device to launch the instance of the virtualized operating system using the IaC script and IaC build file image.

Figure 16:
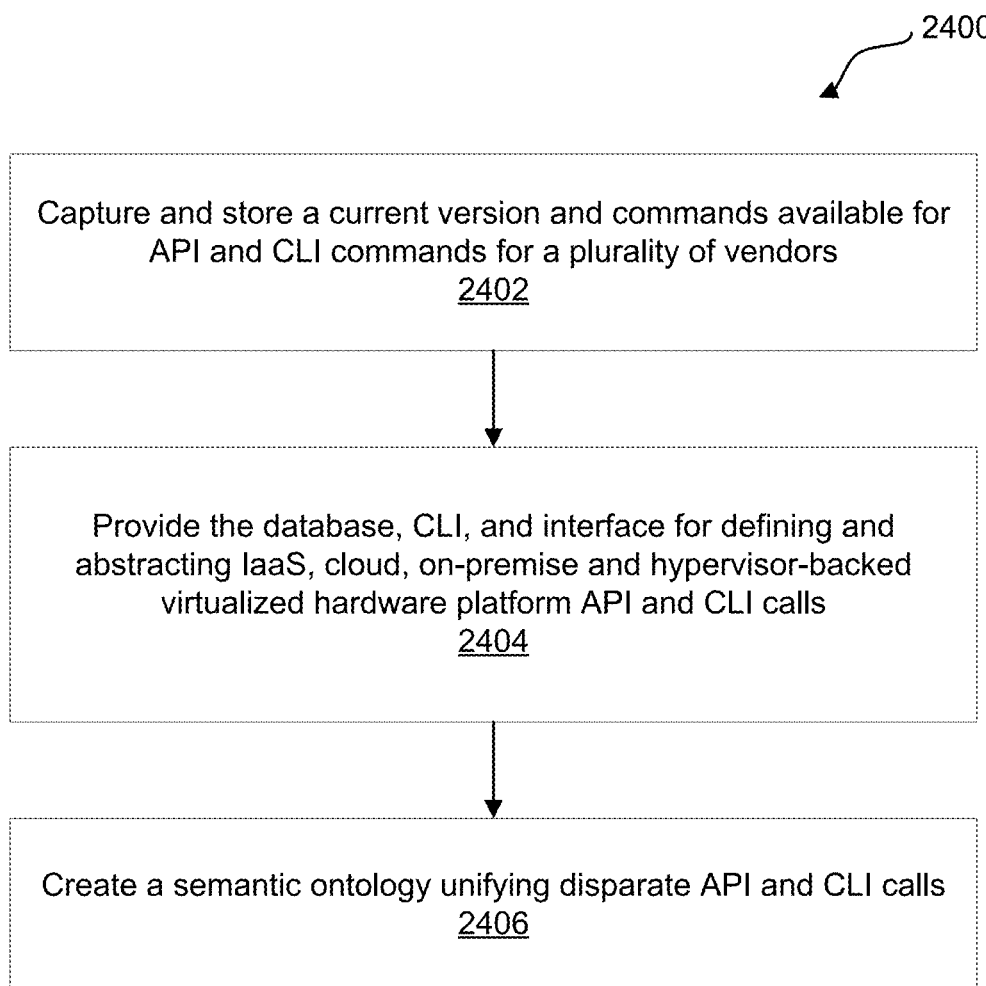
FIG. 16 illustrates a method for implementing an instance of computer infrastructure, in accordance with embodiments disclosed herein.

FIG. 16 illustrates a method for implementing an instance of computer infrastructure, in accordance with embodiments disclosed herein. In some examples, the method may provide a unified application programming interface (API) and command line interface (CLI) aggregation platform for implementing an instance of computer infrastructure for consolidating, unifying, and obfuscating multiple disparate IaaS, cloud, on-premise and hypervisor-backed virtualized hardware platforms.

At block 2402, the method may capture and store a current version and commands available for API and CLI commands for a plurality of vendors. The current version and commands may be stored in a database. For example, the method may be performed by an IaaS multi-function compute device to capture and store the current version and commands.

At block 2404, the method may provide the database, CLI, and interface for defining and abstracting IaaS, cloud, on-premise and hypervisor-backed virtualized hardware platform API and CLI calls. For example, the method may be performed by the IaaS multi-function compute device to provide the database, CLI, and interface.

Figure 17:
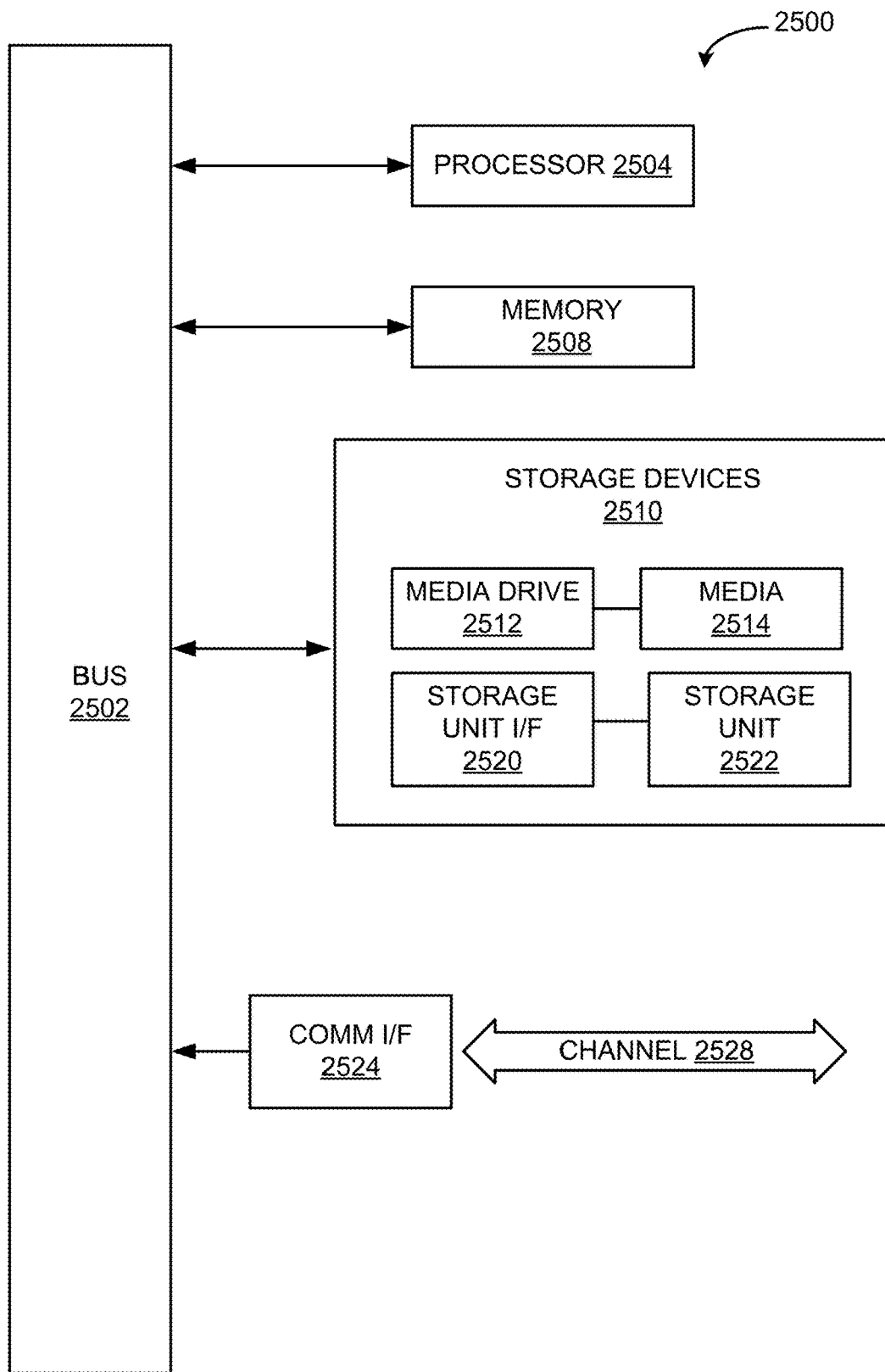
FIG. 17 is an example of a computing system that may be used in implementing various features of embodiments of the disclosed technology.

At block 2406, the method may create a semantic ontology unifying disparate API and CLI calls. The semantic ontology may define a unified method for calling IaaS services using the API and CLI commands from the plurality of vendors through an ontologically driven abstraction tier of the system. For example, the IaaS multi-function compute device may provide the abstraction tier to define a unified method for calling IaaS services using the API and CLI commands from the plurality of vendors.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 17. Various embodiments are described in terms of this example logical circuit 2500. After reading this description, it will become apparent to a person skilled in the relevant art how to implement the technology using other logical circuits or architectures.

Referring now to FIG. 17, computing system 2500 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 2500 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 2500 might include, for example, one or more processors, controllers, control engines, or other processing devices, such as a processor 2504. Processor 2504 might be implemented using a general-purpose or special-purpose processing engine such as, for example, a microprocessor, controller, or other control logic. In the illustrated example, processor 2504 is connected to a bus 2502, although any communication medium can be used to facilitate interaction with other components of logical circuit 2500 or to communicate externally.

Computing system 2500 might also include one or more memory engines, simply referred to herein as main memory 2508. For example, preferably random-access memory (RAM) or other dynamic memory, might be used for storing information and instructions to be executed by processor 2504. Main memory 2508 might also be used for storing temporary variables or other intermediate information during execution of instructions to be executed by processor 2504. Logical circuit 2500 might likewise include a read only memory ("ROM") or other static storage device coupled to bus 2502 for storing static information and instructions for processor 2504.

The computing system 2500 might also include one or more various forms of information storage mechanism 2510, which might include, for example, a media drive 2512 and a storage unit interface 2520. The media drive 2512 might include a drive or other mechanism to support fixed or removable storage media 2514. For example, a hard disk drive, a floppy disk drive, a magnetic tape drive, an optical disk drive, a CD or DVD drive (R or RW), or other removable or fixed media drive might be provided. Accordingly, storage media 2514 might include, for example, a hard disk, a floppy disk, magnetic tape, cartridge, optical disk, a CD or DVD, or other fixed or removable medium that is read by, written to, or accessed by media drive 2512. As these examples illustrate, the storage media 2514 can include a computer usable storage medium having stored therein computer software or data.

In alternative embodiments, information storage mechanism 2540 might include other similar instrumentalities for allowing computer programs or other instructions or data to be loaded into logical circuit 2500. Such instrumentalities might include, for example, a fixed or removable storage unit 2522 and an interface 2520. Examples of such storage units 2522 and interfaces 2520 can include a program cartridge and cartridge interface, a removable memory (for example, a flash memory or other removable memory engine) and memory slot, a PCMCIA slot and card, and other fixed or removable storage units 2522 and interfaces 2520 that allow software and data to be transferred from the storage unit 2522 to logical circuit 2500.

Logical circuit 2500 might also include a communications interface 2524. Communications interface 2524 might be used to allow software and data to be transferred between logical circuit 2500 and external devices. Examples of communications interface 2524 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2524 might typically be carried on signals, which can be electronic, electromagnetic (which includes optical) or other signals capable of being exchanged by a given communications interface 2524. These signals might be provided to communications interface 2524 via a channel 2528. This channel 2528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2508, storage unit 2520, media 2514, and channel 2528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 2500 to perform features or functions of the disclosed technology as discussed herein.

Although FIG. 17 depicts a computer network, it is understood that the disclosure is not limited to operation with a computer network, but rather, the disclosure may be practiced in any suitable electronic device. Accordingly, the computer network depicted in FIG. 17 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for implementing an instance of computer infrastructure, the method comprising:
  receiving a configuration parameters for a template defining the computer infrastructure, wherein the template corresponds with infrastructure as code (IaC) implemented on a plurality of infrastructure as a service (IaaS) or cloud provider equipment and services;
  building the template defining the computer infrastructure using the configuration parameters, wherein the template translates the configuration parameters to a plurality of expected formats of the plurality of IaaS or cloud provider equipment and services;
  when a deployment request is received, launching the computer infrastructure, including tools, services, and management capabilities, in accordance with the template, the configuration parameters, and constrained by governance standards to create a new instance of the computer infrastructure, wherein the computer infrastructure relies on the plurality of IaaS or cloud provider equipment and services to create the new instance of computer infrastructure;

embedding ChatOps functionality, wherein the ChatOps functionality comprises Internet Control Message Protocol (ICMP), Functions as a Service (FaaS), Chat Operations alerting, logging, and stateful management of compute for continuous monitoring; and providing stateful hardened, monitored, managed, and self-healing Service and Infrastructure Provisioning at runtime;

wherein the configuration parameters define logical configuration parameters for deployment including regionality availability zones, identity access management, Classless Inter-Domain Routing (CIDR) management, boundary and security configurations including firewalls, internet gateways, virtual private networks, demilitarized zones (DMZs), and other logical constraints of a secured infrastructure deployment; and wherein launching the computer infrastructure comprises identifying and codifying a build file of artifacts implementing one or more operating systems and defining parameters of a virtualized operating system or container in accordance with the configuration parameters and pre-defined constraints of a given organization.

2. The method of claim 1, wherein the configuration parameters corresponds with an operating system of a virtualized device included with the computer infrastructure.

3. The method of claim 1, wherein the configuration parameters corresponds with an infrastructure as a service or cloud provider providing at least a portion of the computer infrastructure.

4. The method of claim 1, wherein the deployment request is based on automated testing and monitoring.

5. The method of claim 1, wherein the deployment request is initiated based on a hardened, deployed infrastructure component being identified as unhealthy.

6. The method of claim 1, wherein the deployment is initiated by a load balancer to distribute network traffic across multiple servers.

7. A system for implementing an instance of computer infrastructure, the system comprising:
 a memory; and
 one or more processors configured to execute computer-readable instructions stored in the memory to perform the method comprising:
  receiving a configuration parameters for a template defining the computer infrastructure, wherein the template corresponds with infrastructure as code (IaC) implemented on a plurality of infrastructure as a service (IaaS) or cloud provider equipment and services;
  build the template defining the computer infrastructure using the configuration parameters, wherein the template translates the configuration parameters to a plurality of expected formats of the plurality of IaaS or cloud provider equipment and services;
  when a deployment request is received, launch the computer infrastructure, including tools, services, and management capabilities, in accordance with the template, the configuration parameters, and constrained by governance standards to create a new instance of the computer infrastructure, wherein the computer infrastructure relies on the plurality of IaaS or cloud provider equipment and services to create the new instance of computer infrastructure;
  embed ChatOps functionality, wherein the ChatOps functionality comprises Internet Control Message Protocol (ICMP), Functions as a Service (FaaS), Chat Operations alerting, logging, and stateful management of compute for continuous monitoring; and
  provide stateful hardened, monitored, managed, and self-healing Service and Infrastructure Provisioning at runtime;
  wherein the configuration parameters define logical configuration parameters for deployment including regionality availability zones, identity access management, Classless Inter-Domain Routing (CIDR) management, boundary and security configurations including firewalls, internet gateways, virtual private networks, demilitarized zones (DMZs), and other logical constraints of a secured infrastructure deployment; and
  wherein launching the computer infrastructure comprises identifying and codifying a build file of artifacts implementing one or more operating systems and defining parameters of a virtualized operating system or container in accordance with the configuration parameters and pre-defined constraints of a given organization.

8. The system of claim 7, wherein the configuration parameters corresponds with an operating system of a virtualized device included with the computer infrastructure.

9. The system of claim 7, wherein the configuration parameters corresponds with an infrastructure as a service or cloud provider providing at least a portion of the computer infrastructure.

10. The system of claim 7, wherein the deployment request is based on automated testing and monitoring.

11. The system of claim 7, wherein the deployment request is initiated based on a hardened, deployed infrastructure component being identified as unhealthy.

12. The system of claim 7, wherein the deployment is initiated by a load balancer to distribute network traffic across multiple servers.

13. A non-transitory computer-readable storage medium storing a plurality of instructions executable by one or more processors, the plurality of instructions when executed by the one or more processors cause the one or more processors to:
 receiving a configuration parameters for a template defining the computer infrastructure, wherein the template corresponds with infrastructure as code (IaC) implemented on a plurality of infrastructure as a service (IaaS) or cloud provider equipment and services;
 building the template defining the computer infrastructure using the configuration parameters, wherein the template translates the configuration parameters to a plurality of expected formats of the plurality of IaaS or cloud provider equipment and services;
 when a deployment request is received, launching the computer infrastructure, including tools, services, and management capabilities, in accordance with the template, the configuration parameters, and constrained by governance standards to create a new instance of the computer infrastructure, wherein the computer infrastructure relies on the plurality of IaaS or cloud provider equipment and services to create the new instance of computer infrastructure;
 embedding ChatOps functionality, wherein the ChatOps functionality comprises Internet Control Message Protocol (ICMP), Functions as a Service (FaaS), Chat Operations alerting, logging, and stateful management of compute for continuous monitoring; and providing stateful hardened, monitored, managed, and self-healing Service and Infrastructure Provisioning at runtime;

wherein the configuration parameters define logical configuration parameters for deployment including regionality availability zones, identity access management, Classless Inter-Domain Routing (CIDR) management, boundary and security configurations including firewalls, internet gateways, virtual private networks, demilitarized zones (DMZs), and other logical constraints of a secured infrastructure deployment; and wherein launching the computer infrastructure comprises identifying and codifying a build file of artifacts implementing one or more operating systems and defining parameters of a virtualized operating system or container in accordance with the configuration parameters and pre-defined constraints of a given organization.

14. The non-transitory computer-readable storage medium of claim 13, wherein the configuration parameters corresponds with an operating system of a virtualized device included with the computer infrastructure.

15. The non-transitory computer-readable storage medium of claim 13, wherein the configuration parameters corresponds with an infrastructure as a service or cloud provider providing at least a portion of the computer infrastructure.

16. The non-transitory computer-readable storage medium of claim 13, wherein the deployment request is based on automated testing and monitoring.

17. The non-transitory computer-readable storage medium of claim 13, wherein the deployment request is initiated based on a hardened, deployed infrastructure component being identified as unhealthy.

* * * * *